US012005466B2

(12) United States Patent
Wagner et al.

(10) Patent No.: US 12,005,466 B2
(45) Date of Patent: Jun. 11, 2024

(54) FLUID SPRAYER AND COMPONENTS OF A FLUID SPRAYER

(71) Applicant: Graco Minnesota Inc., Minneapolis, MN (US)

(72) Inventors: Christopher C. Wagner, Saint Anthony, MN (US); Mark C. Richter, River Falls, WI (US)

(73) Assignee: Graco Minnesota Inc., Minneapolis, MN (US)

( * ) Notice: Subject to any disclaimer, the term of this patent is extended or adjusted under 35 U.S.C. 154(b) by 198 days.

(21) Appl. No.: 17/348,345

(22) Filed: Jun. 15, 2021

(65) Prior Publication Data

US 2021/0394208 A1 Dec. 23, 2021

Related U.S. Application Data

(60) Provisional application No. 63/188,817, filed on May 14, 2021, provisional application No. 63/178,683, filed on Apr. 23, 2021, provisional application No. 63/041,454, filed on Jun. 19, 2020.

(51) Int. Cl.

| | |
|---|---|
| ***B05B 7/04*** | (2006.01) |
| ***B05B 7/12*** | (2006.01) |
| ***B05B 9/01*** | (2006.01) |
| ***B05B 12/00*** | (2018.01) |

(52) U.S. Cl.
CPC .......... *B05B 7/0458* (2013.01); *B05B 7/1218* (2013.01); *B05B 9/01* (2013.01); *B05B 12/0026* (2018.08)

(58) Field of Classification Search
CPC . B05B 7/0458; B05B 12/0026; B05B 7/1218; B05B 9/01
USPC .............................................................. 239/8
See application file for complete search history.

(56) References Cited

U.S. PATENT DOCUMENTS

| | | | | |
|---|---|---|---|---|
| 1,982,055 A * | 11/1934 | Jenkins | ................ | B05B 7/0838 239/301 |
| 2,112,546 A | 3/1938 | Smart | | |
| 2,121,924 A | 6/1938 | Newlin | | |
| 2,281,666 A * | 5/1942 | Bramsen | ............... | B05B 7/1209 239/300 |

(Continued)

FOREIGN PATENT DOCUMENTS

| | | |
|---|---|---|
| CN | 2112454 U | 8/1992 |
| CN | 201558765 U | 8/2010 |

(Continued)

OTHER PUBLICATIONS

International Search Report and Written Opinion for PCT Application No. PCT/US2021/037433, Dated Oct. 19, 2021, pp. 27.

(Continued)

*Primary Examiner* — Chee-Chong Lee
(74) *Attorney, Agent, or Firm* — Kinney & Lange, P. A.

(57) ABSTRACT

An air-assisted airless spray gun includes a valve cartridge configured to control a flow of air or spray fluid through the spray gun. The valve cartridge includes a housing configured to interface with the spray gun body and fully supporting the flow control components of the valve cartridge. The housing is secured within a bore of the spray gun body. The valve member is supported by the housing and actuatable relative to a seat. The valve is formed between the seal end of the valve member and the seat.

19 Claims, 25 Drawing Sheets

(56) References Cited

U.S. PATENT DOCUMENTS 2,789,756 A 4/1957 Allen
2,888,207 A 5/1959 Sykes
3,633,828 A 1/1972 Larson
3,687,368 A * 8/1972 Geberth, Jr. .............. B05B 5/03 239/300
3,780,953 A 12/1973 Malec
3,841,555 A 10/1974 Lilja
3,844,487 A 10/1974 Malec
3,861,695 A 1/1975 Shourek
3,876,154 A 4/1975 Griebel
3,893,621 A 7/1975 Johnson
4,166,579 A 9/1979 Beise et al.
4,389,017 A 6/1983 Geberth, Jr.
4,676,437 A 6/1987 Brown
4,744,518 A * 5/1988 Toth ...................... B05B 7/0815 239/300
4,759,502 A * 7/1988 Pomponi, Jr. ......... B05B 7/0815 239/300
4,925,101 A 5/1990 Konieczynski et al.
5,064,119 A * 11/1991 Mellette ................ B05B 7/0815 239/300
5,156,340 A 10/1992 Lopes
5,263,789 A 11/1993 Torntore et al.
5,423,348 A 6/1995 Jezek et al.
5,441,297 A 8/1995 Krohn et al.
5,538,402 A 7/1996 Mckenney
5,570,839 A 11/1996 Kukesh
5,618,001 A 4/1997 Del Gaone et al.
5,699,967 A 12/1997 Conatser et al.
5,718,534 A 2/1998 Neuling
5,803,313 A 9/1998 Flatt et al.
6,415,958 B1 7/2002 Donley
6,484,782 B1 11/2002 Lewis et al.
6,651,910 B2 11/2003 Elliott-Moore
6,817,728 B2 11/2004 Goko
7,243,771 B2 7/2007 Shanahan
7,604,246 B2 10/2009 Sodemann et al.
7,926,740 B2 4/2011 Parris et al.
8,113,795 B1 2/2012 Vanell
8,512,642 B2 8/2013 Fujio
8,651,397 B2 2/2014 Gaddis et al.
9,192,952 B2 11/2015 Becker et al.
9,327,308 B2 5/2016 Choiniere et al.
10,717,097 B2 7/2020 Johnston et al.
11,406,995 B2 8/2022 Jurmu et al.
2002/0109019 A1 8/2002 May
2006/0144963 A1 7/2006 Fulkerson et al.
2009/0121048 A1 5/2009 Noshima
2010/0014908 A1 1/2010 Campbell et al.
2011/0121103 A1 5/2011 Carleton et al.
2014/0263699 A1 9/2014 Hedger et al.
2015/0060579 A1 3/2015 Myers et al.
2015/0197261 A1 7/2015 Moore et al.
2016/0114823 A1 4/2016 Moore et al.
2016/0129460 A1 5/2016 Moore et al.
2017/0232456 A1 8/2017 Lindsay
2017/0252271 A1 9/2017 Klee et al.
2018/0050361 A1 2/2018 Gehrung
2018/0111146 A1 4/2018 Strong

FOREIGN PATENT DOCUMENTS

CN 104437924 A 3/2015
CN 205926087 U 2/2017
CN 106890739 A 6/2017
CN 208742841 U 4/2019
DE 3148898 A1 6/1983
DE 20104036 U1 6/2001
JP 2001129444 A 5/2001
JP 4227387 B2 2/2009
WO WO2009015260 A2 1/2009
WO WO2016114338 A1 7/2016

OTHER PUBLICATIONS

International Preliminary Report on Patentability for PCT Application No. PCT/US2021/037433, Dated Dec. 29, 2022, pp. 16.

* cited by examiner

FLUID SPRAYER AND COMPONENTS OF A FLUID SPRAYER

CROSS-REFERENCE TO RELATED APPLICATION(S)

This application claims priority to and the benefit of U.S. Provisional Application No. 63/041,454 filed Jun. 19, 2020, and entitled "FLUID SPRAYER AND COMPONENTS OF A FLUID SPRAYER," and claims priority to and the benefit of U.S. Provisional Application No. 63/178,683 filed Apr. 23, 2021, and entitled "FLUID SPRAYER AND COMPONENTS OF A FLUID SPRAYER," and claims priority to and the benefit of U.S. Provisional Application No. 63/188,817 filed May 14, 2021, and entitled "FLUID SPRAYER AND COMPONENTS OF A FLUID SPRAYER," the disclosures of which are hereby incorporated by reference in their entireties.

BACKGROUND

This disclosure relates to sprayers. More specifically, this disclosure relates to spray guns for sprayers.

Spray guns can be used to spray fluids on surfaces. For example, spray guns can be used to spray paint, lacquer, finishes, and other coatings on furniture, cabinets, appliances, equipment, fabricated components, etc. While various fluids can be sprayed by the embodiments referenced herein, paint will be used as an example.

Typically, the paint is placed under pressure by a piston, diaphragm, or other positive displacement pump. The pump can place the paint under pressure between 500 to 5,000 pounds per square inch (psi), although higher and lower pressures are possible. The pump outputs the paint under pressure through a flexible hose. A spray gun is used to dispense the paint, the gun being attached to the end of the hose opposite the pump. In this way, the spray gun does not include a pump, but rather releases paint pumped to the spray gun through the hose. The spray gun atomizes the paint under pressure into a spray fan, which is applied to a surface.

Some spray guns, which can be referred to as air-assisted airless spray guns, emit airflows to assist in atomizing and/or shaping the fluid spray. Such spray guns emit fluid through a spray nozzle and emit the airflows proximate the fluid spray. Such spray guns include valves to control the fluid flow and the multiple airflows.

SUMMARY

According to one aspect of the present disclosure, a spray gun configured to receive flows of a fluid and of air and to emit a fluid spray and the air includes a gun body having a first bore, a second bore, and a gap disposed therebetween; a fluid control cartridge having a first housing disposed within the first bore, wherein a fluid control valve is fully contained within the first housing and is configured to control spraying from the spray gun; an air control cartridge having a second housing disposed within the second bore, wherein a first air control valve is fully contained within the second housing and is configured to control airflow for spraying by the spray gun; and a trigger extending into the gap and configured to actuate the fluid control valve between a closed state and an open state.

According to an additional or alternative aspect of the present disclosure, a spray gun configured to receive flows of a fluid and of air and to emit a fluid spray and the air includes a gun body; a first valve bore formed in the gun body; and a first flow valve cartridge disposed in the first valve bore. The first flow valve cartridge fully contains a first flow valve configured to control flow downstream through the first flow valve cartridge.

According to another additional or alternative aspect of the present disclosure, a spray tip assembly for a spray gun includes a spray tip and a turbulator assembly disposed upstream of the spray tip.

According to yet another additional or alterative aspect of the present disclosure, a spray gun includes a gun body having an air valve bore, an air inlet bore in communication with the air valve bore, an assist air bore extending from the air valve bore, and a fan air bore extending from the air valve bore; and an air valve assembly disposed in the air valve bore and configured to control a first air flow between the air inlet bore and the assist air bore and a second air flow between the air inlet bore and the fan air bore. The air valve assembly includes a valve body disposed in the air valve bore and having an axial bore therethrough and at least one air outlet port, wherein the at least one air outlet port is in fluid communication with the fan air bore; a common valve member disposed at least partially within the air valve bore, wherein a first end of the common valve member extends out of the air valve bore and a second end of the common valve member is disposed in the valve body; a fan valve member disposed within the air valve bore; and a stop extending into the air valve bore. A first valve is formed at least partially by the common valve member and is configured to control flow downstream to the assist air bore. A second valve is formed at least partially by the common valve member and is configured to control flow downstream to the fan air bore. The stop is configured to interface with the fan valve member to limit axial displacement of the fan valve member.

According to yet another additional or alterative aspect of the present disclosure, a spray tip assembly includes a tip body; an air cap disposed at least partially within the tip body and at a first end of the tip body; a spray tip supported by the air cap; a first catch member disposed within a first slot in the tip body; a second catch member disposed within a second slot in the top body, the second slot spaced axially from the first slot; and a collar disposed about the tip body, wherein the collar is movable between a dismounted state and a mounted state. The collar biases the second catch member downwards towards an axis through the spray tip with the collar in the mounted state.

According to yet another additional or alterative aspect of the present disclosure, an air valve cartridge for an air-assisted airless spray gun includes a cartridge body having a first end, a second end, at least one air inlet port through the cartridge body and at least one air outlet port through the cartridge body; a first valve member disposed at least partially within the cartridge body, the first valve member at least partially defining a first valve and a second valve; a second valve member disposed at least partially within the cartridge body, the second valve member at least partially defining a third valve disposed downstream from the second valve; a spring disposed within the housing to bias the first valve member towards the first end, such that the spring biases the first valve and the second valve towards respective closed state. The cartridge body, the first valve, the second valve, the spring, the first valve member; and the second valve member form a discrete assembly configured to control first and second airflows downstream of the air valve cartridge.

According to yet another additional or alterative aspect of the present disclosure, a method of assembling a fluid tube assembly to a spray gun includes aligning a mount block with a mount slot formed in a gun body of the spray gun; sliding the mount block into the mount slot; and inserting a valve cartridge through the mount block to secure the mount block in the mount slot, the valve cartridge containing a fluid valve member configured to control spraying of spray fluid by the spray gun.

According to yet another additional or alterative aspect of the present disclosure, a method of assembling a spray gun includes inserting a first valve cartridge as a unit into a first cartridge bore formed in a gun body of the spray gun, the second valve cartridge containing at least one first flow control valve; fixing a first body of the first valve cartridge to the gun body; inserting a second valve cartridge as a unit into a second cartridge bore formed in the gun body, the second valve cartridge containing at least one second flow control valve; and fixing a second body of the second valve cartridge to the gun body.

DETAILED DESCRIPTION

This disclosure relates to fluid spraying. More specifically, this disclosure relates to air-assisted airless spraying. An air-assisted airless (AA) spray gun is configured to emit a spray of spray fluid, such as paints, varnishes, lacquers, fine finishes, high-gloss finishes, waterborne coatings, solvent-borne coatings, etc. The air-assisted airless spray gun can be used to apply coatings to surfaces, furniture, cabinets, appliances, equipment, fabricated components, etc., among other options. The air-assisted airless spray gun also emits compressed air. An assist air portion of the compressed air is configured to assist in atomization of the spray fluid and complete the atomization of the fan tails, preventing undesired tailing. A fan air portion of the compressed air is configured to shape the spray pattern. The spray fluid is emitted through a spray tip and the air is emitted through an air cap surrounding the spray tip. The assist air is emitted with each trigger pull while the fan air can be set by the user between no fan air and a maximum flow. The spray gun is configured to spray at fluid pressures up to about 34.5 megapascal (MPa) (about 5,000 pounds per square inch (psi)). In some examples, the spray gun is configured to spray at fluid pressures up to about 10 MPa (about 1,500 psi). In some examples, the spray gun is configured to spray at air pressures up to about 0.7 MPa (about 100 psi).

Figure 1A:
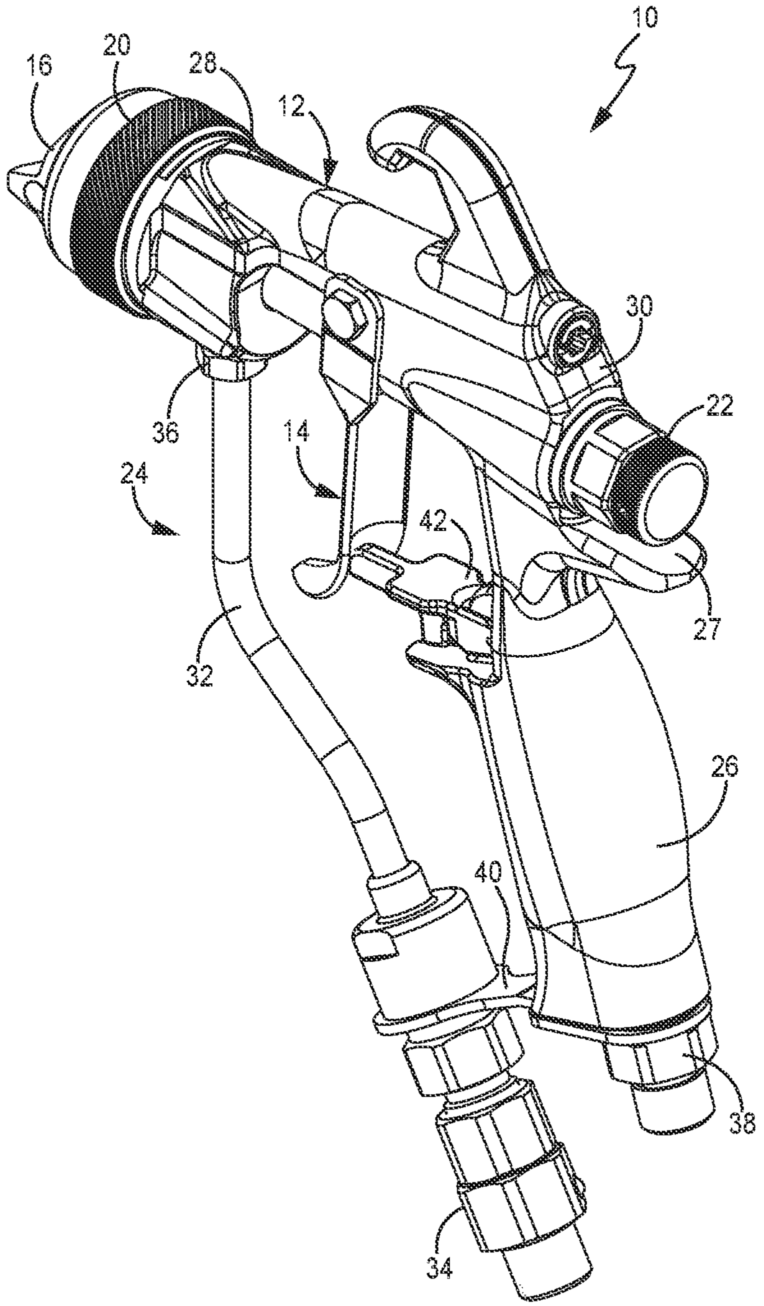
FIG. 1A is a rear isometric view of a spray gun.
Figure 1B:
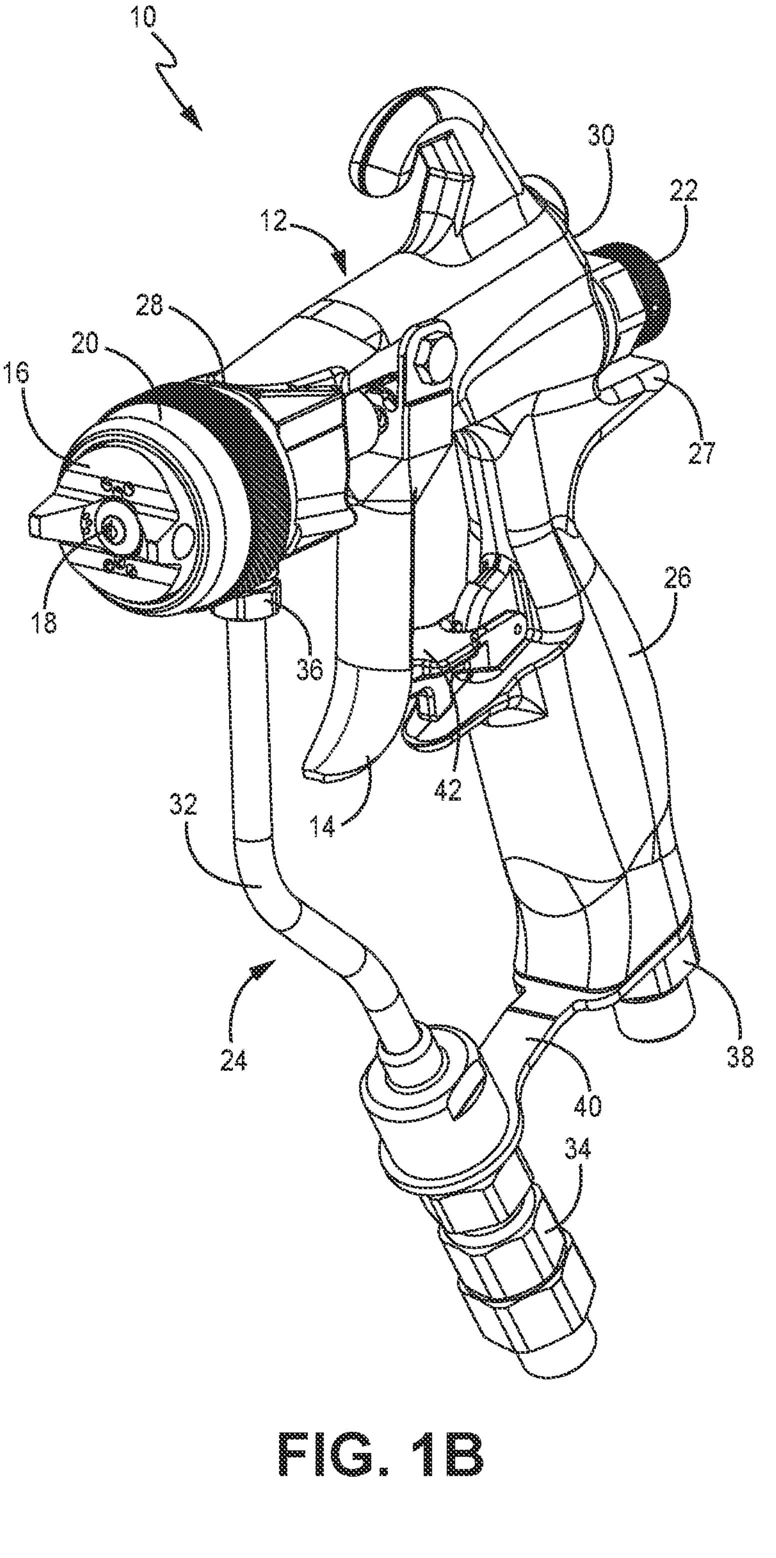
FIG. 1B is a front isometric view of the spray gun.
Figure 1C:
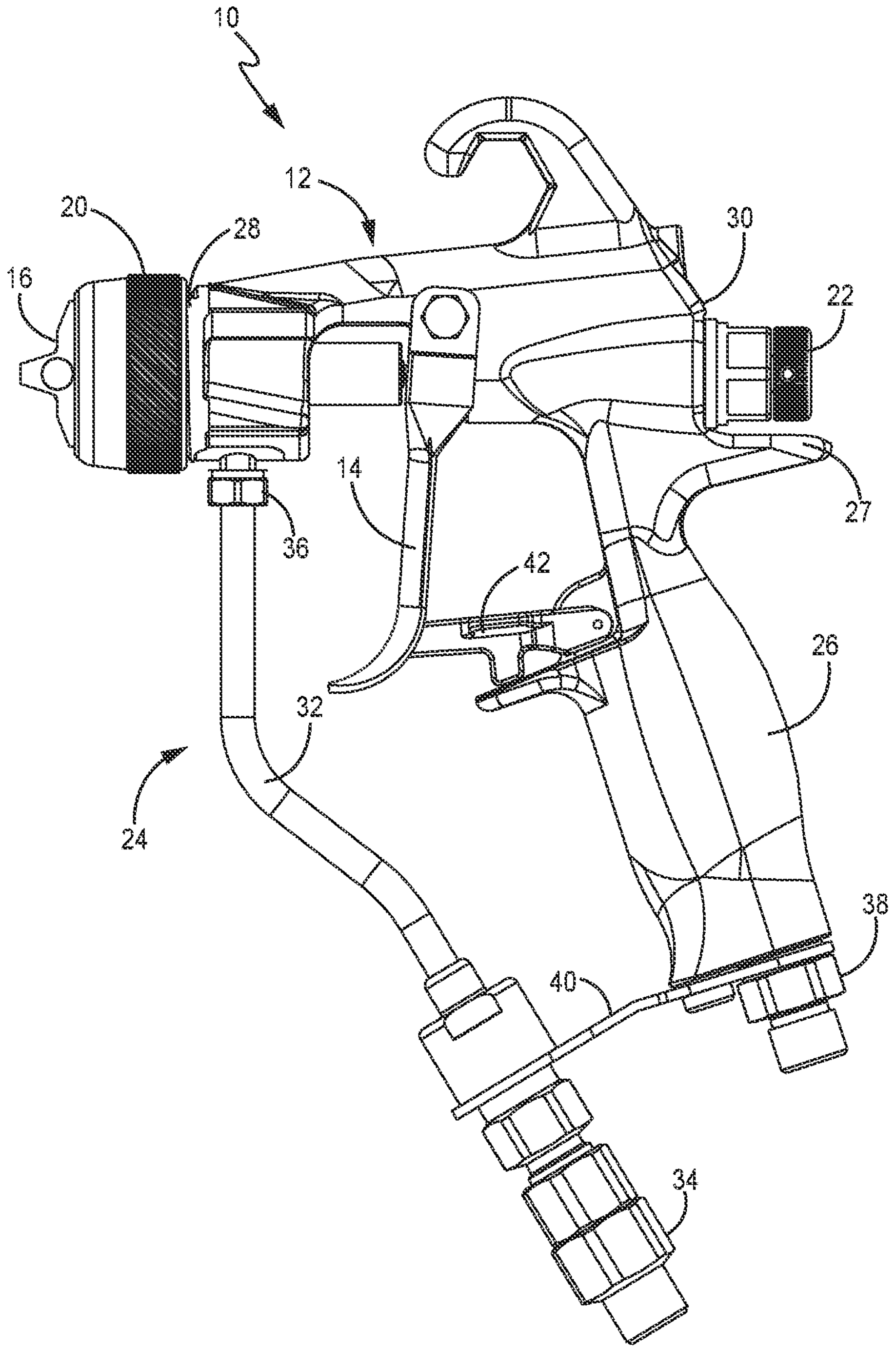
FIG. 1C is a side elevation view of the spray gun.

FIG. 1A is a rear isometric view of spray gun 10. FIG. 1B is a front isometric view of spray gun 10. FIG. 1C is side elevation view of spray gun 10. FIGS. 1A-1C will be discussed together. Gun body 12, trigger 14, air cap 16, spray tip 18, collar 20, knob 22, fluid tube assembly 24, and trigger lock 42 are shown. Gun body 12 includes handle 26, front end 28, and rear end 30. Fluid tube assembly 24 includes fluid tube 32, lower fluid fitting 34, upper fluid fitting 36, air fitting 38, and connector 40.

Spray gun 10 is configured to receive spray fluid and compressed air and to emit fluid sprays. Gun body 12 supports various components of spray gun 10. Air cap 16 is configured to emit air. Spray tip 18 is oriented to emit sprays through air cap 16. In some examples, spray tip 18 extends through air cap 16 to emit spray fluid. Spray tip 18 can include a shaping orifice, such as in a cat-eye configuration, configured to shape the liquid spray emitted from spray tip 18. Collar 20 secures air cap 16 and spray tip 18 to gun body 12. Trigger 14 is mounted to gun body 12 and configured to actuate both air and fluid valves, as discussed in more detail below. Trigger lock 42 is movable between a deployed state and a stowed state. In the deployed state, trigger lock 42 interfaces with trigger 14 to prevent actuation of trigger 14. In the stowed state, trigger lock 42 is spaced from trigger 14 such that trigger 14 can be actuated. In the example shown, trigger lock 42 is configured to be oriented horizontally in the deployed state and oriented vertically in the stowed state. Knob 22 extends from rear end 30 of gun body 12 and is disposed above handle 26. Knob 22 can interface with an air valve within gun body to adjust an opening through that air valve, as discussed in more detail below. Knob 22 is configured to interface with a user's hand to provide a rest spot for the user's hand while grasping handle 26. Knob 22 is sized to position the user's hand at a desired location along handle 26 for the best ergonomic grip of trigger 14.

Fluid tube assembly 24 is attached to gun body 12. Lower fluid fitting 34 is configured to connect to a tube to receive spray fluid. Fluid tube 32 extends between lower fluid fitting 34 and upper fluid fitting 36. Fluid tube 32 conveys spray fluid to upper fluid fitting 36. Upper fluid fitting 36 is connected to a block within gun body 12, discussed in more detail below, that provides the spray fluid to a fluid valve in gun body 12. Air fitting 38 is connected to handle 26 and provides compressed air to air flowpaths through gun body 12. Connector 40 extends between and maintains a desired spacing between lower fluid fitting 34 and air fitting 38. Connector 40 can be a strip of material, such as plastic or metal, that maintains the spacing and connection.

During operation, the user can grasp handle 26 of gun body 12 with a single hand and can manipulate spray gun 10 with the single hand. The user can manipulate trigger 14 with the single hand and actuate trigger 14 to initiate spraying by spray gun. Actuating trigger 14 causes air and fluid valves to open such that spray gun 10 emits both spray fluid and air. Releasing trigger 14 allows the valves to return to the normally closed states, stopping the flow of both spray fluid and air. In the example shown, tail 27 extends from a rear side of spray gun 10 and is positioned between knob 22 and the hand of the user during operation. Tail 27 can interface with the user's hand and provide support to the hand during spraying. In some examples, spray gun 10 does not include tail 27.

Figure 2:
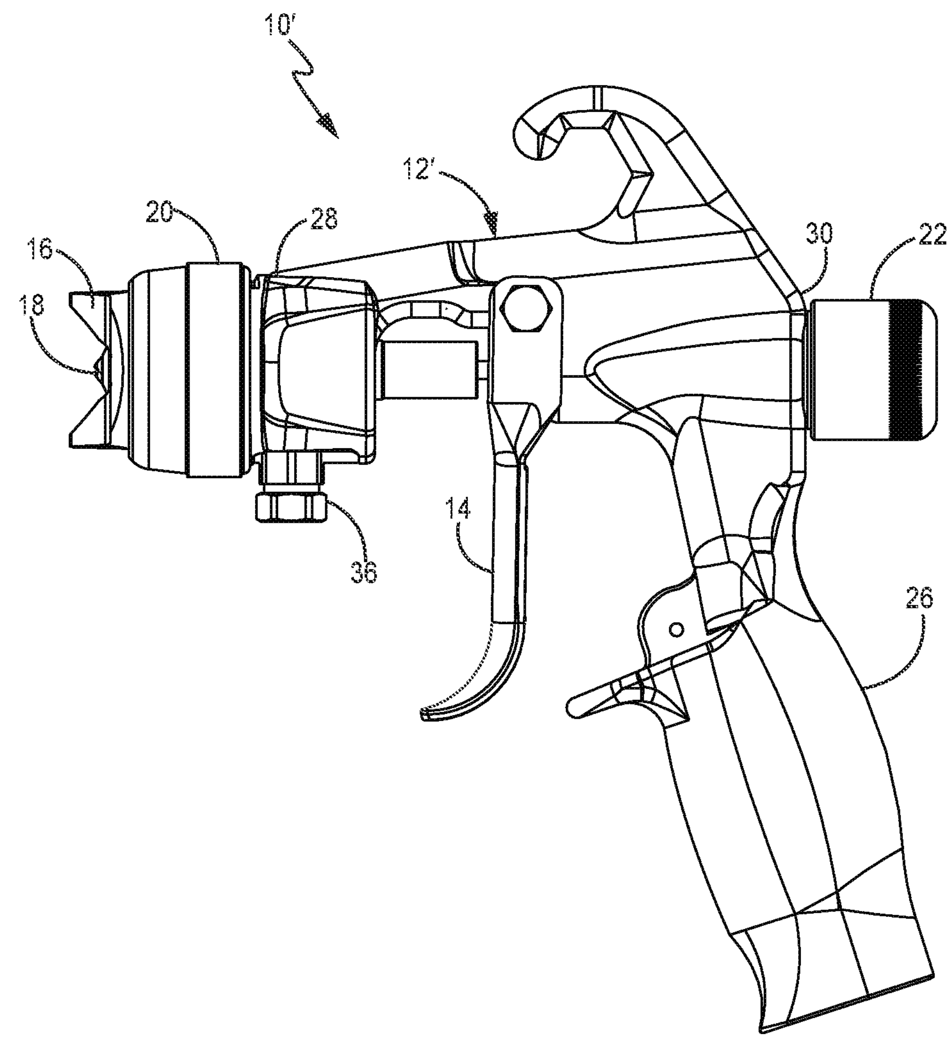
FIG. 2 is a side elevation view of a spray gun.

FIG. 2 is a side elevation view of spray gun 10'. As shown in FIG. 2, knob 22 is positioned directly above handle 26. Body 12' of spray gun 10' does not include tail 27 such that knob 22 can interface with the user's hand and provide an upper support for the hand. Knob 22 can be removed and replaced with other knobs 22 of varying sizes to modify spray gun 10' to accommodate the actual current user. For example, a larger diameter knob 22 can be utilized to position the user's hand lower on handle 26 while a smaller diameter knob 22 can be utilized to position the user's hand higher on handle 26. Knob 22 facilitates custom fitting of spray gun 10' to a user's hand to provide an appropriately sized grip area regardless of the user's hand size. As such, a single spray gun 10' can be retrofitted to comfortably fit in the hands of different users by switching knob 22 for other knobs 22 of different sizes.

Figure 3A:
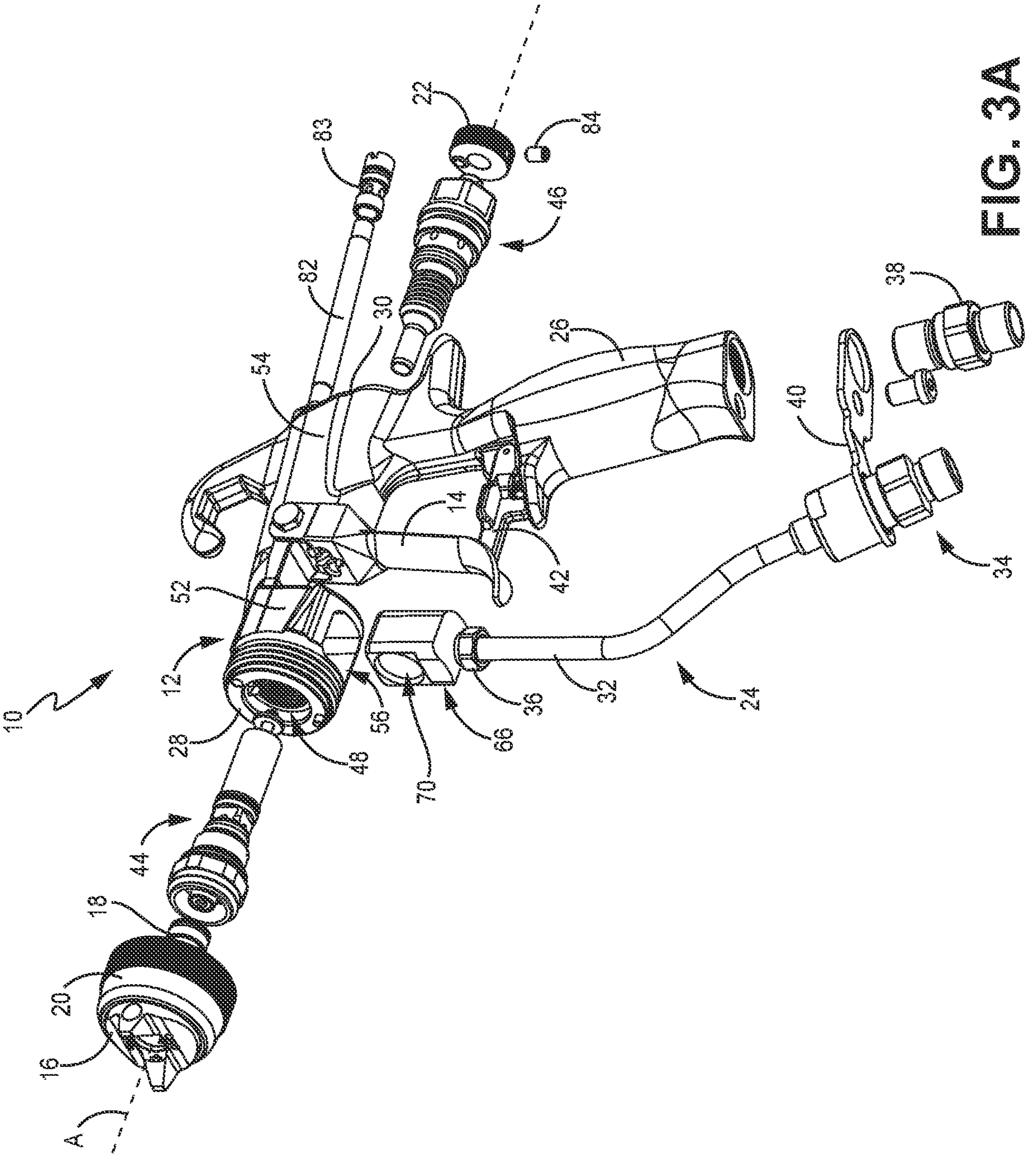
FIG. 3A is an isometric exploded view of the spray gun shown in FIG. 1A.
Figure 3B:
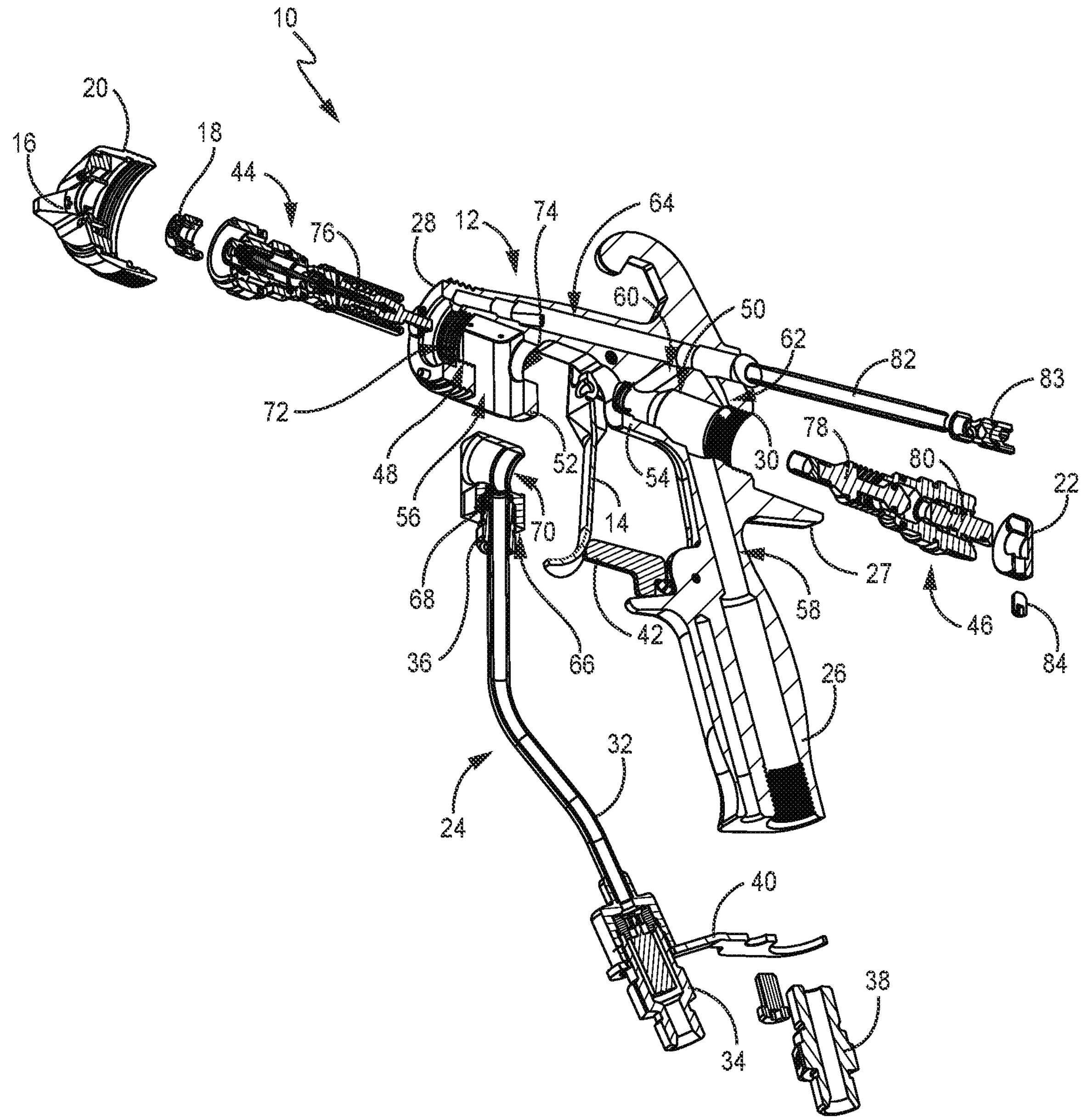
FIG. 3B is an isometric exploded cross-sectional view of the spray gun shown in FIG. 3A.

FIG. 3A is an isometric exploded view of spray gun 10. FIG. 3B is an isometric exploded cross-sectional view of spray gun 10. FIGS. 3A and 3B will be discussed together. Spray gun 10 includes gun body 12, trigger 14, air cap 16, spray tip 18, collar 20, knob 22, fluid tube assembly 24, fluid valve cartridge 44, air valve cartridge 46, fluid valve bore 48, air valve bore 50, air tube 82, and air tube cap 83. Gun body 12 includes handle 26, front end 28, rear end 30, front block 52, and rear block 54. Gun body 12 further includes tail 27, mount slot 56, inlet bore 58, assist air bore 60, fan air bore 62, feed air bore 64, forward bore 72, and rear bore 74. Fluid tube assembly 24 includes fluid tube 32, lower fluid fitting 34, upper fluid fitting 36, air fitting 38, connector 40, and mount block 66. Mount block 66 includes spray fluid inlet 68 and mount bore 70. Fluid valve member 76 of fluid valve cartridge 44 is shown. First valve member 78 and second valve member 80 of air valve cartridge 46 are shown.

Spray gun 10 is configured to receive separate flows of spray fluid and compressed air and to emit a spray formed by the spray fluid and assisted by the compressed air. Spray gun 10 can emit compressed air to shape the spray pattern. Handle 26 extends from rear block 54 of gun body 12. Rear block 54 is disposed opposite front block 52 and each are integrally formed as part of the gun body 12. Trigger 14 is disposed in an axial gap between front block 52 and rear block 54.

Trigger 14 is configured to interface with fluid valve cartridge 44 and air valve cartridge 46 to control flows of spray fluid and compressed air, respectively, downstream through each of fluid valve cartridge 44 and air valve cartridge 46. In the example shown, trigger 14 is configured to actuate fluid valve member 76 of fluid valve cartridge 44 and first valve member 78 of air valve cartridge 46 from the closed to the open states. Actuating trigger 14 to initiate spraying causes each of fluid valve member 76 and first valve member 78 to shift to respective open states. Rear block 54 contains only air flowpaths and air control components (e.g., air valve cartridge 46) and not fluid control components. Air valve cartridge 46 includes all air valve components of spray gun 10 and is self-contained sufficient to control flows of both the assist air portion and the fan air portion downstream through assist air bore 60, fan air bore 62, and feed air bore 64. In the example shown, rear block 54 does not contain components associated with the spray liquid. Front block 52 contains both liquid and air flowpaths. Front block 52 thereby contains and/or defines both hydraulic and pneumatic flowpaths. Front block 52 contains only liquid control components (e.g., fluid valve cartridge 44) and not air control components. Fluid valve cartridge 44 includes all spray fluid valve components of spray gun 10 and is self-contained sufficient to control the flow of spray fluid to spray tip 18.

Air valve bore 50 is formed in gun body 12. Air valve bore 50 is formed in rear block 54 and extends fully through rear block 54. Air valve bore 50 includes two axial openings. The first opening is through rear end 30 of spray gun 10 and is the opening through which air valve cartridge 46 is installed in and removed from gun body 12. The second opening is through the front of rear block 54 and opens into the gap that trigger 14 is disposed in.

Air valve cartridge 46 is mounted in air valve bore 50 and extends through each axial end of air valve bore 50. Air valve cartridge 46 interfaces with gun body 12 to secure air valve cartridge 46 within air valve bore 50. Air valve cartridge 46 is connected to gun body 12 within air valve bore 50. The housing of air valve cartridge 46 can, in some examples, extend out of air valve bore 50 through the opening in rear end 30. First valve member 78 extends through the opening in the front, interior end of rear block 54. First valve member 78 controls the flow of the assist air portion to assist air bore 60. First valve member 78 controls the flow of the fan air portion to second valve member 80. First valve member 78 can also be referred to as a common valve member as first valve member 78 is associated with both first valve 90 and second valve 92. Second valve member 80 controls the flow of the fan air portion downstream from air valve cartridge 46. Second valve member 80 can also be referred to as a fan valve member as second valve member 80 controls a flow of the fan air portion.

Air valve cartridge 46 contains the air control components of spray gun 10 and can be installed and removed as a single part. Air valve cartridge 46 facilitates quick and easy installation, removal, and replacement of the air control parts. In addition, air valve cartridge 46 is inserted and removed through rear end 30 such that all air control components are inserted and removed through rear end 30, providing a simple, efficient, and quick servicing process. Replacing fluid valve cartridge 44 replaces each of the spray fluid valving components of spray gun 10 as a single unit. Replacing air valve cartridge 46 replaces each of the air valving components of spray gun 10 as a single unit. Air valve cartridge 46 can be removed and installed while fluid valve cartridge 44 remains mounted to spray gun body 12.

Knob 22 is disposed at an end of air valve cartridge 46 projecting from rear end 30. In some examples (e.g., as shown in FIG. 2), a portion of knob 22, such a cylindrical wall, can project towards gun body 12 and over a portion of air valve cartridge 46 extending from rear end 30. Knob 22 can interface with second valve member 80. In some examples, knob 22 can free float on air valve cartridge 46 such that knob 22 is movable relative to air valve cartridge 46 and second valve member 80. As discussed in more detail below, a tool interface can be formed on second valve member 80. The tool interface requires a compatible adjustment tool to adjust the position of second valve member 80, and thus requires the adjustment tool to adjust the flow of the fan air portion. In the example shown, knob 22 is fixed to second valve member 80 such that knob 22 can actuate second valve member 80 to alter a size of the flowpath of the fan air portion downstream from air valve cartridge 46. Knob 22 can be grasped by the user and manipulated (e.g., rotated or pulled) to adjust a position of second valve member 80 within the housing of air valve cartridge 46. In the example shown, knob 22 is secured to air valve cartridge 46 by fastener 84 and is configured to be rotated to adjust a position of second valve member 80 to control the flow of the fan air portion.

Fluid valve bore 48 is formed at least partially in gun body 12. A portion of fluid valve bore 48 is formed through mount block 66. Forward bore 72 and rear bore 74 of fluid valve bore 48 are formed on opposite axial sides of mount slot 56. Forward bore 72 and rear bore 74 are formed in gun body 12. Forward bore 72 and rear bore 74 can be coaxial with air valve bore 50. Forward bore 72 and rear bore 74 align with mount bore 70 through mount block 66 to form fluid valve bore 48 when mount block 66 is inserted into mount slot 56. Forward bore 72, rear bore 74, and mount bore 70 can be considered to align on a spray axis A of spray gun 10 along which the liquid spray is emitted. In some examples, the liquid spray is formed as a patterned shape, such as an oval, circle, fan, etc. with the spray axis A disposed at the spray pattern center. Fluid valve bore 48 includes a first opening at the front end 28 of spray gun 10 and a second opening that opens through the rear of front block 52 and into the gap that trigger 14 is disposed in. In some examples, fluid valve bore 48 and air valve bore 50 are disposed coaxially on axis A.

Fluid valve cartridge 44 is mounted in fluid valve bore 48 and extends through each of the forward bore 72, mount bore 70, and rear bore 74. Fluid valve cartridge 44 interfaces with gun body 12 to secure fluid valve cartridge 44 within fluid valve bore 48. Fluid valve cartridge 44 is connected to gun body 12 within fluid valve bore 48. For example, the interface between fluid valve cartridge 44 and gun body 12 can formed within one of forward bore 72 and rear bore 74. Fluid valve cartridge 44 extends through mount bore 70 between the portions of fluid valve bore 48 formed in gun body 12. Fluid valve cartridge 44 forms a support beam that extends through mount block 66 and secures mount block 66 to gun body 12, within mount slot 56. Fluid valve cartridge 44 retains mount block 66 within mount slot 56 by extending through mount bore 70 and gun body 12.

Fluid valve cartridge 44 contains the spray fluid control components of spray gun 10 and can be installed and removed as a single part. Fluid valve cartridge 44 facilitates quick and easy installation, removal, and replacement of the fluid control parts. In addition, fluid valve cartridge 44 is inserted and removed through front end 28 such that all fluid control components are inserted and removed through front end 28, providing a simple, efficient, and quick servicing process. Fluid valve cartridge 44 can be removed and installed while air valve cartridge 46 remains mounted to spray gun body 12.

In the example shown, the housing of fluid valve cartridge 44 is configured to extend out of each axial end of fluid valve bore 48. Fluid valve member 76 is disposed at least partially within the housing of fluid valve cartridge 44 and extends rearward from the housing towards air valve cartridge 46. Fluid valve member 76 is configured to interface with first valve member 78 such that trigger 14 can actuate both fluid valve member 76 and first valve member 78.

Fluid tube assembly 24 is attached to gun body 12 and provides connections for both spray fluid and compressed air to enter into spray gun 10. Air fitting 38 is connected to handle 26 and is configured to connect to tubing to provide compressed air to the air paths through gun body 12. It is understood that compressed air can be provide to the air paths through gun body 12 in any desired manner. The compressed air flows through inlet bore 58 to air valve bore 50 and is stopped by air valve cartridge 46 when air valve cartridge 46 is in the closed state.

Connector 40 is mounted to lower fluid fitting 34. Air fitting 38 extends through connector 40 to attach to handle 26. Air fitting 38 and connector 40 locate lower fluid fitting 34 and fluid tube 32 relative handle 26. Connector 40 can be a strip of material between lower fluid fitting 34 and air fitting 38, such as metal or plastic, among other options. Lower fluid fitting 34 is configured to connect to tubing extending from a pump to receive spray fluid from the pump via the tubing. Fluid tube 32 extends between lower fluid fitting 34 and upper fluid fitting 36. Upper fluid fitting 36 is connected to mount block 66 at spray fluid inlet 68. Fluid tube 32 provides spray fluid to mount block 66 through spray fluid inlet 68.

Mount block 66 is configured to slidably fit within mount slot 56. In the example shown, mount slot 56 includes a single opening for receiving mount block 66. Mount slot 56 includes a downward-facing opening for receiving mount block 66. Mount slot 56 can be formed in any desired manner. For example, mount slot 56 can be cast or machined. Gun body 12 can be formed by multiple components fitted together to form mount slot 56, such as a clamshell configuration, among other options. In the example shown, mount block 66 is a rectangular cuboid configured to be received by a rectangular mount slot 56. Mount block 66 slides vertically into mount slot 56. Mount block 66 slides vertically out of mount slot 56. Mount block 66 slides transverse to the spray axis A and, in some examples, can slide orthogonal to the spray axis A. While mount block 66 and mount slot 56 are described as having rectangular horizontal cross-sections, it is understood that mount block 66 and slot 56 can be of any desired compatible cross-sectional shapes. For example, mount block 66 and mount slot 56 can have triangular, square, circular, or other cross-sectional shapes. In some examples, mount block 66 and mount slot 56 can include a mistake-proofing element to prevent installation of mount block 66 in an incorrect orientation. For example, a keying element (e.g., pin, rail, bump, etc.) can extend from one of an exterior surface of mount block 66 and a wall of mount slot 56 and be received by a keying slot or opening formed in the other one of mount block 66 and mount slot 56. In some examples, the keying element can be formed by a non-uniform cross-section of mount block 66 and mount slot 56 (e.g., one lateral side is wider than the other lateral side). The mistake-proofing element ensures that mount block 66 is properly oriented to receive fluid valve cartridge 44.

Mount block 66 slides into mount slot 56 and is positioned such that mount bore 70 is aligned with both forward bore 72 and rear bore 74 to form fluid valve bore 48. Fluid valve cartridge 44 is inserted into fluid valve bore 48 and extends through forward bore 72, mount bore 70, and rear bore 74 to secure mount block 66 within mount slot 56. In some examples, fluid valve cartridge 44 can be the only component of spray gun 10 securing mount block 66 within mount slot 56. Spray fluid is provided to mount bore 70 through spray fluid inlet 68. The spray fluid enters fluid valve cartridge 44 from within a fluid chamber formed in mount block 66 between the portion of mount block 66 defining mount bore 70 and the housing of fluid valve cartridge 44.

During assembly of spray gun 10, fluid tube assembly 24 is installed prior to fluid valve cartridge 44. Trigger 14 can be installed after fluid tube assembly 24. Fluid tube assembly 24 is positioned proximate gun body 12 and mount block 66 is aligned with mount slot 56. Mount block 66 is slid vertically into mount slot 56. Air fitting 38 is inserted through connector 40 and threaded into handle 26. In such an example, fluid tube assembly 24 is connected to gun body 12 by air fitting 38 but mount block 66 is unsecured relative gun body 12.

Fluid valve cartridge 44 is inserted into fluid valve bore 48 through front end 28 and is secured to gun body 12. Fluid valve cartridge 44 extends through forward bore 72, mount bore 70, and rear bore 74. Fluid valve cartridge 44 supports mount block 66 and secures mount block 66 to gun body 12 and within mount slot 56. Fluid valve cartridge 44 interfaces with mount block 66 within mount bore 70 to form fluid seals and define the fluid chamber. For example, annular elastomer sealing rings can be mounted to one of mount block 66 and fluid valve cartridge 44 to interface with the other one of mount block 66 and fluid valve cartridge 44. The fluid seals prevent spray fluid from leaking out of the fluid chamber within mount bore 70 between the wall of mount bore 70 and fluid valve cartridge 44. It is understood that, in some examples, fluid valve cartridge 44 can be inserted through fluid valve bore 48 prior to connecting air fitting 38.

Air valve cartridge 46 is inserted into air valve bore 50 through rear end 30 of gun body 12. First valve member 78 projects into the gap between front block 52 and rear block 54 and interfaces with fluid valve member 76. First valve member 78 is interfaced with fluid valve member 76 such that first valve member 78 can move relative fluid valve member 76 during at least a portion of the pull range of trigger 14. The relative motion causes the flowpaths through air valve cartridge 46 to open before the flowpaths through fluid valve cartridge 44. Spray gun 10 thereby begins emitting air prior to emitting spray fluid, which ensures an even spray pattern, prevents spray fluid buildup on air cap 16, and prevents clogging.

Air tube 82 is inserted into feed air bore 64. Air tube cap 83 is connected to gun body 12 and secures air tube 82 within gun body 12. For example, air tube cap 83 can include threading configured to interface with threading in air bore 64.

During operation, trigger 14 is actuated to open each of fluid valve member 76 and first valve member 78. Spray fluid can flow downstream from fluid valve cartridge 44 and is emitted as a liquid spray through spray tip 18. Compressed air flows to air valve cartridge 46 through air inlet bore 58. The air assist portion flows downstream from air valve cartridge 46 to assist air bore 60 and through assist air bore 60 to feed air bore 64. The fan air portion flows downstream from air valve cartridge 46, assuming second valve member 80 is in an open state, through fan air bore 62 to feed air bore 64. While each of the assist air portion and fan air portion flow to feed air bore 64, air tube 82, which is disposed in feed air bore 64, forms a fluidic barrier between each portion of the airflow. The assist air portion and fan air portion do not mix downstream of air valve cartridge 46. In the example shown, the assist air portion flows through feed air bore 64 between air tube 82 and the portion of gun body 12 defining feed air bore 64, while the fan air portion flows through feed air bore 64 within air tube 82.

Fluid tube assembly 24 facilitates quick and simple assembly and servicing of spray gun 10. It can be awkward to assemble and service the multiple components forming fluid tube assemblies. Each of the multiple components must be individually accounted for and tracked and carefully coupled together to prevent leaks and undesired pressure loss. Fluid tube assembly 24 provides a single assembly that facilitates assembly and servicing and allows for more machining and manufacturing variability in both gun body 12 and fluid tube assembly 24 without a loss in operational efficiency or spray quality. The self-contained valving provided by fluid valve cartridge 44 and air valve cartridge 46 also facilitates quick and efficient servicing and maintain isolation between air-handling and liquid-handling components.

Figure 4A:
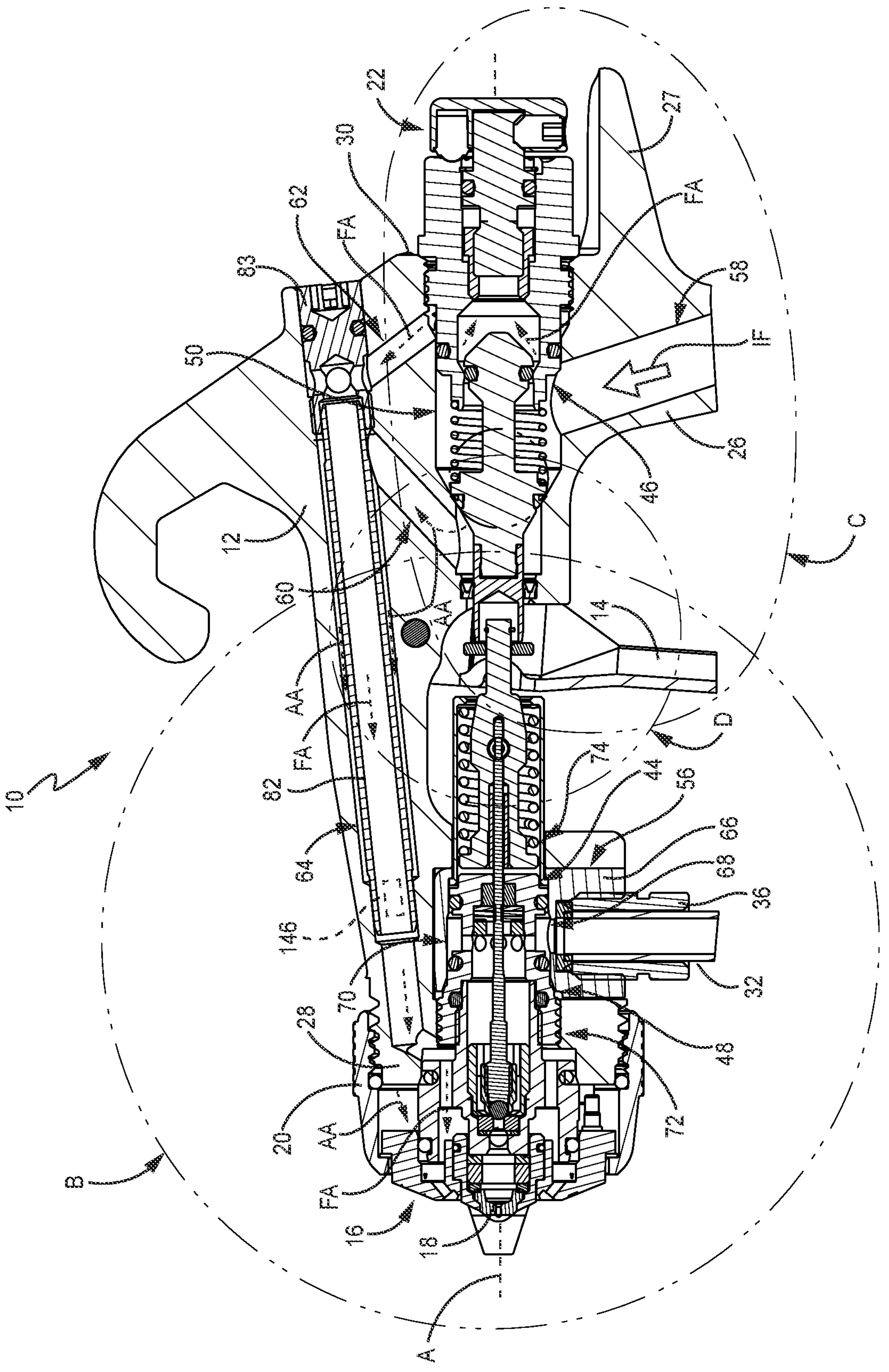
FIG. 4A is an enlarged cross-sectional view of a flow control portion of the spray gun.
Figure 4B:
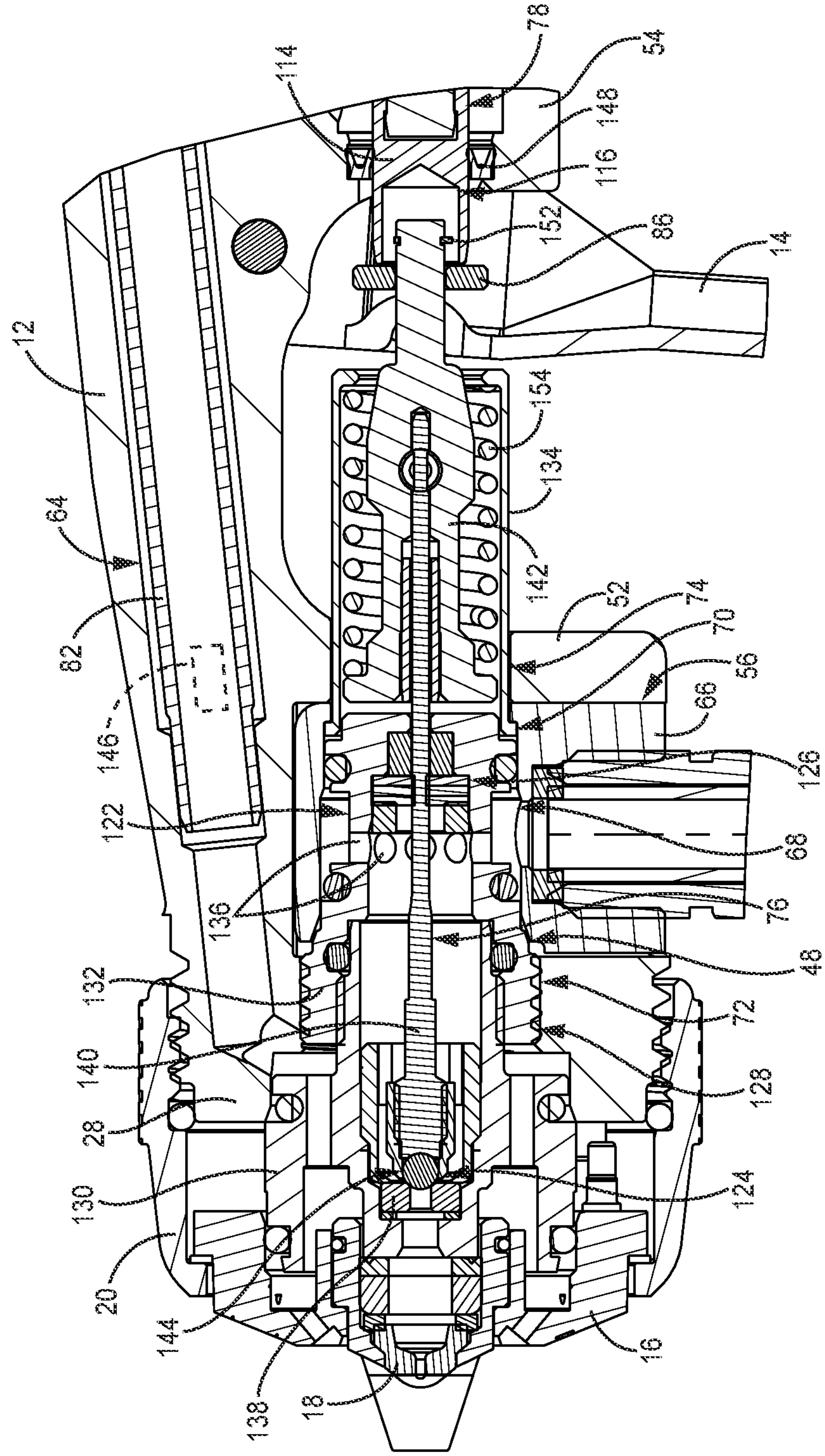
FIG. 4B is an enlarged view of detail B in FIG. 4A.
Figure 4C:
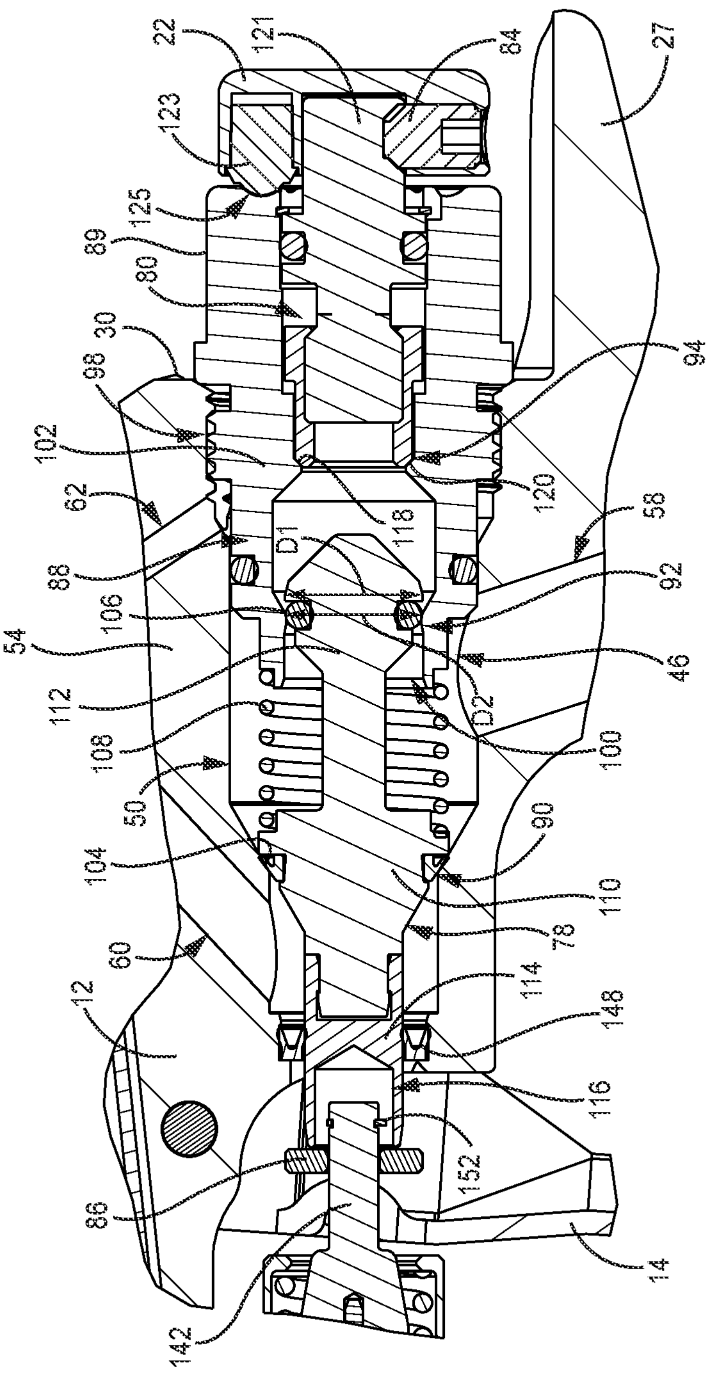
FIG. 4C is an enlarged view of detail C in FIG. 4A.
Figure 4D:
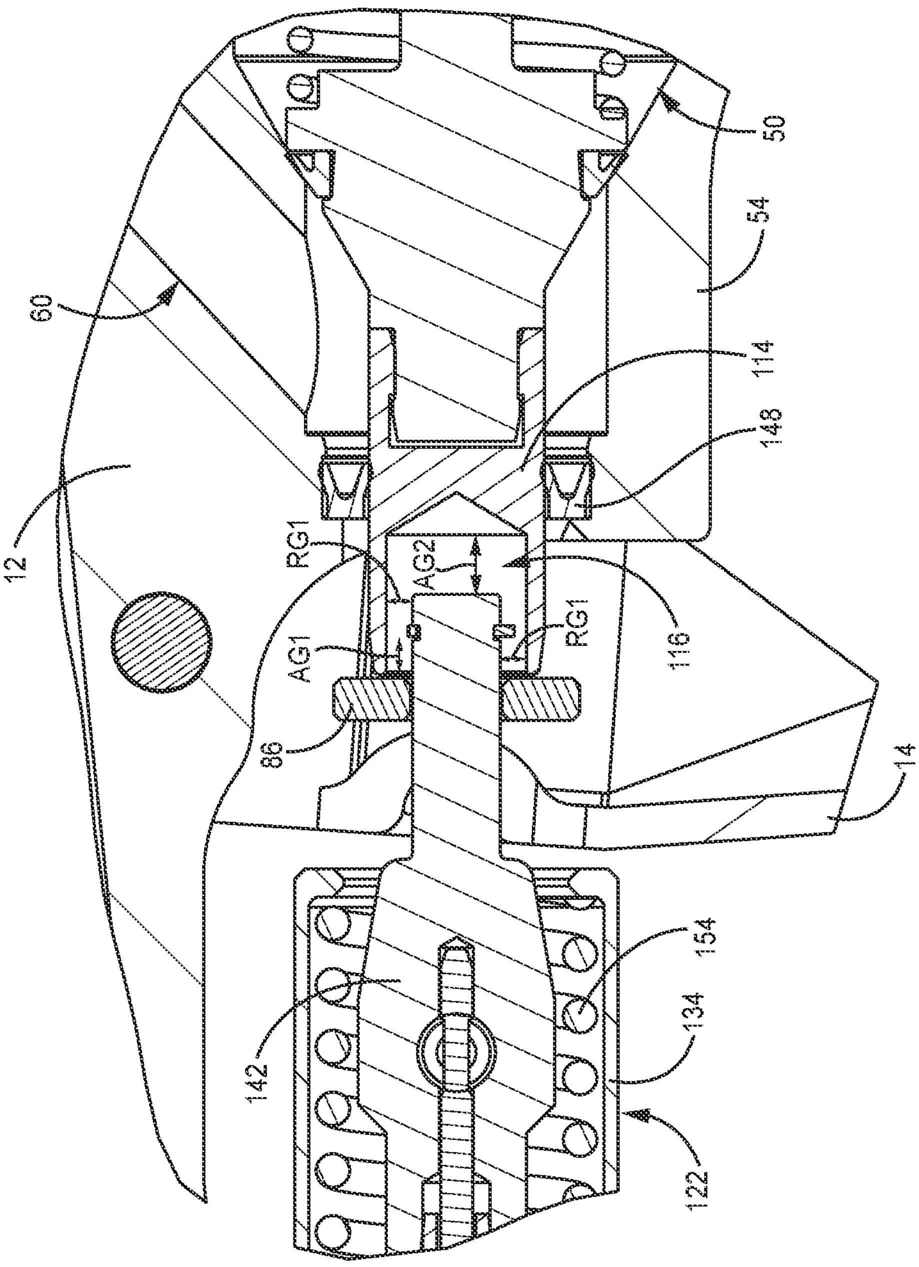
FIG. 4D is an enlarged view of detail D in FIG. 4A.

FIG. 4A is an enlarged cross-sectional view of spray gun 10 showing flow control and spraying components of spray gun 10. FIG. 4B is an enlarged view of detail B in FIG. 4A. FIG. 4C is an enlarged view of detail C in FIG. 4A. FIG. 4D is an enlarged view of detail D in FIG. 4A. FIGS. 4A-4D will be discussed together. Gun body 12, trigger 14, air cap 16, spray tip 18, mounting collar 20, knob 22, handle 26, fluid valve cartridge 44, air valve cartridge 46, fluid valve bore 48, air valve bore 50, mount block 66, air tube 82, and coupler 86 of spray gun 10 are shown. Gun body 12 includes mount slot 56, inlet bore 58, assist air bore 60, fan air bore 62, feed air bore 64, forward bore 72, and rear bore 74. Mount block 66 includes spray fluid inlet 68 and mount bore 70.

Air valve cartridge 46 includes first valve member 78, air cartridge body 88, first valve 90, second valve 92, third valve 94, first interface 98, and return spring 108. Air cartridge body 88 includes air inlet port 100 and air outlet ports 102. First seat 104 is formed by gun body 12 and second seat 106 is disposed in air cartridge body 88. First valve member 78 includes first valve seal 110, second valve seal 112, drive shaft 114, and receiving chamber 116. Second valve member 80 includes third valve seal 120 and valve actuator 121. First valve 90 is defined by first seat 104 and first valve seal 110. Second valve 92 is defined by second seat 106 and second valve seal 112. Third valve 94 is defined by third seat 118 and third valve seal 120.

Fluid valve cartridge 44 includes fluid cartridge body 122, fluid valve 124, seal assembly 126, second interface 128, and actuator spring 154. Fluid cartridge body 122 includes tip mount 130, fluid housing 132, spring housing 134, and fluid inlet ports 136. Fluid valve 124 includes fluid valve member 76 and fluid seat 138. Fluid valve member 76 includes needle 140 and actuator shaft 142. Needle 140 includes fluid valve seal 144.

Gun body 12 supports other components of spray gun 10. Spray gun 10 receives flows of spray fluid, such as liquids, such as paint, among other options, and receives flows of compressed air. The spray fluid can be received through upper fluid fitting 36 and mount block 66. Fluid valve cartridge 44 controls spray fluid flow between mount block 66 and spray tip 18. Fluid valve cartridge 44 is disposed in fluid valve bore 48.

The compressed air can be received through air inlet bore 58 in handle 26. Air valve cartridge 46 controls the air flow between air inlet bore 58 and air cap 16. Air valve cartridge 46 controls flows of both the assist air portion (indicated by arrows AA) and the fan air portion (indicated by arrows FA) downstream from air valve cartridge 46. While the fan air portion FA and assist air portion AA are shown as flowing through first and second flowpaths, respectively, it is understood that the fan air portion FA can be directed to the second flowpath and the assist air portion AA can be directed to the first flowpath in other embodiments of spray gun 10, depending on the internal pathway configurations for routing the air downstream of air valve cartridge 46. The inlet air flow (IF) flows through inlet bore 58 and to air valve bore 50. The air is contained in air valve bore 50 and within air cartridge body 88 with air valve cartridge 46 in the closed state. Air valve cartridge 46 is disposed in air valve bore 50. Inlet bore 58 extends through handle 26 to air valve bore 50. Fan air bore 62 and assist air bore 60 extend from air valve bore 50. Fan air bore 62 and assist air bore 60 each extend to feed air bore 64.

Feed air bore 64 extends through gun body 12 from the rear end 30 towards the front end 28. Air tube 82 is disposed in feed air bore 64 and divides feed air bore 64 into two discreet flow passages. The first flow passage is disposed between an exterior of air tube 82 and the interior of feed air bore 64. The first passage is fluidly connected to air valve bore 50 by assist air bore 60. Openings 146 are formed at the inner end of feed air bore 64. The openings 146 are inlets to flowpaths through the gun body 12 for the assist air portion to flow between feed air bore 64 and air cap 16, in the example shown. The second flow passage extends through air tube 82. The second passage is fluidly connected to the air valve bore by fan air bore 62. The first and second flow passages are fluidly isolated from each other by air tube 82 such that air flowing within one of the passages does not mix with air flowing within the other passage and does not cross over between the passages. The fan air portion and the assist air portion are fluidly isolated at locations downstream of air valve cartridge 46. The fan air portion and the assist air portion are fluidly isolated from one another at locations downstream of first valve member 78. The fan air portion and the assist air portion are fluidly isolated between air valve cartridge 46 and air cap 16.

Fluid valve bore 48 and air valve bore 50 are disposed coaxially on spray axis A. Fluid valve cartridge 44 and air valve cartridge 46 are disposed coaxially on spray axis A. Fluid valve member 76 and first valve member 78 are disposed coaxially on spray axis A. First valve member 78 and second valve member 80 are disposed coaxially on spray axis A.

The fluid control components of spray gun 10 are disposed in and supported by the front block 52 and the air control components of spray gun 10 are disposed in and supported by the rear block 54 of spray gun 10. The valve members and return springs for each of fluid valve cartridge 44 and air valve cartridge 46 are formed as a part of the cartridge. Each of the flow control components is disposed on the same side of trigger 14 for each of the spray fluid flow and the air flow. As such, all of the spray fluid contacting flow control components (e.g., fluid valve member 76) are disposed on one axial side of the trigger 14. All of the air contacting flow control components (e.g., first valve member 78 and second valve member 80) are disposed on one axial side of the trigger 14. In the example shown, all of the spray fluid flow control components are disposed on an opposite axial side of trigger 14 from all of the air flow control components. Fluid control components are not disposed in air valve bore 50 and air control components are not disposed in fluid valve bore 48.

Trigger 14 is mounted to gun body 12. Trigger 14 is configured to control actuation of first valve member 78 and fluid valve member 76. Trigger 14 is spaced from handle 26 and disposed between fluid cartridge body 122 and air cartridge body 88. A portion of fluid valve member 76 extends through trigger 14. In the example shown, a portion of actuator shaft 142 extends through trigger 14. Coupler 86 is disposed around that portion of fluid valve member 76 disposed on the same side of trigger 14 as air valve cartridge 46. Coupler 86 is mounted on and, in some examples, can be connected to an end of first valve member 78. Coupler 86 is configured to interface with trigger 14 and first valve member 78 to actuate first valve member 78 from a closed state to an open state. Coupler 86 is configured to interface with trigger 14 and fluid valve member 76 to actuate fluid valve member 76 from a closed state to an open state.

As best seen in FIG. 4B, spray tip 18 is disposed within air cap 16. Spray tip 18 can interface with an end of fluid valve cartridge 44 to seal the fluid flowpath therebetween. In the example shown, a seal within spray tip 18 interfaces with a nozzle extending from tip mount 130 of fluid cartridge body 122. Air cap 16 is disposed about an end of fluid valve cartridge 44. In the example shown, air cap 16 axially overlaps with tip mount 130 of fluid cartridge body 122. In the example shown, air cap 16 does not axially overlap with fluid valve 124.

Collar 20 interfaces with air cap 16 and an end of gun body 12. Collar 20 retains air cap 16 in position relative fluid valve cartridge 44 and connects air cap 16 to gun body 12. In the example shown, collar 20 includes a threaded interface. It is understood, however, that collar 20 can be a quick-connect collar 20, as discussed in more detail below.

Mount block 66 is configured to fit within mount slot 56. Mount slot 56 is configured to receive mount block 66. Fluid valve cartridge 44 extends into and through fluid valve bore 48. Mount bore 70 of fluid valve bore 48 is formed through fluid mount block 66. Fluid valve bore 48 includes forward bore 72 formed in gun body 12. Spray fluid can flow through forward bore 72 between spray fluid inlet 68 and spray tip 18. Fluid valve bore 48 includes rear bore 74 formed in gun body 12 and through which a portion of fluid cartridge body 122 extends. Fluid valve bore 48 includes mount bore 70 formed through mount block 66. Fluid valve cartridge 44 extends through each of the forward bore 72, mount bore 70, and rear bore 74.

Fluid cartridge body 122 is mounted to gun body 12 by second interface 128. For example, second interface 128 can be formed by interfaced threading formed on fluid cartridge body 122 and gun body 12. In some examples, second interface 128 is the only fixed interface between fluid valve cartridge 44 and gun body 12. In the example shown, second interface 128 is formed in forward bore 72. In the example shown, fluid cartridge body 122 is formed by tip mount 130, fluid housing 132, and spring housing 134. Both spray fluid and air can flow through fluid valve cartridge 44. For example, air flow paths can extend through a portion of tip mount 130 and can be spaced radially outside of a central spray fluid flowpath. At least a portion of each of the air and spray fluid flowpaths can be formed in tip mount 130.

All components of fluid valve cartridge 44 are removable together as a single piece and do not require separate removal from fluid valve bore 48 and gun body 12. The various components of fluid valve cartridge 44 are connected to each other independent of gun body 12 and other parts of spray gun 10. As such, fluid valve cartridge 44 can be mounted to and dismounted from spray gun 10 as a single piece. For example, the various components of fluid valve cartridge 44 can be threaded or press fit to hold the components together, such that the components stay together regardless of the orientation of fluid valve cartridge 44 (e.g., the components do not freely slide apart). In some examples, the components forming fluid cartridge body 122 can be permanently assembled such that fluid cartridge body 122 can be considered to be a unitary component insertable into and removable from spray gun body 12. For example, the components can be brazed, welded, press-fit, glued, etc. Fluid valve cartridge 44 remains a unitary part when outside of gun body 12 such that the various components of fluid valve cartridge 44 do not freely separate.

Fluid valve cartridge 44 supports fluid mount block 66 within gun body 12. Fluid valve cartridge 44 can retain fluid mount block 66 within gun body 12. Fluid cartridge body 122 spans between forward bore 72 and rear bore 74 formed in gun body 12 and through mount bore 70 in mount block 66. Mount block 66 is fixed within mount slot 56 by fluid valve cartridge 44 forming a support beam through mount block 66 and between forward bore 72 and rear bore 74. Both fluid valve cartridge 44 and mount block 66 can be considered to be attached to gun body 12 by second interface 128. As such, mount block 66 is retained within gun body 12 but is not directly connected to gun body 12.

A sealing interface between fluid valve cartridge 44 and fluid valve bore 48 is formed within mount block 66 and between mount block 66 and fluid cartridge body 122. Spray fluid is provided through spray fluid inlet 68 formed in mount block 66 and flows to an interior of mount block 66. The spray fluid enters fluid cartridge body 122 through fluid inlet ports 136 formed in fluid cartridge body 122. In the example shown, fluid inlet ports 136 are formed in fluid housing 132. Seal grooves are formed on fluid housing 132 and receive sealing members, such as elastomer o-rings, for interfacing with mount block 66 to seal the fluid chamber formed between the interior wall of mount block 66 and the exterior surface of fluid cartridge body 122.

Seal assembly 126 is disposed within fluid housing 132. Fluid valve member 76 extends through seal assembly 126. Seal assembly 126 can include one or more seals configured to prevent fluid from flowing outside of fluid housing 132 to spring housing 134 and configured to wipe fluid from needle 140 during actuation of needle 140. Fluid valve member 76 extends between trigger 14 and fluid seat 138. Fluid valve member 76 is actuatable between an open state and a closed state. In the open state, fluid valve member 76 is spaced from fluid seat 138 to open a flowpath for spray fluid to exit fluid valve cartridge 44 and flow to and through spray tip 18 to generate the fluid spray. In the closed state, fluid valve seal 144 interfaces with fluid seat 138 to close the flowpath and prevent fluid from exiting fluid valve cartridge 44.

Fluid valve seal 144 is formed at the distal, cantilevered end of needle 140. Fluid valve seal 144 can be formed in any desired manner, such as by a ball mounted to the needle 140. It is understood, however, that other forms of valve seal 144 are possible, such as a cone. Fluid valve seal 144 can be formed from a metal, among other options. For example, fluid valve seal 144 can be formed from stainless steel, among other options. Fluid seat 138 can be formed as part of fluid cartridge body 122 or as a separate component. Fluid valve 124 is defined by fluid valve seal 144 and fluid seat 138.

Needle 140 extends through the fluid chamber formed in fluid cartridge body 122. Needle 140 extends outside of the fluid chamber and interfaces with actuator shaft 142. Needle 140 is fixed to actuator shaft 142 to move with actuator shaft 142. Actuator shaft 142 is disposed at least partially within spring housing 134 and extends outside of spring housing 134. Actuator shaft 142 extends through trigger 14. Actuator shaft 142 extends through an opening in trigger 14, such as a slot, among other options. The slot is sized such that trigger 14 can move relative to actuator shaft 142 without engaging actuator shaft 142. Actuator shaft 142 extends into receiving chamber 116 formed in the end of first valve member 78.

Actuator spring 154 is disposed within spring housing 134. Actuator spring 154 interfaces with actuator shaft 142 to bias actuator shaft 142 towards fluid housing 132, thereby biasing fluid valve member 76 towards the closed position. Actuator spring 154 drives fluid valve member 76 from the open state to the closed state. Actuator spring 154 returns fluid valve member 76 to the closed state to stop fluid flow downstream out of fluid valve cartridge 44 when trigger 14 is released. Spray fluid is prevented from flowing downstream from fluid valve cartridge 44 with fluid valve 124 in the closed state.

As best seen in FIG. 4C, air valve cartridge 46 is disposed within air valve bore 50 of gun body 12. Air cartridge body 88 is mounted to gun body 12 by first interface 98. For example, first interface 98 can be formed by interfaced threading formed on air cartridge body 88 and gun body 12. In some examples, first interface 98 is the only fixed interface between air valve cartridge 46 and gun body 12. In the example shown, first interface 98 is formed in air valve bore 50. In the example shown, each of fan air bore 62 and assist air bore 60 are disposed on the same axial side of first interface 98. In the example shown, fan air bore 62 and assist air bore 60 are disposed axially, relative to spray axis A, between first interface 98 and second interface 128. It is understood, however, that first interface 98 can be disposed at various positions along air valve bore 50. For example, first interface 98 can be formed at a location axially between the locations where fan air bore 62 and assist air bore 60 extend from air valve bore 50. In some examples, the locations where fan air bore 62 and assist air bore 60 intersect air valve bore 50 are disposed on an opposite axial side of first interface 98 from second interface 128.

All components of air valve cartridge 46 are removable together as a single piece and do not require separate removal from air valve bore 50 or gun body 12. The various components of air valve cartridge 46 are connected to each other independent of gun body 12 and other parts of spray gun 10. In some examples, multiple components can form air cartridge body 88 and the components forming air cartridge body 88 can be permanently assembled such that air cartridge body 88 can be considered to be a unitary component. In the example shown, air cartridge body 88 is formed as a single component. In examples where air cartridge body 88 is formed from multiple components, the components can be threaded, brazed, welded, press-fit, glued, etc. to hold the components together, such that the components stay together regardless of the orientation of air valve cartridge 46 (e.g., the components do not freely slide apart). In some examples, the connection can be a permanent connection. Air valve cartridge 46 remains a unitary part when outside of gun body 12 such that the various components of air valve cartridge 46 do not freely separate.

A sealing interface is formed between air valve cartridge 46 and air valve bore 50. Compressed air is provided through inlet bore 58 formed in handle 26 and flows into an interior of air valve bore 50. The air can enter air cartridge body 88 through one or more inlet ports 100. In the example shown, inlet port 100 is axially oriented towards the front end of spray gun 10. One or more seal grooves can be formed on air cartridge body 88 to receive seals for interfacing with gun body 12 to seal the air chamber formed between the interior wall of air valve bore 50 and the exterior surface of air cartridge body 88. In the example shown, air cartridge body 88 includes two annular seal grooves disposed on opposite axial sides of outlet ports 102. Air outlet ports 102 can, in some examples, be disposed generally radially such that the fan air flowing out of air valve cartridge 46 is a generally radial flow.

First valve member 78 is configured to control flows of fan air and assist air downstream from the inlet air chamber in air valve cartridge 46. Second valve member 80 is configured to control the flow of fan air downstream of air valve cartridge 46. The assist air can flow downstream from air valve cartridge 46 with the first valve member 78 in an open state and the second valve member 80 in either of an open state and a closed state. The fan air can flow downstream from air valve cartridge 46 with the first valve member 78 in the open state and the second valve member 80 in the open state. The fan air portion thereby requires multiple valves to be simultaneously open while the assist air portion requires a single valve to be open.

First valve member 78 is at least partially disposed within air cartridge body 88 and is actuatable along spray axis A and relative to air cartridge body 88. First valve member 78 actuating to an open state opens flowpaths through both first valve 90 and second valve 92. Return spring 108 extends between air cartridge body 88 and first valve member 78 and interfaces with both air cartridge body 88 and first valve member 78. Return spring 108 is configured to bias first valve member 78 towards a closed state. In the example shown, return spring 108 is disposed outside of air cartridge body 88. It is understood, however, that return spring 108 can be wholly or partially disposed within air cartridge body 88, in other examples.

In the example shown, first valve seal 110 is formed by a portion of first valve member 78. In the example shown, second valve seal 112 is formed by a portion of first valve member 78. The first valve seal 110 and second valve seal 112 can be formed as enlargements of first valve member 78 relative to the spray axis A. First valve seal 110 and second valve seal 112 can project generally radially. In the example shown, first valve seal 110 is formed as a generally conical enlargement of first valve member 78. First valve seal 110 is configured to interface with gun body 12 when in the closed state. In the example shown, a seal groove is formed on an exterior surface of the first valve seal 110. A seal is disposed in the seal groove to interface with the portion of the gun body 12 and form the fluid-tight seal between first valve seal 110 and gun body 12. In the example shown, the seal is a U-cup seal, through it is understood that other options are possible.

Second valve seal 112 is disposed at an end of first valve member 78 opposite first valve seal 110. Second valve seal 112 is formed as a bulb extending radially relative to the main body of first valve member 78. In the example shown, second valve seal 112 connects first valve member 78 to cartridge body 88 to maintain air valve cartridge 46 as a single assembly even when removed from gun body 12. In the example shown, a largest diameter D1 of the bulb forming second valve seal 112 is larger than the diameter D2 in cartridge body 88. Second valve seal 112 can be formed from a resilient material configured to deform and return to its nominal size and shape after deformation. For example, second valve seal 112 (or all of first valve member 78) can be formed from a plastic, among other options. First valve member 78 can be connected to cartridge body 88 by inserting second valve seal 112 into cartridge body 88 through port 100. The smaller diameter D2 causes the resilient second valve seal 112 to deform as second valve seal 112 passes by the smaller diameter D2 portion of cartridge body 88. The resilient second valve seal 112 returns to its nominal shape and size after passing by the diameter D1 portion of cartridge body 88. The larger smaller diameter portion of cartridge body 88 retains the larger diameter portion of second valve seal 112 within cartridge body. As such, first valve member 78 can be pressed into cartridge body 88. As shown, a sealing member, such as an elastomer o-ring, is disposed in a seal groove formed on second valve seal 112. The seal groove is has two walls on each axial side of the seal groove. In the example shown, one of the walls extends further radially than the other wall. In the example shown, the wall on the rear end of the bulb, which can form the larger diameter D1, extends further from the body of first valve member 78 than the front wall.

In the example shown, return spring 108 interfaces with a side of first valve seal 110 opposite the sealing face of first valve seal 110. Return spring 108 is configured such that the spring force is sufficient to return first valve member 78 to the closed position (shown in FIG. 4C), but the spring force is not sufficient to cause second valve seal 112 to pass out of cartridge body 88. It is understood that first valve seal 110 and second valve seal 112 can be formed in any desired manner suitable for controlling airflow and can be formed in different manners relative to each other. Each of first valve seal 110 and second valve seal 112 can include a sloped face. The sloped faces can be oriented in the same axial direction. The sloped faces facilitate sealing. In the example shown, seals are mounted on each of first valve seal 110 and second valve seal 112. Seal grooves can be formed on each of first valve seal 110 and second valve seal 112. It is understood that, in some examples, first valve seal 110 and second valve seal 112 can directly interface with first seat 104 and second seat 106, respectively, with first valve member 78 in the closed state. In the example shown, the elastomer seal disposed on first valve seal 110 is a u-cup seal and the elastomer seal disposed on second valve seal 112 is an o-ring seal, though it is understood that other configurations are possible.

First seat 104 is formed by gun body 12. First seat 104 is disposed at a first end of cartridge bore 50 opposite second valve member 80. While first seat 104 is shown as formed by gun body 12 it is understood that first seat 104 can be formed by a separate component mounted within spray gun 10. For example, first seat 104 can be formed by a portion of air cartridge body 88 or another component disposed within and/or supported by air cartridge body 88. In some example, first seat 104 can be formed by a component separate from air cartridge body 88 and disposed within cartridge bore 50. First valve 90 is defined by first valve seal 110 and first seat 104. An assist air outlet flowpath is formed through first valve 90 between first valve seal 110 and first seat 104 with first valve 90 in the open state. The assist air outlet flowpath is oriented generally axially.

First valve member 78 extends into and at least partially axially overlaps with air cartridge body 88. Second seat 106 is formed by air cartridge body 88. In the example shown, second valve seal 112 interfaces with air cartridge body 88 to control air flow through second valve 92. Second valve 92 is defined by second valve seal 112 and second seat 106.

Drive shaft 114 is a portion of first valve member 78 that extends axially forward out of air valve bore 50. Drive shaft 114 extends through throat seal 148. Throat seal 148 maintains pressurization within air valve bore 50 downstream of first valve seal 110. In the example shown, throat seal 148 is a u-cup seal. The distal end of drive shaft 114 is disposed outside of air valve bore 50. Receiving chamber 116 is formed within drive shaft 114.

Actuator shaft 142 extends out of spring housing 134 and into receiving chamber 116. Coupler 86 is disposed about the actuator shaft 142 and interfaces with drive shaft 114 of first valve member 78. Coupler 86 is movable with drive shaft 114 relative to actuator shaft 142. In some examples, coupler 86 can free float on actuator shaft 142 between the distal end of drive shaft 114 and trigger 14. Both of fluid valve member 76 and first valve member 78 can float relative to coupler 86 during at least a portion of the trigger pull range. In some examples, coupler 86 can be fixed to drive shaft 114, such as by interfaced threading. Fluid valve member 76 can thereby float relative to coupler 86 while first valve member 78 is fixed to coupler 86.

Second valve member 80 is disposed at least partially within air cartridge body 88. In the example shown, third valve seal 120 is disposed within air cartridge body 88 and valve actuator 121 extends from third valve seal 120. Valve actuator 121 is configured to shift third valve seal 120 axially to move second valve member 80 between the open and closed states. Third valve 94 is formed within air cartridge body 88. In the example shown, the distal end of second valve member 80 forms the third valve seal 120 and the air cartridge body 88 forms third seat 118. Third valve 94 is defined by third valve seal 120 and third seat 118.

Second valve member 80 is configured to interface with third seat 118 with second valve member 80 in the closed state. More specifically, third valve seal 120 is configured to interface with air cartridge body 88 to form the third valve 94. Second valve member 80 can directly contact and interface with air cartridge body 88 with third valve 94 in the closed state. Third valve 94 can thus be defined by a hard contact (e.g., directly between air cartridge body 88 and second valve member 80) rather than by a soft seal, such as an elastomer seal. It is understood, however, that third valve 94 can be formed in any desired manner. Third valve seal 120 is formed at an end of second valve member 80. Third valve seal 120 can include an angled surface (e.g., not orthogonal or parallel to spray axis A) on second valve member 80 for interfacing with cartridge body 88 to form third valve 94. For example, the sealing face of third valve seal 120 can be formed by a shoulder of second valve member 80. In the examples shown, third valve seal 120 is formed by a plug mounted to valve shaft 121. Second valve member 80 is spaced from third seat 118 with third valve 94 in the open state.

Second valve member 80 is supported by air cartridge body 88 and is unaffected by a pull of trigger 14. Second valve member 80 can, in some examples, be connected to air cartridge body 88, such as by interfaced threading, among other options. As discussed in more detail below, third valve seal 120 includes outer contouring configured to interface with inner contouring in air cartridge body 88 to prevent third valve seal 120 from rotating about axis A.

Second valve member 80 is movable relative to gun body 12. Valve actuator 121 is connected to third valve seal 120 and extends rearward through air cartridge body 88. Valve actuator 121 is configured to shift the position of third valve seal 120 to change a size of the opening through third valve 94. In the example shown, valve actuator 121 is connected to third valve seal 120 by interfaced threading. Valve actuator 121 is connected to knob 22 by fastener 84. A seal groove can be formed on an outer radial surface of second valve member 80. In the example shown, the seal groove is formed on valve shaft 121 and a seal, such as an elastomer o-ring, is disposed in the seal groove to interface with an interior surface of air cartridge body 88 and prevent airflow around second valve member 80 and out of air cartridge body 88.

The interface between second valve member 80 and air cartridge body 88 facilitates actuation of second valve member 80 relative to third seat 118 to change a size of the opening through third valve 94. For example, valve actuator 121 can be rotated relative to air valve bore 50 (e.g., in one of a clockwise and counterclockwise direction) to thread third valve seal 120 further onto valve actuator 121 and widen and/or open a flowpath through third valve 94 between second valve member 80 and third seat 118. Valve actuator 121 can be rotated in the other rotational direction (e.g., the other of the clockwise and counterclockwise direction) to cause third valve seal 120 to shift axially and thereby narrow and/or close the flowpath through third valve 94. The keyed interface between cartridge body 88 and third valve seal 120 prevents rotation of third valve seal 120 when valve actuator 121 is rotated, thereby causing the linear movement as third valve seal 120 threads onto and off of valve actuator 121.

Air outlet ports 102 extend through air cartridge body 88 and provide a flowpath for fan air to exit air valve cartridge 46. Air outlet ports 102 are disposed generally radially such that the fan air flow exiting air valve cartridge 46 is generally radial. In the example shown, air outlet ports 102 are canted forward between the inlet, formed on the interior of air cartridge body 88, and the outlet, formed on the exterior of air cartridge body 88. The outlets of air outlet ports 102 are disposed axially between first interface 98 and the seal grooves formed about air cartridge body 88. In some examples, air valve cartridge 46 can include an annular array of air outlet ports 102.

Knob 22 is supported by air valve cartridge 46. Knob 22 is disposed outside of gun body 12 and is accessible by the user. In the example shown, knob 22 is fixedly connected to second valve member 80 such that the position of second valve member 80 can be adjusted by grasping and manipulating knob 22. For example, knob 22 can be rotated to rotate valve actuator 121. In the example shown, a detent 123 interfaces with a depression 125 to fix a rotational position of knob 22, thereby fixing a size of the opening through third valve 94. In the example shown, detent 123 is fixed to knob 22 and depression 125 is formed on air cartridge body 88. As discussed in more detail below, an array of depressions 125 can be formed on air valve body 88 such that knob 22 can be set in a plurality of positions associated with different sizes of openings through third valve 94. In some examples, knob 22 is freely mounted such that rotation of knob 22 does not affect the position of second valve member 80.

Knob 22 projects rearward relative to gun body 12. Knob 22 is not a permanent part of spray gun 10 or gun body 12. Knob 22 may not be a permanent component on air valve cartridge 46. In some examples, gun body 12 does not include tail 27 such that gun body 12 does not include an integral or otherwise permanent projection extending rearward to interface with the user's hand. Knob 22 can be sized to position the user's hand at the appropriate location along the handle 26 to efficiently and ergonomically actuate trigger 14 while grasping handle 26, in such examples. In some examples, knob 22 can be removed and replaced with a knob 22 of the same or different dimensions.

As best seen in FIG. 4D, a radial gap RG1 is disposed between actuator shaft 142 and the wall of receiving chamber 116. Radial gap RG1 is an annular gap extending around actuator shaft 142 between actuator shaft 142 and the wall of drive shaft 114 defining chamber 116. Radial gap RG1 compensates for any axial misalignment between fluid valve cartridge 44 and air valve cartridge 46. Radial gap RG1 minimizes adverse effects that can be caused by stack-up errors in valve assemblies. Fluid valve cartridge 44 and air valve cartridge 46 are preferably aligned coaxially and on spray axis A. The flow control components of fluid valve cartridge 44 are aligned on a fluid valve axis that is aligned on spray axis A by second interface 128. The air flow control components of air valve cartridge 46 are aligned on an air valve axis that is aligned on spray axis A by first interface 98. The fluid valve axis and air valve axis are preferably coaxially aligned by first interface 98 and second interface 128. The number of component interfaces is limited to two. Limiting the interface count facilitates alignment, preventing stack-up and concentricity errors from accumulating among multiple connections. The limited number of connections and large radial gap RG1 prevent contact between fluid valve member 76 and first valve member 78 that can cause wear and cause leaks. Radial gap RG1 is sized to allow for some misalignment between the fluid valve axis and the air valve axis and prevents undesired contact between actuator shaft 142 and drive shaft 114. The fluid valve axis and air valve axis can be slightly transverse without experiencing the undesired contact, such as up to 1, 2, 3, 4, 5, or more degrees transverse. One or both of the fluid valve axis and the air valve axis can be slightly transverse or axially offset relative the spray axis A without experiencing the undesired contact. In some examples, one or both of the fluid valve axis and the air valve axis can be up to 1, 2, 3, 4, 5, or more degrees transverse relative the spray axis A.

Axial gap AG1 is disposed between ring 152 and coupler 86 and axial gap AG2 is disposed between the distal end of actuator shaft 142 and the bottom (e.g., closed axial end) of receiving chamber 116. Axial gap AG1 facilitates lag between first valve member 78 shifting to the open state and fluid valve member 76 shifting to the open state. First valve member 78 shifts to the open state before fluid valve member 76. Spray gun 10 begins emitting air prior to spray gun 10 emitting spray fluid. Trigger 14 initially engages coupler 86 and exerts a force on first valve member 78 by coupler 86. First valve member 78 shifts open and axial gap AG1 decreases. Trigger 14, coupler 86, and first valve member 78 shift relative to actuator shaft 142 until coupler 86 encounters ring 152. Coupler 86 engages ring 152 and pulls first valve member 78 open. The air flow beginning prior to the spray fluid flow ensures that the atomizing air is already flowing, preventing spitting and uneven pattern when spraying is initiated, improving atomization, and preventing fluid buildup on the air cap 16.

Axial gap AG2 prevents undesired contact between the bottom of receiving chamber 116 and actuator shaft 142 as fluid valve member 76 and first valve member 78 shift to respective closed states when trigger 14 is released. Fluid valve member 76 is actuated to the closed state by actuator spring 154. First valve member 78 is actuated to the closed state by return spring 108. Actuator spring 154 can be sized to have a higher spring rate than return spring 108. The higher spring rate facilitates fluid valve member 76 closing prior to or simultaneously with first valve member 78 closing. First valve member 78 is actuated a further axial distance between fully closed and fully open than fluid valve member 76 is actuated between fully closed and fully open. As such, fluid valve member 76 has a shorter travel distance to return to the closed state. Spray gun 10 is thereby configured such that the flow of spray fluid stops prior to the flow of air. The flow of spray fluid stopping prior to the flows of air stopping ensures that the atomizing air continues to flow until the spray fluid stops, preventing tailing at the end of the spray, preventing spray fluid buildup on the air cap 16, and preventing clogging of any air ejection openings of spray gun 10 (e.g., through air cap 16).

Air valve cartridge 46 and fluid valve cartridge 44 facilitate quick and efficient operation, repair, and replacement of the flow control (air and spray fluid) components of spray gun 10. The air valve cartridge 46 can be removed and replaced as a single component. The fluid valve cartridge 44 can be removed and replaced as a single component. The user does not have to locate and keep track of various small and disparate parts and can instead simply remove and replace the full cartridge assembly. Air valve cartridge 46 and fluid valve cartridge 44 thereby reduce downtime and improve spray efficiency and operations.

During disassembly, trigger 14 can be removed from between coupler 86 and spring housing 134. Coupler 86 can be disconnected from drive shaft 114 in examples where coupler 86 is connected to drive shaft 114. A portion 89 of air cartridge body 88 extends out of air valve bore 50 and can be manipulated to disconnect first interface 98. In some examples, the portion 89 of air cartridge body 88 can include a contour to facilitate a tool interface or texturing to facilitate gripping, among other options. For example, the surface can be configured to be grasped by a wrench. In some examples, air valve cartridge 46 can be configured to be installed and removed toollessly, such that a user can grasp and manipulate air valve cartridge 46 by hand without the use of a tool. For example, the surface of portion 89 can be knurled, grooved, pebbled, or otherwise textured or contoured. As such, first interface 98 can be a toolless interface.

Air cartridge body 88 is detached from gun body 12 at first interface 98. Air valve cartridge 46 can be pulled axially rearward away from trigger 14 and removed from air valve bore 50 and gun body 12. It is understood that air valve cartridge 46 can be removed from air valve bore 50 and gun body 12 while trigger 14 and fluid valve cartridge 44 remain mounted to spray gun 10 in their operational positions. The same or a new air valve cartridge 46 can be installed in gun body 12. Air valve cartridge 46 is inserted into air valve bore 50 from a rear end 30 of gun body 12. Drive shaft 114 extends through throat seal 148 and out of the front end of air valve bore 50. Air cartridge body 88 is connected to gun body 12 at first interface 98. For example, air cartridge body 88 can be rotated to engage interfaced threading between air cartridge body 88 and gun body 12. The air flow control components of spray gun 10 have thus been fully removed and replaced.

Fluid valve cartridge 44 can be removed and replaced similar to air valve cartridge 46. Collar 20, air cap 16, and spray tip 18 are removed from spray gun 10. Trigger 14 is disconnected from gun body 12 or otherwise moved so coupler 86 can pass from the rear side to the front side of trigger 14. Removing collar 20 and air cap 16 exposes an end of fluid valve cartridge 44. In some examples, the portion of fluid cartridge body 122 exposed and, in some examples, extending out of the front end of gun body 12 can include a contour to facilitate a tool interface or texturing to facilitate gripping, among other options. For example, the surface can be contoured to be grasped by a wrench. In some examples, fluid valve cartridge 44 can be configured to be installed and removed toollessly, such that a user can grasp and manipulate fluid valve cartridge 44 by hand without the use of a tool. For example, the surface can be knurled, grooved, pebbled, or otherwise contoured or textured. As such, second interface 128 can be a toolless interface.

Fluid cartridge body 122 is detached from gun body 12 at second interface 128. Fluid valve cartridge 44 can be pulled axially forward away from trigger 14 and removed from gun body 12 and fluid valve bore 48. Fluid valve cartridge 44 is removed through front end 28 of gun body 12. The same or a new fluid valve cartridge 44 can be installed on gun body 12. Removing fluid valve cartridge 44 decouples mount block 66 such that fluid tube assembly can be removed and serviced and/or replaced with fluid valve cartridge 44 removed.

During mounting, the same or a different fluid valve cartridge 44 is inserted into fluid valve bore 48 from a front end 28 of gun body 12. Spring housing 134 extends out of a rear end of fluid valve bore 48. Actuator shaft 142 extends out of spring housing 134 and into receiving chamber 116 formed in drive shaft 114. Fluid cartridge body 122 is connected to gun body 12 at second interface 128. For example, fluid cartridge body 122 can be rotated to engage interfaced threading between fluid cartridge body 122 and gun body 12. Trigger 14, spray tip 18, air cap 16, and collar 20 can be reinstalled. Trigger 14 is attached to gun body 12 such that coupler 86 is disposed between trigger 14 and drive shaft 114. In some examples, coupler 86 can be connected to the end of drive shaft 114. The spray fluid flow control components of spray gun 10 have thus been fully removed and replaced and spray gun 10 is ready to resume operation.

During spraying, spray fluid and compressed air are provided to spray gun 10. The spray fluid is provided through the fluid tubing and enters mount block 66 through spray fluid inlet 68. The spray fluid enters the interior of fluid valve cartridge 44 from mount bore 70 through fluid inlet ports 136. Fluid valve seal 144 is engaged with fluid seat 138 and prevents the spray fluid from flowing downstream from fluid valve cartridge 44. The compressed air is provided through air inlet bore 58 through handle 26. The compressed air enters the air chamber in air valve bore 50 and a portion can enter air valve cartridge 46 through air inlet port 100. First valve seal 110 is engaged with first seat 104 and prevents the assist air portion from flowing downstream from air valve cartridge 46. Second valve seal 112 is engaged with second seat 106 and prevents the fan air portion from flowing downstream to third valve 94. Second valve member 80 is disposed at a desired location relative third seat 118 to set the size of the opening through third valve 94, and thus control the fan air flow. Third valve 94 remains open or closed regardless of the position of trigger 14.

The user grasps handle 26 and grasps trigger 14 to pull trigger 14 towards handle 26. Trigger 14 moves relative to actuator shaft 142 and engages coupler 86. Coupler 86 interfaces with the distal end of drive shaft 114 and drives first valve member 78 rearward relative to gun body 12 and air cartridge body 88. First valve 90 and second valve 92 shift to respective open states. In the example shown, first valve 90 and second valve 92 simultaneously shift to their respective open states.

An assist air portion of the compressed air exits air valve cartridge 46 through first valve 90 and flows to assist air bore 60. The assist air portion flows through feed air bore 64 and through gun body 12 to air cap 16. The assist air is emitted through air cap 16.

A fan air portion of the compressed air flows through second valve 92 to third valve 94. If third valve 94 is in a closed state, then the fan air portion is prevented from flowing to fan air bore 62 and no fan air is emitted from spray gun. If third valve 94 is in an open state, then the fan air portion flows through third valve 94 and exits air cartridge body 88 through air outlet ports 102. The fan air portion flows through fan air bore 62 and into air tube 82 within feed air bore 64. The fan air portion flows through air tube 82 and through bores in fluid cartridge body 122 and is emitted proximate spray tip 18. The fan air portion controls the width of the spray fan emitted by spray gun 10. The position of second valve member 80 controls the size of the opening through third valve 94 and varies the spray pattern between a flat fan and a round spray, depending on the flow volume of the fan air.

Trigger 14, coupler 86, and first valve member 78 continue to shift relative to actuator shaft 142 until coupler 86 engages ring 152. Trigger 14 engages each of first valve member 78 and fluid valve member 76 via coupler 86. With coupler 86 contacting ring 152, further depression of trigger 14 pulls fluid valve member 76 rearward, opening a flowpath through fluid valve 124. With fluid valve member 76 in the open state, the spray fluid exits fluid valve cartridge 44 and flows to spray tip 18. Spray tip 18 generates the fluid spray.

The user releases trigger 14 to stop spraying. Actuator spring 154 drives fluid valve member 76 back to the closed state. Fluid valve 124 is closed and the flow of spray fluid downstream of fluid valve cartridge 44 is stopped. Return spring 108 drives first valve member 78 back to the closed state. First valve 90 and second valve 92 are closed. First valve 90 being closed stops the flow of assist air downstream from air valve cartridge 46. Second valve 92 being closed stops the flow of fan air downstream from air valve cartridge 46. Third valve 94 can remain in an open state, thereby preserving the size of the restriction through third valve 94 and thus the desired spray pattern shape for the next trigger pull. First valve member 78 has to travel a larger axial distance between the open and closed states than fluid valve member 76 such that spray gun 10 stops emitting spray fluid before spray gun 10 stops emitting air. Actuator spring 154 can also have a higher spring rate than return spring 108 to cause fluid valve member 76 to close more quickly than first valve member 78. The continued flow of air after the spray fluid stops prevents undesired material buildup and clogging.

Spray gun 10 provides significant advantages. Fluid valve cartridge 44 contains the spray fluid control components of spray gun 10 while air valve cartridge 46 contains the air control components of spray gun 10. Fluid valve cartridge 44 and air valve cartridge 46 can each be individually removed and replaced as a single unit, simplifying and speeding replacement and servicing. First interface 98 is a single interface that holds each of the components of air valve cartridge 46 in place and in alignment during operation. Second interface 128 is a single interface that holds each of the components of fluid valve cartridge 44 in place and in alignment during operation. The single interfaces prevent alignment errors from stacking up during assembly, minimizing opportunity for misalignment. The full fluid valve cartridge 44 and/or air valve cartridge 46 can be stored as single units away from spray gun 10 and replaced as single units as needed.

Air valve cartridge 46 is a single unit that contains valving to control flows of both the assist air and the fan air. Combining the valving into a single unit eases service and provides improved aesthetics. Gun body 12 is configured for a more ergonomic and aesthetically pleasing look because only a single air valve bore is needed. Combining the assist air and fan air valving into a single assembly provides improved reliability and facilitates ease of repair and assembly. Combining the air and fan air valving into a single assembly further reduces part count and facilitates tracking and management of components, reducing downtime and part count, thereby decreasing costs associated with the downtime and increasing user confidence. The single assembly further simplifies installation of the air valving components, preventing misinstallation of air valving parts in incorrect portions of spray gun 10 or in incorrect orientations.

Figure 5A:
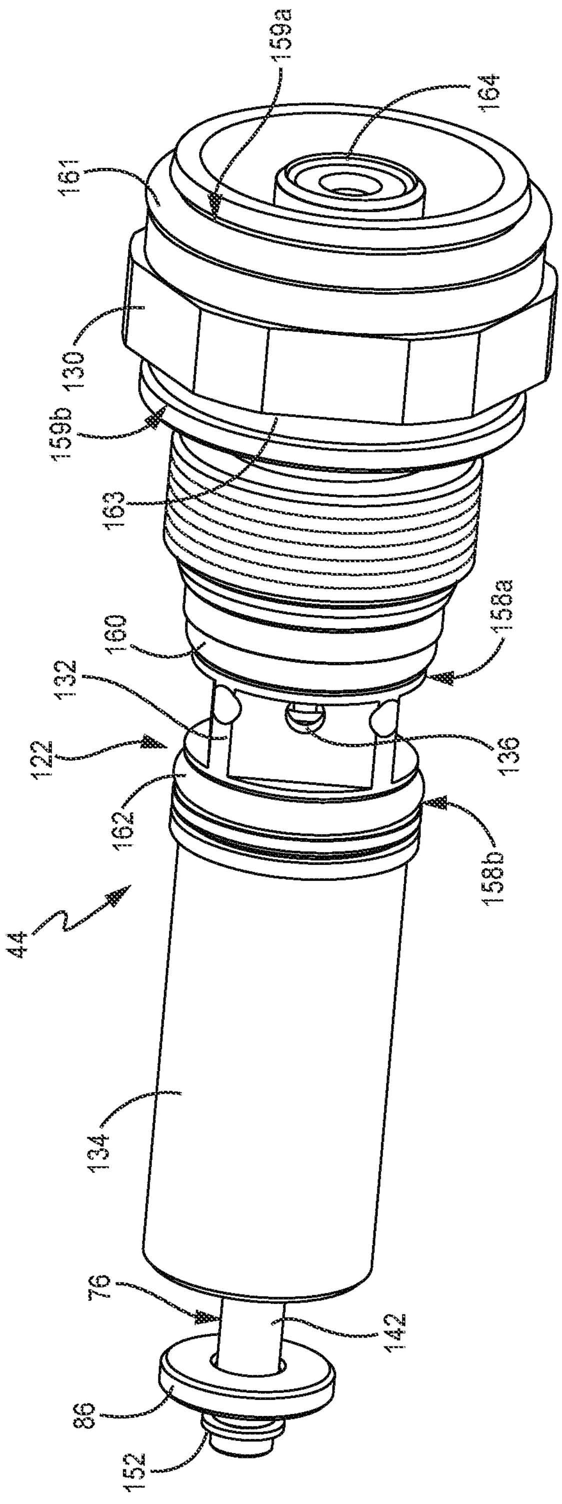
FIG. 5A is an isometric view of a fluid valve cartridge.
Figure 5B:
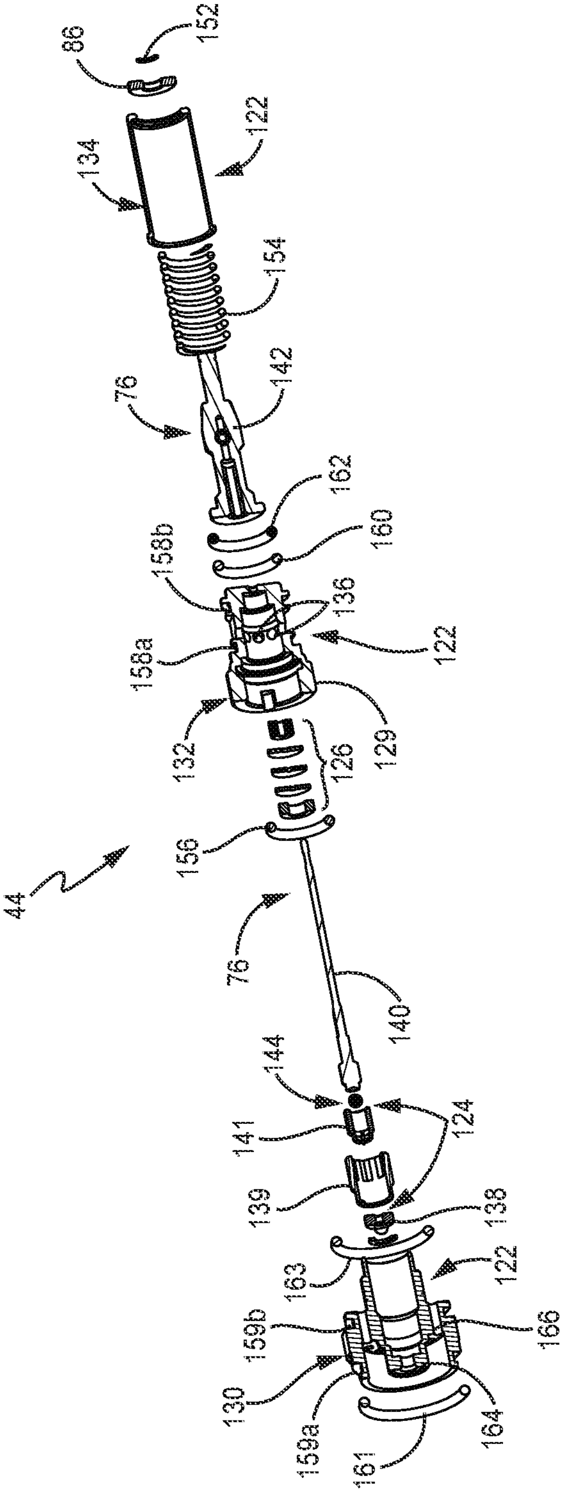
FIG. 5B is an exploded cross-sectional view of a fluid valve cartridge.

FIG. 5A is an isometric view of fluid valve cartridge 44. FIG. 5B is an exploded view of fluid valve cartridge 44. FIGS. 5A and 5B will be discussed together. Fluid valve cartridge 44 includes fluid valve member 76, coupler 86, fluid cartridge body 122, fluid valve 124, seal assembly 126, fluid valve connector 129, and actuator spring 154. Fluid cartridge body 122 includes tip mount 130, fluid housing 132, spring housing 134, and fluid inlet ports 136. Fluid valve 124 includes fluid valve member 76 and fluid seat 138. Fluid valve member 76 includes needle 140 and actuator shaft 142. Needle 140 includes fluid valve seal 144. Ring 152 is disposed on actuator shaft 142.

Tip mount 130 is connected to a first end of fluid housing 132 and spring housing 134 is connected to a second end of fluid housing 132 to form fluid cartridge body 122. A portion of tip mount 130 extends into fluid housing 132. Seal grooves 159*a*, 159*b* are disposed on the exterior of tip mount 130. Seal groove 159*a* contains a seal 161, such as an o-ring, configured to interface with air cap 16. Seal groove 159*b* contains a seal 163, such as an o-ring, configured to interface with gun body 12. In the example shown, both seal grooves 159*a*, 159*b* are disposed on the same side of fluid valve connector 129. Fluid valve connector 129 forms a portion of the second interface 128. Nozzle 164 extends from a front end of tip mount 130 and is configured to interface with spray tip 18. Nozzle 164 is a projection at least partially disposed in a cylindrical area defined by the housing formed by tip mount 130. Fan air openings 166 extend through tip mount 130 and provide pathways for fan air to flow through tip mount 130. The exterior surface of tip mount 130 can be configured to interface with a tool, such as a wrench, to facilitate connecting and disconnecting second interface 128 with gun body 12. First seal 156 is disposed between tip mount 130 and fluid housing 132. Seal grooves 158*a*, 158*b* are formed on an exterior of fluid housing 132 and are disposed on opposite axial sides of fluid inlet ports 136. In the example shown, both seal grooves 158*a*, 158*b* are disposed on the same axial side of fluid valve connector 129. Seal grooves 158*a*, 158*b* are disposed on an opposite axial side of fluid valve connector 129 from seal grooves 159*a*, 159*b*. Second seal 160 is disposed in seal groove 158*a* and third seal 162 is disposed in seal groove 158*b*. Fluid valve connector 129 is formed on an exterior of fluid housing 132 between seal groove 158*a* and tip mount 130. In the example shown, fluid valve connector 129 includes threading formed on an exterior of fluid housing 132 and configured to interface with threading within a bore of gun body 12. While fluid cartridge body 122 is described as including seal grooves 158*a*, 158*b*, it is understood that one or both of seal grooves 158*a*, 158*b* can be formed in mount block 66 such that the seals are mounted within mount block 66 and not on fluid cartridge body 122.

Fluid seat 138 is disposed within tip mount 130. Seat retainer 139 secures fluid seat 138 within tip mount 130. Seat retainer 139 can be connected to tip mount 130 in any desired manner, such as by interfaced threading. Seal assembly 126 is disposed within fluid housing 132 at an end of fluid housing 132 opposite tip mount 130. Needle 140 extends through seal assembly 126 to interface with actuator shaft 142. As shown, seal assembly 126 can include multiple seals assembled together. Fluid valve seal 144 is disposed at a distal end of needle 140 and configured to interface with fluid seat 138 with fluid valve 124 in the closed state. For example, fluid valve seal 144 can be retained on needle 140 by needle cap 141, among other options. Actuator shaft 142 is at least partially disposed in spring housing 134. Actuator spring 154 is disposed in spring housing 134 and interfaces with actuator shaft 142. Coupler 86 is disposed about the portion of actuator shaft 142 extending outside of spring housing 134. Ring 152 is mounted on actuator shaft 142 and retains coupler 86 on actuator shaft 142.

Figure 6A:
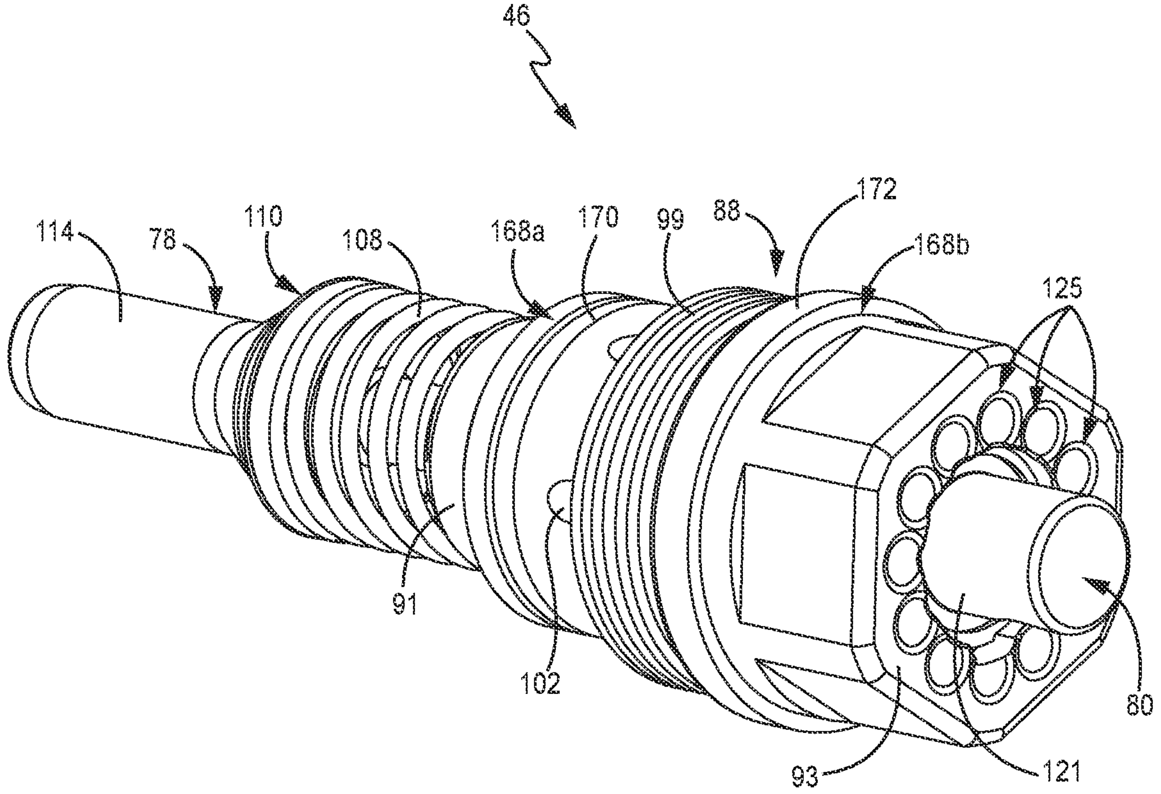
FIG. 6A is an isometric view of an air valve cartridge.
Figure 6B:
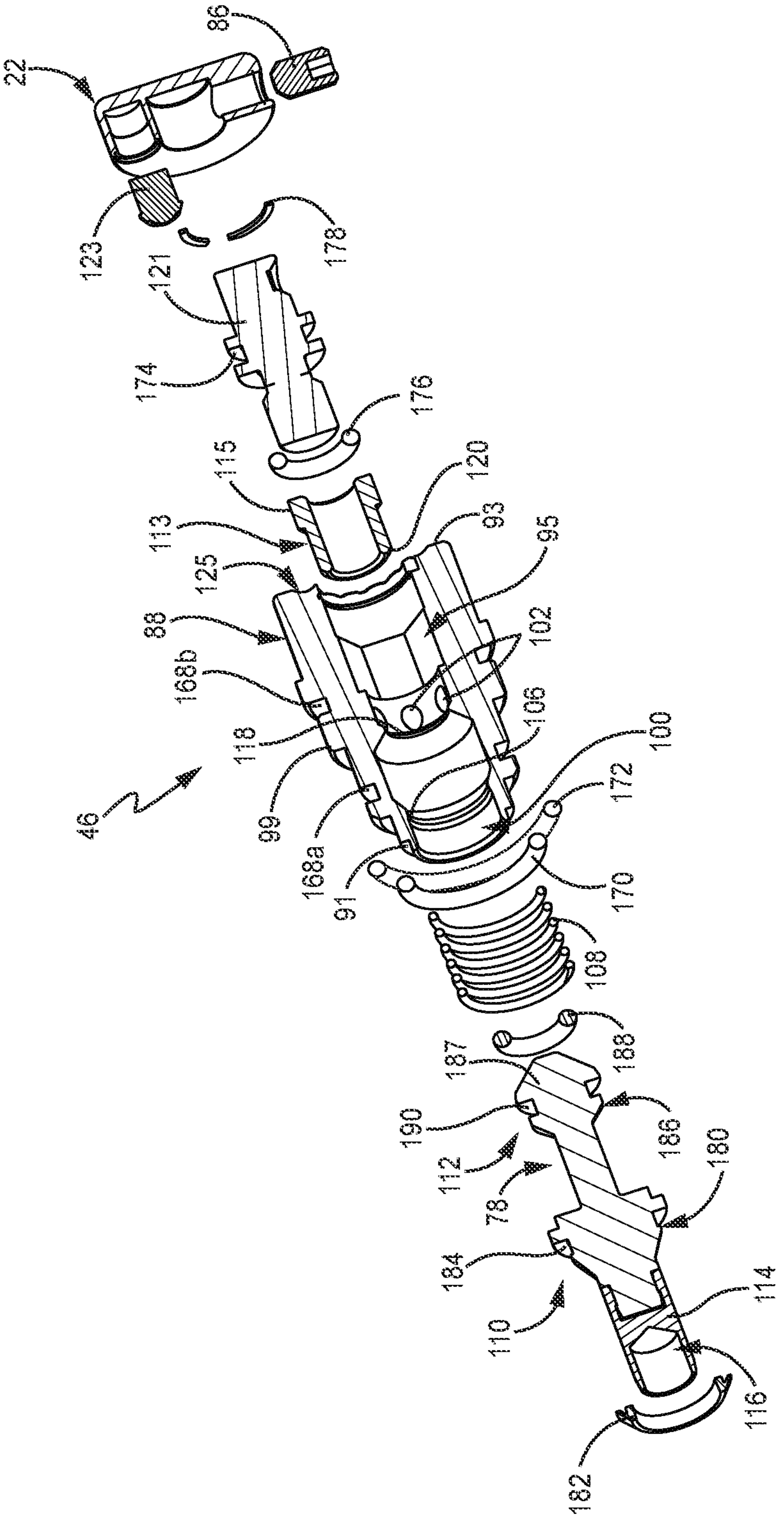
FIG. 6B is an exploded cross-sectional view of an air valve cartridge.

FIG. 6A is an isometric view of air valve cartridge 46. FIG. 6B is an isometric exploded cross-sectional view of air valve cartridge 46. FIGS. 6A and 6B will be discussed together. Air valve cartridge 46 includes first valve member 78, second valve member 80, air cartridge body 88, first valve 90, second valve 92, third valve 94, seat fitting 96, and air valve connector 99. Air cartridge body 88 includes first end 91, second end 93, air inlet port 100, air outlet ports 102, and air seal grooves 168*a*, 168*b*. First valve 90 is defined by first valve seal 110 and first seat 104. Second valve 92 is defined by second valve seal 112 and second seat 106. First valve member 78 includes first valve seal 110, second valve seal 112, drive shaft 114, and receiving chamber 116. Third valve 94 is defined by third valve seal 120, and third seat 118. Second valve member 80 includes third valve seal 120 and valve actuator 121.

Air inlet port 100 extends axially into an end of air cartridge body 88. Air outlet ports 102 extend through air cartridge body 88. Air seal groove 168*a* is disposed axially between air inlet port 100 and air outlet ports 102. Air seal groove 168*b* is disposed between air outlet ports 102 and first interface 98. Seals 170, 172 are configured to be disposed in seal grooves 168*a*, 168*b* respectively. While seal grooves 168*a*, 168*b* are described as formed on air cartridge body 88, it is understood that one or more of seal grooves 168*a*, 168*b* can be formed in air valve bore 50 of gun body 12 such that seals 170, 172 are mounted to gun body 12.

Seal 182 is mounted on first valve seal 110 and is configured to interface with gun body 12 to close first valve 90. Second seal 188 is mounted on second valve seal 112 and is configured to interface with air cartridge body 88 to close second valve 92.

Air valve connector 99 is formed on an exterior of air cartridge body 88. Air valve connector 99 forms a portion of first interface 98 and is configured to mount air valve cartridge 46 to gun body 12. Air valve connector 99 is formed axially between the second end 93 of air cartridge body 88 and the openings of air outlet ports 102 on the exterior of air cartridge body 88. Air valve connector 99 is formed by threading on the exterior of air cartridge body 88, though it is understood that other configurations are possible. The exterior surface of the second end 93 of air cartridge body 88 can be configured to interface with a tool, such as a wrench, to facilitate connecting and disconnecting second interface 128 within gun body 12. In the example shown, detent 123 is connected to knob 22 and depressions 125 are formed in second end 93 of air cartridge body 88. In the example shown, an array of depressions 125 is formed in the second end 93. Detent 123 interfaces with a depression 125 to maintain the position of knob 22 relative to air cartridge body 88. Detent 123 interfacing with a depression 125 prevents inadvertent rotation of knob 22, thereby setting the size of the opening through third valve 94.

First valve member 78 is disposed at least partially within air cartridge body 88. Return spring 108 extends between first end 91 of air cartridge body 88 and first valve seal 110 and biases first valve member 78 towards a closed state. First valve member 78 is at least partially disposed within air cartridge body 88 and is movable relative to air cartridge body 88. First valve seal 110 is formed by sloped projection 180 and seal 182. A back side of projection 180 interfaces with return spring 108. The portion of projection 180 interfacing with return spring 108 can also define seal groove 184. The seal 182 is mounted within the seal groove 184 formed on the projection 180. First valve seal 110 is configured to engage with first seat 104 when first valve 90 is closed. Second valve seal 112 is formed by sloped portion 186 of bulb 187 and by seal 188. The seal 188 is mounted within the seal groove 190 formed between the two axial faces of bulb 187, which axial faces are each sloped to form the radial projection of bulb 187. Second valve seal 112 is configured to engage with second seat 106 formed in air cartridge body 88 when second valve 92 is in the closed state. In the example shown, seal 182 is a cup seal and seal 184 is an ring seal, though it is understood that other seal options are possible. While first valve seal 110 and second valve seal 112 are shown as including sloped portions, it is understood that other configurations are possible.

Second valve member 80 is disposed at least partially in the second end 93 of air cartridge body 88. Second valve member 80 is configured to interface with a portion of air cartridge body 88 forming third seat 118 with third valve 94 in a closed state and is configured to be spaced from that portion of the air cartridge body 88 forming third seat 118 with third valve 94 in an open state. A seal groove 174 is formed on second valve member 80 and a seal 176 is disposed in the seal groove 174 and configured to interface with the interior of air cartridge body 88. The seal 176 prevents air from leaking around second valve member 80. In the example shown, seal groove 174 is formed on valve actuator 121. A clip 178 can be inserted into the second end of air cartridge body 88 to prevent second valve member 80 from shifting out of air cartridge body 88.

In the example shown, second valve seal 112 is formed on plug 113. Projection 115 extends radially relative to the main body of plug 113. Chamber 95 is formed within air valve body 88 and is non-circular and configured to interface with plug 113 to prevent plug 113 from rotating within air valve body 88. More specifically, projection 115 is contoured to interface with the contouring of chamber 95. Valve actuator 121 includes exterior threading configured to interface with threading formed in the bore of plug 113.

Knob 22 is connected to second valve member 80. Knob 22 is configured to actuate second valve member 80 to control a size of the opening through third valve 94. In the example shown, knob 22 is connected to valve actuator 121 by fastener 84. Fastener 84 fixes knob 22 to valve actuator 121 such that rotating knob 22 rotates valve actuator 121. Detent 123 is supported by knob 22 and configured to interface with depressions 125. Detent 123 interfacing with depressions 125 fixes the position of knob 22 and thus of second valve member 80. Detent 123 exiting and then entering into a depression can provide feedback to the user (e.g., vibration) to indicate a changing position of second valve member 80.

Second valve member 80 is actuatable between a closed state and an open state. The open state includes a plurality of open positions. The second valve member 80 can be maintained in a desired open position throughout operation. Knob 22 is rotated, thereby causing rotation of valve actuator 121. Rotating valve actuator 121 causes plug 113 to shift axially along valve actuator 121 and relative to air cartridge body 88 due to the contoured interface between chamber 95 and projection 115 preventing rotation of plug 113.

Figure 7:
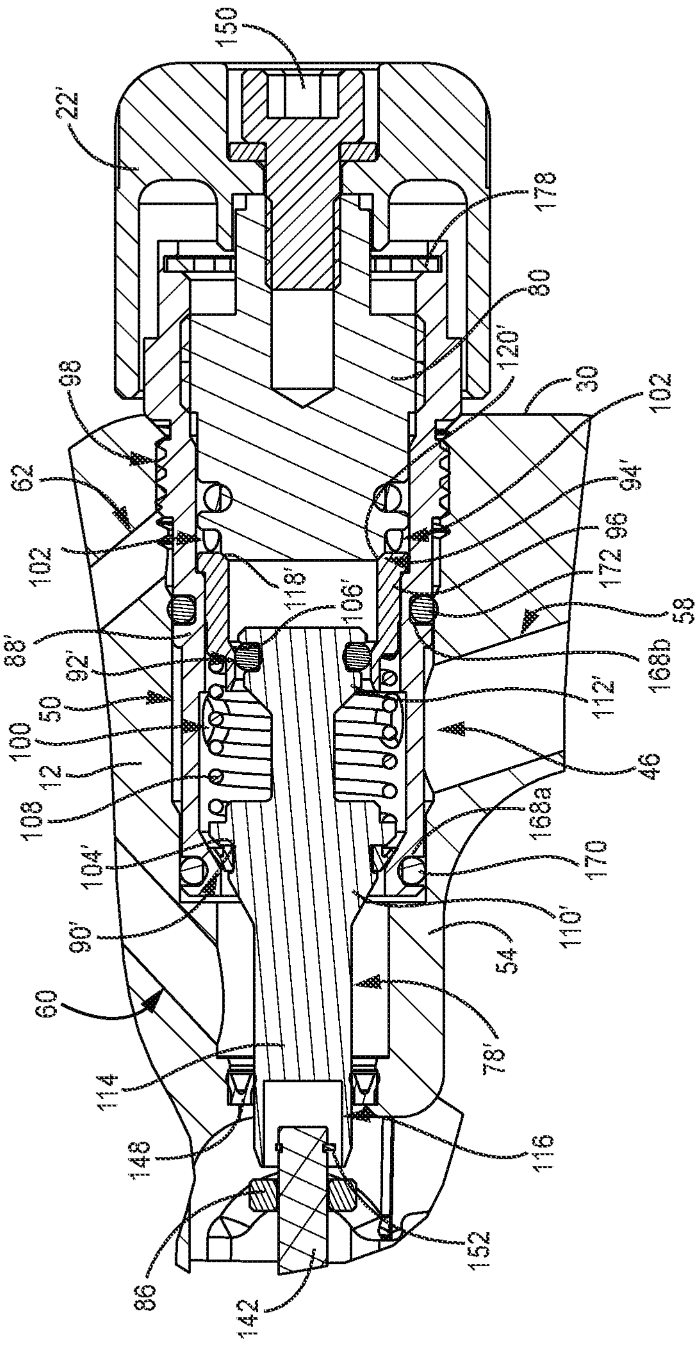
FIG. 7 is an enlarged cross-sectional view of a portion of a spray gun showing an air valve assembly.

FIG. 7 is an enlarged cross-sectional view of a portion of gun body 12 showing air valve assembly 46'. Air valve assembly 46' is substantially similar to air valve assembly 46 (best seen in FIGS. 4C, 6A, and 6B).

Air valve cartridge 46' includes first valve member 78', air cartridge body 88', first valve 90', second valve 92', third valve 94', seat fitting 96, first interface 98, and return spring 108. Air cartridge body 88' includes air inlet ports 100 and air outlet ports 102. First seat 104' and second seat 106' are disposed in air cartridge body 88'. First valve member 78' includes first valve seal 110', second valve seal 112', drive shaft 114, and receiving chamber 116. Second valve member 80' includes third valve seal 120'. First valve 90' is defined by first seat 104' and first valve seal 110'. Second valve 92' is defined by second seat 106' and second valve seal 112'. Third valve 94' is defined by third seat 118' and third valve seal 120'.

Air valve cartridge 46' is disposed within air valve bore 50 of gun body 12. Air cartridge body 88' is mounted to gun body 12 by first interface 98. For example, first interface 98 can be formed by interfaced threading formed on air cartridge body 88' and gun body 12. First interface 98 can be the only fixed interface between air valve cartridge 46' and gun body 12.

All components of air valve cartridge 46' are removed together as a single piece and do not require separate removal from air valve bore 50 or gun body 12. The various components of air valve cartridge 46' are connected to each other independent of gun body 12 and other parts of spray gun 10. Air valve cartridge 46' remains a unitary part when outside of gun body 12 such that the various components of air valve cartridge 46' do not freely separate.

A sealing interface is formed between air valve cartridge 46' and air valve bore 50. Compressed air is provided through inlet bore 58 formed in handle 26 and flows into an interior of air valve bore 50. The air enters air cartridge body 88' through air inlet ports 100. Air cartridge body 88' can include an annular array of air inlet ports 100. Seal grooves are formed on air cartridge body 88' and receive seals for interfacing with gun body 12 to seal the air chamber formed between the interior wall of air valve bore 50 and the exterior surface of air cartridge body 88'. In the example shown, air seal groove **168*a* is disposed between air inlet ports 100 and a first end of air cartridge body 88'. Air seal groove 168*b* is disposed between air inlet ports 100 and air outlet ports 102. Seal 170 is mounted in air seal groove 168*a* and seal 172 is mounted on air seal groove 168*b*. Air inlet ports 100 are oriented generally radially such that the inlet air flows into air valve cartridge 46' as a generally radial flow. Air outlet ports 102 are disposed generally radially such that the fan air flowing out of air valve cartridge 46' is a generally radial flow. Air inlet ports 100 are disposed between the two annular seals about air cartridge body 88'**.

One of the seals 170 is disposed axially between the air inlet ports 100 and the air outlet ports 102. Another one of the seals 172 is disposed proximate an end of air cartridge body 88' disposed in air valve bore 50. Air inlet ports 100 are disposed axially between the axial outlet for the assist air portion and the radial air outlet ports 102 for the fan air portion.

First valve member 78' is configured to control flows of fan air and assist air downstream from the inlet air chamber in air valve cartridge 46'. Second valve member 80' is configured to control the flow of fan air downstream of air valve cartridge 46'. The assist air can flow downstream from air valve cartridge 46' with the first valve member 78' in an open state and the second valve member 80' in either of an open state and a closed state. The fan air can flow downstream from air valve cartridge 46' with the first valve member 78' in the open state and the second valve member 80' in the open state. The fan air portion thereby requires multiple valves to be simultaneously open while the assist air portion requires a single valve to be open.

First valve member 78' is disposed within air cartridge body 88' and is actuatable along spray axis A and relative to air cartridge body 88'. First valve member 78' actuating to an open state opens flowpaths through both first valve 90' and second valve 92'. Return spring 108 is disposed within air cartridge body 88' and interfaces with first valve member 78'. Return spring 108 is configured to bias first valve member 78' towards a closed state.

In the example shown, first valve seal 110' is formed by a portion of first valve member 78'. In the example shown, second valve seal 112' is formed by a portion of first valve member 78'. The first valve seal 110' and second valve seal 112' can be formed as enlargements formed on first valve member 78'. First valve seal 110' and second valve seal 112' can project generally radially. In the example shown, first valve seal 110' is formed as a generally conical projection 180 of first valve member 78' and second valve seal 112' is similarly formed as a generally conical projection 186 of first valve member 78'.

In the example shown, return spring 108 interfaces with a side of first valve seal 110' opposite the sealing face of first valve seal 110'. It is understood that first valve seal 110' and second valve seal 112' can be formed in any desired manner suitable for controlling airflow and can be formed in different manners relative each other. Each of first valve seal 110' and second valve seal 112' can include a sloped face. The sloped faces can be oriented in the same axial direction. The sloped faces facilitate sealing. In the example shown, seals are mounted on each of first valve seal 110' and second valve seal 112'. Seal grooves can be formed on each of first valve seal 110' and second valve seal 112'. It is understood that, in some examples, first valve seal 110' and second valve seal 112' can directly interface with first seat 104' and second seat 106', respectively, with first valve member 78' in the closed state.

First seat 104' is formed by air cartridge body 88'. First seat 104' is disposed at a first end 91 of air cartridge body 88' opposite second valve member 80'. While first seat 104' is shown as formed by air cartridge body 88' it is understood that first seat 104' can be formed by a separate component mounted within air cartridge body 88'. First valve 90' is defined by first valve seal 110' and first seat 104'. An assist air outlet flowpath is formed through first valve 90' between first valve seal 110' and first seat 104' with first valve 90' in the open state. The assist air outlet flowpath is oriented axially.

Seat fitting 96 is disposed within air cartridge body 88'. First valve member 78' extends into and overlaps with seat fitting 96 along spray axis A. Second seat 106' is formed by seat fitting 96. In the example shown, second valve seal 112' interfaces with seat fitting 96 to control air flow through second valve 92'. Second valve 92' is defined by second valve seal 112' and second seat 106'.

Drive shaft 114 is a portion of first valve member 78' that extends axially forward out of air valve bore 50. Drive shaft 114 extends through throat seal 148. Receiving chamber 116 is formed within drive shaft 114. Actuator shaft 142 extends out of spring housing 134 and into receiving chamber 116. Coupler 86 is disposed about the actuator shaft 142 and interfaces with drive shaft 114 of first valve member 78'.

Second valve member 80' is disposed at least partially within air cartridge body 88'. Third valve 94' is disposed within air cartridge body 88'. In the example shown, the distal end of second valve member 80' forms the third valve seal 120' and the seat fitting 96 forms third seat 118'. Third valve 94' is defined by third valve seal 120' and third seat 118'.

Second valve member 80' is configured to interface with third seat 118' with second valve member 80' in the closed state. Second valve member 80' can directly contact and interface with seat fitting 96 with third valve 94' in the closed state. Third valve seal 120' is formed on second valve member 80'. Third valve seal 120' can be formed by an angled surface (e.g., not orthogonal or parallel to spray axis A) on second valve member 80'. For example, third valve seal 120' can be formed by a shoulder of second valve member 80'. Second valve member 80' is spaced from third seat 118' with third valve 94' in the open state.

In the example shown, second valve member 80' is attached to air cartridge body 88' and is unaffected by a pull of trigger 14. Second valve member 80' can connect to air cartridge body 88' by interfaced threading, among other options. Second valve member 80' is movable relative to gun body 12. Seal groove 174 is formed on an outer radial surface of second valve member 80'. A seal 176 is disposed in the seal groove 174 to interface with an interior surface of air cartridge body 88' and prevent airflow around second valve member 80'.

The interface between second valve member 80' and air cartridge body 88' facilitates actuation of second valve member 80' relative third seat 118'. For example, second valve member 80' can be rotated relative air valve bore 50 (e.g., one of a clockwise and counterclockwise direction) to unthread second valve member 80' and widen and/or open a flowpath through third valve 94' between second valve member 80' and third seat 118'. Second valve member 80' can be rotated in the other rotational direction (e.g., the other of the clockwise and counterclockwise direction) to narrow and/or close the flowpath through third valve 94'.

Air outlet ports 102 extend through air cartridge body 88' and provide a flowpath for fan air to exit air valve cartridge 46'. Air outlet ports 102 are disposed generally radially such that the fan air flow exiting air valve cartridge 46' is generally radial. Air outlet ports 102 are disposed axially between first interface 98 and an intermediate one of the seals about air cartridge body 88'. Air valve cartridge 46' can include an annular array of air outlet ports 102.

Knob 22' is supported by air valve cartridge 46'. Knob 22' is disposed outside of gun body 12 and is accessible by the user. Knob 22' covers an end of air cartridge body 88' extending outside of gun body 12. In some examples, knob 22' can be fixedly connected to second valve member 80' such that the position of second valve member 80' can be adjusted by grasping and manipulating knob 22'. In some examples, knob 22' is freely mounted such that rotation of knob 22' does not affect the position of second valve member 80'. Tool interface 150 forms a portion of third valve 94'. Tool interface 150 is a feature for interfacing with a compatible adjustment tool to manipulate the position of second valve member 80' relative to third seat 118', thereby changing the flow of the fan air portion. For example, tool interface 150 can be an opening configured to receive a flat head, crosshead, star, hex, square, or other shaped driver. The driver head can be inserted into the tool interface 150 and manipulated, such as by rotating, to adjust a position of second valve member 80' and thus an opening through third valve 94'. In some examples, tool interface 150 is a projection instead of a depression and can be received by a driver, such as a socket.

In some examples, knob 22' can be removed from air valve cartridge 46' to access tool interface 150. Knob 22' can enclose tool interface 150 with knob 22' installed on spray gun 10. In some examples, knob 22' can include a central aperture through which the adjustment tool can be inserted to interface with tool interface 150. Second valve member 80' can thereby be adjusted while knob 22' is mounted about but not fixed to second valve member 80'. Tool interface 150 allows the fan air opening to be set such that it cannot be adjusted without use of the appropriate adjustment tool. Tool interface 150 prevents undesired adjustments to the fan air flow. Tool interface 150 thereby ensures a consistent, quality, uniform spray and finish even where different operators utilize the same spray gun 10.

Knob 22' projects rearward relative to gun body 12. Knob 22' extends beyond a rear edge of handle 26. Knob 22' is sized and positioned such that knob 22' rests on the user's hand in the space between the thumb and index finger. Gun body 12 does not include an integral or otherwise permanent projection extending rearward to interface with the user's hand. Knob 22' is sized to position the user's hand at the appropriate location along the handle 26 to efficiently and ergonomically actuate trigger 14 while grasping handle 26. Knob 22' prevents handle 26 from sliding downward within the operator's hand during operation. Knob 22' is not a permanent part of spray gun 10 or gun body 12. Knob 22' may not be a permanent component on air valve cartridge 46'. In some examples, knob 22' can be removed and replaced with a knob 22' of the same or different dimensions. In some examples, spray gun 10 can include multiple knobs of differing dimensions that can be swapped onto spray gun 10 to accommodate differing hand sizes between users. For example, a knob 22' having a larger diameter can be installed for a user having a smaller hand and a knob 22' of a smaller diameter can be installed for a user having a larger hand. Knob 22' being removable facilitates modifying spray gun 10 based on the actual operator, facilitating more comfortable, ergonomic, and efficient spraying.

Knob 22' supports the operator's hand and is formed separate and apart from gun body 12. Knob 22' provides a large, ergonomic, and comfortable rest for the operator's hand that can also be integrated into fan air control. Air valve cartridge 46' can be configured to receive multiple different knobs 22 to customize spray gun 10 to a user. This allows the spray gun 10 to be customized without requiring new castings. In some examples, gun body 12 does not include a cast extension below knob 22'; instead, knob 22' is configured to directly interface with the user's hand.

Figure 8:
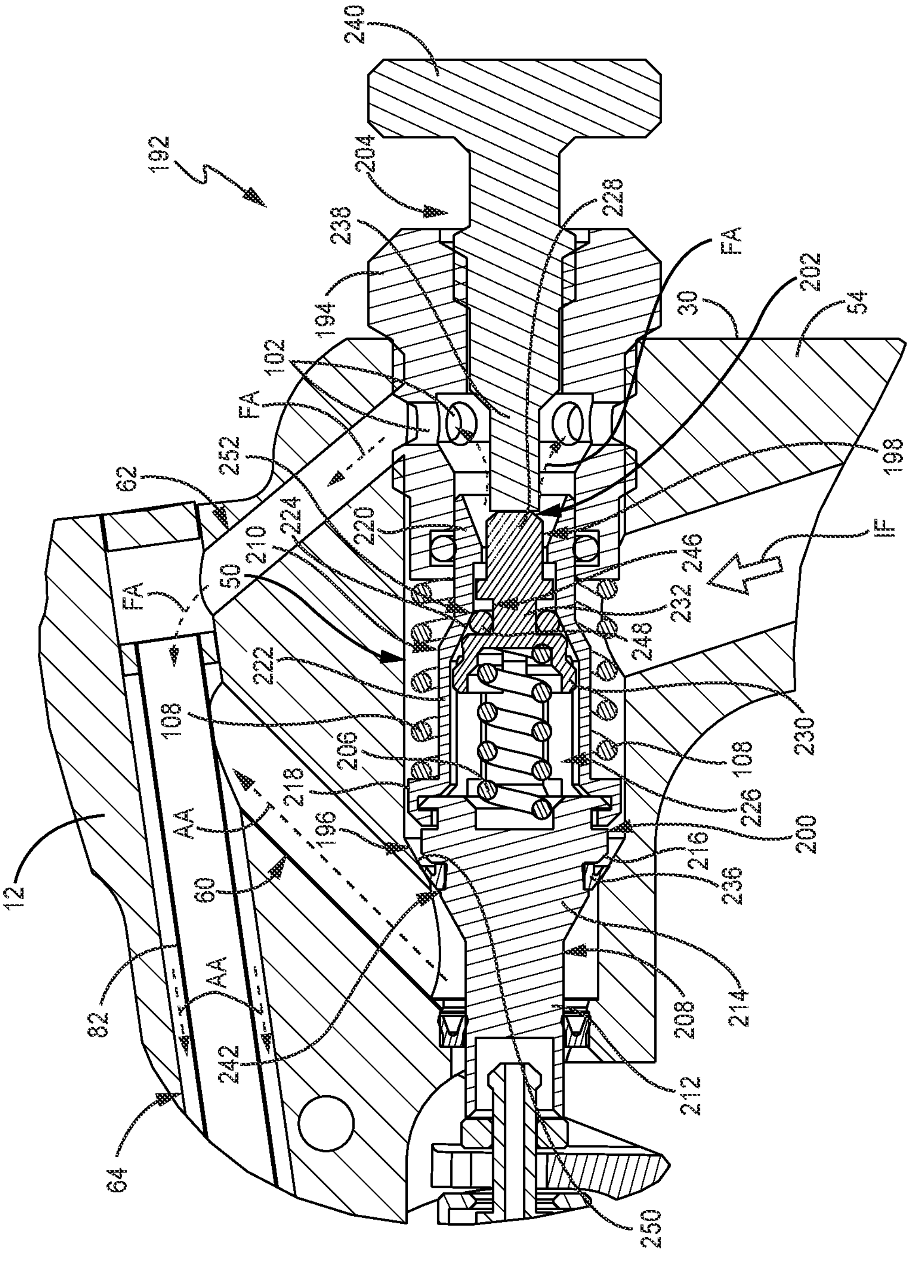
FIG. 8 is an enlarged cross-sectional view showing an air valve assembly.

FIG. 8 is an enlarged cross-sectional view of a portion of gun body 12 showing an air valve assembly 192. Air valve assembly 192 is configured to control flows of the assist air portion and the fan air portion downstream from air valve bore 50. Air valve assembly 192 includes return spring 108, air housing 194, first air valve 196, second air valve 198, common valve member 200, fan valve member 202, fan stop 204, and fan control spring 206. Air housing 194 includes air outlet ports 102. Common valve member 200 includes assist control shaft 208 and fan control shaft 210. Assist control shaft 208 includes end shaft 212, assist transition portion 214, connecting shaft 216, and control seal groove 234. Control seal 236 is shown. Fan control shaft 210 includes inner end 218, control end 220, control body 222, and fan transition portion 224. Fan valve member 202 includes first end 228, second end 230, valve body 232, and fan seal groove 246. Fan seal 248 is shown. Fan stop 204 includes stop shaft 238 and setting knob 240.

Air valve assembly 192 provides a dynamic and variable fan air flow based on degree of actuation of trigger 14. The greater the degree of actuation of trigger 14 (e.g., the further trigger 14 is depressed towards handle 26) the larger the flow of fan air downstream. Air housing 194 is connected to gun body 12 within air valve bore 50. In some examples, air housing 194 forms a cartridge body that at least partially contains common valve member 200. For example, air housing 194 can extends around common valve member 200 to secure common valve member 200 within air housing 194 and air housing 194 can form the seat of first air valve 196. As such, air valve assembly 192 can be integrated into or formed as a valve cartridge, similar to air valve cartridge 46 (best seen in FIGS. 4C, 6A and 6B) and air valve cartridge 46' (FIG. 7).

Common valve member 200 is disposed at least partially within air valve bore 50. Common valve member 200 is configured to control flows of assist air and fan air downstream from air valve assembly 192.

Fan control shaft 210 is connected to assist control shaft 208. Return spring 108 is disposed about fan control shaft 210 and extends between the flange of inner end 218 and air housing 194. Return spring 108 is configured to bias common valve member 200 towards the closed state. Return spring 108 drives common valve member 200 to the closed state upon release of trigger 14. Return spring 108 biases each of first air valve 196 and second air valve 198 towards respective closed states.

Assist control shaft 208 is disposed at an inner end of air valve bore 50 and extends out of air valve bore 50 into the gap between front block 52 and rear block 54. End shaft 212 extends out of air valve bore 50 into the gap between front block 52 and rear block 54. Trigger 14 is disposed in the gap. Receiving chamber 116 is formed in end shaft 212. Assist transition portion 214 extends from an end of end shaft 212 disposed opposite receiving chamber 116. In the example shown, assist transition portion 214 has a sloped outer face that increases the diameter of assist control shaft 208 between end shaft 212 and connecting shaft 216. Connecting shaft 216 extends from assist transition portion 214 and is fixed to inner end 218 of fan control shaft.

First air valve seal 242 is formed on assist transition portion 214. First air valve 196 is defined by first air valve seal 242 and first valve seat 250. First air valve seal 242 interfaces with first valve seat 250 with first air valve 196 in the closed state. In the example shown, control seal groove 234 is formed on assist transition portion 214 and control seal 236 is disposed in control seal groove 234. Control seal 236 is shown as a cup seal but can be of any suitable configuration for sealing an air flowpath. In some examples, assist transition portion 214 can seal directly with first valve seat 250. In the example shown, first air valve seal 242 and first valve seat 250 each include sloped faces. The sloped faces are disposed opposite each other. First valve seat 250 is shown as formed by a portion of gun body 12. It is understood, however, that first valve seat 250 can be formed by air housing 194 in examples where air housing 194 forms a cartridge body, similar to first valve 90.

Inner end 218 is connected to connecting shaft 216 of assist control shaft 208. Inner end 218 can be snap locked onto assist control shaft 208, among other options. Control body 222 extends between inner end 218 and fan transition portion 224 of fan control shaft 210. Control body 222 includes fan inlet openings 226, such as windows or cutouts, that allow the fan air portion to enter the interior of control body 222 from air valve bore 50, or from the interior of the cartridge in examples where air housing 194 forms a cartridge body of air valve assembly 192. Fan transition portion 224 is formed on the interior surface of fan control shaft 210. In the example shown, fan transition portion 224 is a sloped surface extending between control body 222 and control end 220. Control end 220 has a reduced diameter relative control body 222. Control end 220 extends into air housing 194. A dynamic seal is formed between fan control shaft 210 and air housing 194. Fan control shaft 210 can shift axially relative to air housing 194.

Fan valve member 202 is disposed at least partially within fan control shaft 210. Fan control spring 206 is disposed within fan control shaft 210 and extends between fan valve member 202 and assist control shaft 208. Fan control spring 206 is configured to bias fan valve member 202 towards control end 220 of fan control shaft 210 to maintain second valve 198 in a closed state. Fan control spring 206 interfaces with second end 230 of fan valve member 202. First end 228 of fan valve member 202 is oriented towards control end 220. First end 228 can extend through an axial opening in control end 220. Fan seal 248 is disposed in fan seal groove 246 formed on valve body 232. Fan seal 248 interfaces with fan control shaft 210 when second valve 198 is in the closed state. In the example shown, fan seal 248 forms second air valve seal 244 and fan control shaft 210 forms second valve seat 252. First valve 196 is defined between second air valve seal 244 and second valve seat 252. Valve body 232 has a first diameter on a side of fan seal groove 246 proximate first end 228 and a second diameter on a side of fan seal groove 246 proximate second end 230. The second diameter is larger than the first diameter.

Fan stop 204 is configured to interface with fan valve member 202 to open second air valve 198. Fan stop 204 is mounted to air housing 194. Fan stop 204 extends through the fan air chamber defined by air housing 194. Stop shaft 238 is disposed within air housing 194. Stop shaft 238 defines a limit of rearward axial travel of fan valve member 202. Setting knob 240 is disposed outside of air housing 194 and air valve bore 50. Setting knob 240 and stop shaft 238 are integrally formed in the example shown. The relative axial position of stop shaft 238 can be set by manipulating setting knob 240. For example, fan stop 204 can be threadedly connected to air housing 194 such that rotating setting knob 240 causes stop shaft 238 to move one of towards and away from fan valve member 202. It is understood that, in some examples, fan stop 204 can include a tool interface 150 such that an adjustment tool is required to adjust the position of fan stop 204. In some examples, setting knob 240 can be configured similar to knob 22.

During operation, the user can set fan stop 204 at a desired position. For example, the user can adjust fan stop 204 to withdraw stop shaft 238 such that fan valve member 202 does not contact fan stop 204 with trigger 14 fully depressed. Such a setting prevents any fan air from flowing downstream from air valve assembly 192. Second air valve 198 remains closed. The user can adjust fan stop 204 to a fully forward position such that fan valve member 202 contacts stop shaft 238 at or soon after trigger 14 actuation. Such a setting can provide simultaneous or nearly simultaneous flows of assist air and fan air. The user can adjust fan stop 204 to an intermediate position such that fan valve member 202 contacts stop shaft 238 after trigger 14 has been partially actuated. Spray gun 10 can thereby emit assist air and no fan air for a portion of the trigger 14 pull and emit both assist air and fan air during another, later portion of the trigger 14 pull. This can be desirable where the user may desire no fan air during some spraying operations and fan air during other spray operations. The user is not required to manually adjust the fan air valve and can instead vary the fan air based on the degree of trigger 14 actuation.

For purposes of the following discussion, fan stop 204 is assumed to be in an activated position such that fan stop 204 contacts fan valve member 202 to open second air valve 198 can cause fan air flow during at least a portion of the actuation range of trigger 14. Trigger 14 is actuated and drives common valve member 200 rearwards within air valve bore 50. First air valve 196 opens and the assist air portion AA flows downstream from air valve assembly 192 to assist air bore 60. Return spring 108 compresses between inner end 218 and air housing 194.

Fan control shaft 210 is fixed to and shifts rearward with assist control shaft 208. Fan control spring 206 maintains fan valve member 202 in sealing engagement with fan control shaft 210 as common valve member 200 shifts rearward. Assist control shaft 208, fan control shaft 210, fan control spring 206, and fan valve member 202 are fixed together and move as a unit.

Fan valve member 202 moves with common valve member 200 until fan valve member 202 encounters fan stop 204. Fan stop 204 is a hard stop that prevents fan valve member 202 from shifting axially rearward within air valve bore 50. Trigger 14 continues to be depressed and the position of fan valve member 202 is maintained. Fan control spring 206 compresses between fan valve member 202 and assist control shaft 208 as common valve member 200 shifts rearward. Assist control shaft 208 and fan control shaft 210 shift relative to fan valve member 202. The sealed interface between fan valve member 202 and fan control shaft 210 disengages, opening a flowpath through second air valve 198. The fan air portion FA flows through the opening in second air valve 198, to the chamber in air housing 194, and exits air housing 194 to fan air bore 62 through air outlet ports 102.

Trigger 14 continues to depress and fan control shaft 210 shifts further axially rearward relative to fan valve member 202. Fan transition portion 224 and valve body 232 each include varying diameters (e.g., each surface includes complementary slopes). The size of the opening through second air valve 198 grows as fan control shaft 210 shifts rearward relative fan valve member 202. The size of the restriction through second air valve 198 shrinks as fan control shaft 210 shifts rearward relative fan valve member 202. As such, the volume of fan air that can pass through second air valve 198 increases as fan control shaft 210 shifts rearward relative to fan valve member 202. The user can release trigger 14 to reduce or stop the fan air flow.

In the example shown, the sloped interface between fan control shaft 210 and fan valve member 202 provides a continuously variable opening that allows for a range of fan air flows. The fan air flow through second air valve 198 is continuously variable depending on trigger 14 position. In some examples, air valve assembly 192 can be configured to provide stepwise variations in the fan air flow. For example, fan control shaft 210 can include a fan transition portion 224 having a first cylindrical portion with a first inner diameter and a second cylindrical portion with a second inner diameter larger than the first inner diameter. A first opening with a first area is formed between the fan valve member 202 and the first cylindrical portion. A second opening with a second area larger than the first is formed between the fan valve member 202 and the second cylindrical portion. The flow rate of the fan air is a first flow rate through the first opening and a second flow rate larger than the first flow rate through the second opening. During operation, air valve assembly 192 provides the fan air at the first flow rate for a first portion of the trigger pull and the fan air at the second flow rate for a second portion of the trigger pull. While air valve assembly 192 is described as having first and second stepwise portions, it is understood that air valve assembly 192 can include as many stepwise portions as desired to provide as many varying flow rates as desired, such as 3, 4, 5, or more steps having differing flow areas.

Air valve assembly 192 provides a variable fan air flow based on the degree of trigger 14 actuation. Fan air flows are typically set by setting the size of an opening through the valve controlling fan air flow. That opening is maintained throughout spraying. The user stops spraying and manually manipulates the fan valve to adjust the opening if a different fan air flow is desired. Air valve assembly 192 provides a variable opening based on the degree of trigger 14 actuation. The flow of the fan air portion is controlled by actuation of trigger 14. This allows a user to dynamically adjust the fan air and thus the width of the spray pattern emitted by spray gun 10 by simply depressing or releasing trigger 14. The spray pattern can be dynamically adjusted by feathering trigger. The user can apply spray fluid to both wide and narrow items without having to change spray tips or adjust the fan air valve. It is understood that air valve assembly 192 and the feathered fan air flow can be integrated with air valve cartridge 46 to provide variable, dynamic fan air flow with and through an air valve cartridge.

Figure 9:
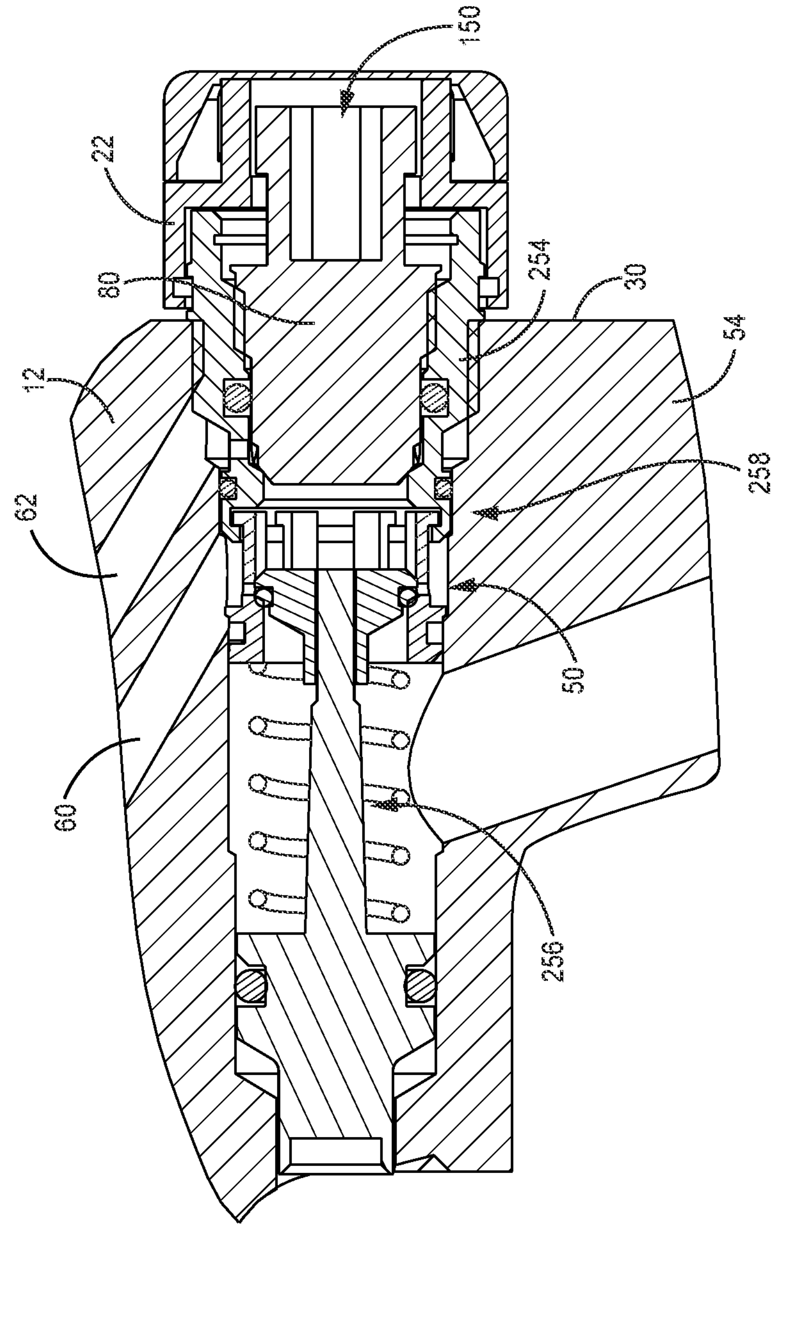
FIG. 9 is a cross-sectional view showing a fan air adjustment member.

FIG. 9 is a cross-sectional view showing a second valve member 80 with an integrally formed tool interface 150. Tool interface 150 is formed in second valve member 80 and is configured to receive a tool head. For example, tool interface 150 can be an opening configured to receive a flat head, crosshead, star, hex, square, or other shaped driver. The driver head can be inserted into the tool interface 150 and manipulated, such as by rotating, to adjust a position of second valve member 80 and thus the fan air opening about second valve member 80. While tool interface 150 is described as received a tool head, it is understood that tool interface 150 can be of any desired configuration suitable for being manipulated by a tool. For example, tool interface 150 can be a hex projection configured to be received by a socket.

Knob 22 is disposed about the end of the air housing 254, which is similar to housing 194 and cartridge body 88. The integral tool interface 150 can be utilized on any manually set second valve member 80 to adjust the fan air portion and prevent undesired adjustment by requiring the adjustment tool. Knob 22 can be freely mounted on housing 254, such that manipulating knob 22 does not alter a position of second valve member 80. Knob 22 is thereby rotatable and movable relative to housing 254. A user can access second valve member 80 with the adjustment tool by removing knob 22 or through a central aperture formed in knob 22. Valve member 256 controls flow of both the assist air portion and the fan air portion downstream from air valve assembly 258. Valve assembly 258 includes a dynamic valve member and a static valve member. The static valve member can be adjusted and set by an adjustment tool by way of the tool interface 150.

Figure 10B:
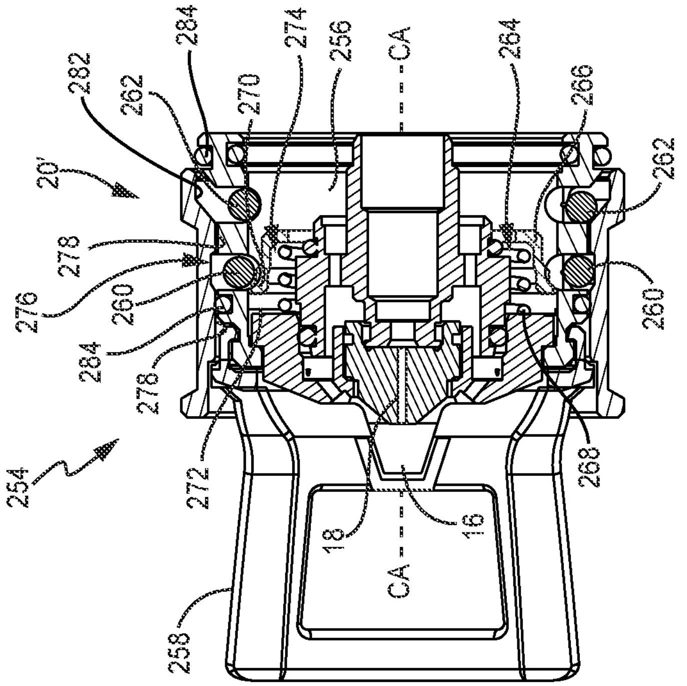
FIG. 10B is a cross-sectional view showing a quick-connect air cap in an unlocked state.
Figure 10A:
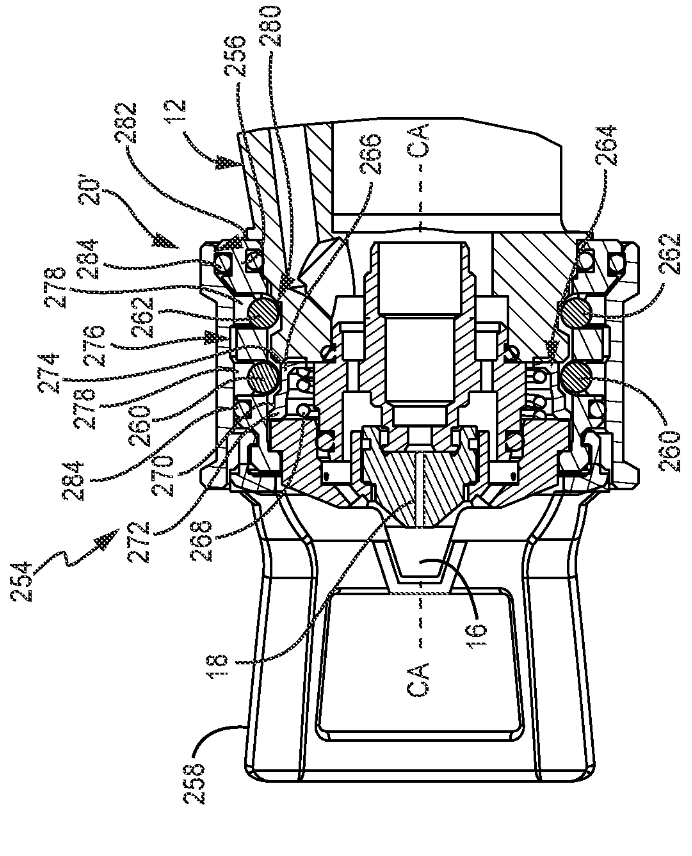
FIG. 10A is a cross-sectional view showing the quick-connect air cap in a locked state and mounted on a spray gun.

FIG. 10A is a cross-sectional view of a spray tip assembly 254 showing spray tip assembly mounted to a gun body 12 and with collar 20' in a locked state. FIG. 10B is a cross-sectional view of spray tip assembly 254 dismounted from gun body 12 and with collar 20' in an unlocked state. FIGS. 10A and 10B will be discussed together. Spray tip assembly 254 includes air cap 16, spray tip 18, collar 20', tip body 256, tip guard 258, forward detents 260, rear detents 262, and lock piston 264. Lock piston 264 includes head 266 and piston spring 268.

Tip body 256 supports other components of spray tip assembly 254. Air cap 16 is disposed within tip body 256. Spray tip 18 is disposed within air cap 16. Lock piston 264 is disposed within tip body 256 and is retained in tip body 256 by forward detents 260. Forward detents 260 can also be referred to as catches. Piston spring 268 is disposed between head 266 and air cap 16 and is configured to bias lock piston 264 away from air cap 16 towards the position shown in FIG. 10B. Tip guard 258 is mounted to tip body 256 and extends away from tip body 256.

Forward detents 260 are disposed in forward openings formed in tip body 256. Forward detents 260 are engaged by head 266 with collar 20' in the disengaged state and spray tip assembly 254 removed from gun body 12. A shoulder 270 of head 266 engages forward detents 260 and pushes forward detents 260 away from a central axis CA-CA through spray tip assembly 254. The central axis CA-CA can be coaxial with the spray axis A. The forward detents 260 are biased into homing groove 276 formed in collar 20'. The forward detents 260 being disposed in the homing groove 276 locks collar 20' in the disengaged position. Lip 272 engages forward detents 260 to limit axial displacement of head 266. Lock piston 264 prevents the user from actuating collar 20' from the unlocked state to the locked state unless spray tip assembly 254 is mounted on gun body 12.

Forward detents 260 are also configured to engage head 266 with spray tip assembly 254 installed on gun body 12 and collar 20' in the locked state (FIG. 10A). A flat 278 on collar 20' pushes forward detents 260 downwards and the forward detents 260 move into receiving groove 274 on head 266. Receiving groove 274 is aligned with forward detents 260 when lock piston 264 is in the mounted state. Receiving groove 274 allows forward detents 260 to move downwards towards central axis CA-CA to lock a position of head 266 and prevent head 266 from moving relative to forward detents 260. Forward detents 260 can be formed in any manner suitable for engaging with, locating, and being actuated by lock piston 264. Forward detents 260 can be dowel rods or ball bearings, among other options. For example, forward detents 260 can be metallic, ceramic, or another hard material.

Rear detents 262 are disposed in rear openings formed in tip body 256. Rear detents 262 are configured to engage mounting groove 280 formed on gun body 12 with spray tip assembly 254 mounted to gun body 12. Rear detents 262 can also be referred to as catches. Rear detents 262 can float within their respective openings when spray tip assembly 254 is uninstalled and collar 20' is in the unlocked state. A retaining groove 282 is formed in collar 20' to allow rear detents 262 to displace radially outward as collar 20' is installed on and removed from gun body 12. Retaining groove 282 prevents rear detents 262 from disengaging from tip body 256. Rear detents 262 can be formed in any manner suitable for engaging with gun body 12 to secure spray tip assembly 254 to gun body 12. Rear detents 262 can be dowel rods or ball bearings, among other options. For example, rear detents 262 can be metallic, ceramic, or another hard material.

Collar 20' is disposed on tip body 256 and is movable between the locked state (FIG. 10A) and the unlocked state (FIG. 10B). Collar 20' includes homing groove 276 and retaining groove 282 that are aligned with forward detents 260 and rear detents 262, respectively, when collar 20' is in the unlocked state. The grooves allow forward detents 260 and rear detents 262 to shift radially to allow for objects to pass under the forward detents 260 and rear detents 262. Forward detents 260 are also driven into engagement with homing groove 276 by lock piston 264 when lock piston 264 is in the dismounted position (FIG. 10B). Forward detents 260 are maintained in homing groove 276 to prevent collar 20' from being actuated to the locked state unless installed on gun body 12. Collar 20' also includes flats 278 adjacent the grooves. The flats 278 are aligned with forward detents 260 and rear detents 262 with collar 20' in the locked state. The flats 278 drive forward detents 260 and rear detents 262 radially inward and lock the detents in those biased positions. Collar 20' locks rear detents 262 within mounting groove 280 to secure spray tip assembly 254 to gun body 12.

During operation, spray tip assembly 254 is initially dismounted from gun body 12. Spray tip assembly 254 is positioned relative gun body 12 and shifted such that an end of gun body extends into tip body 256. Spray tip assembly 254 is shifted from the position shown in FIG. 10B to the position shown in FIG. 10A. Tip mount 130 is shown in FIG. 10A. During installation, spray tip 18 is fully engaged with tip mount 130 to provide a fluid seal and ensure high-quality spray. Nozzle 164 engages with spray tip 18 to create a fluid seal therebetween. As spray tip assembly 254 is inserted, the end of gun body 12 encounters lock piston 264. Gun body 12 prevents lock piston 264 from shifting further and piston spring 268 compresses between lock piston 264 and air cap 16. Lock piston 264 continues to displace until spray tip assembly 254 is fully inserted. With spray tip assembly 254 fully inserted, forward detents 260 are aligned with receiving groove 274 and fall into receiving groove 274 and out of homing groove 276 in collar 20'. Collar 20' can be actuated relative to tip body 256 and from the unlocked state to the locked state with forward detents 260 removed from homing groove 276.

Collar 20' is shifted from the unlocked position shown in FIG. 10B to the locked position shown in FIG. 10A. For example, collar 20' can slide axially relative to tip body 256. In some examples, collar 20' can be rotated relative to tip body 256 between the unlocked and locked states. It is understood that collar 20' can be actuated between states in any manner suitable for engaging and biasing forward detents 260 and rear detents 262. With collar 20' in the locked state, collar 20' engages two seals 284 between collar 20' and tip body 256 to prevent airflow from leaking therebetween. Seals 284 can also assist in maintaining collar 20' in the locked state.

The flats 278 formed on collar 20' engage rear detents 262 and lock rear detents 262 into mounting groove 280 on gun body 12. The flats 278 engage forward detents 260 and lock forward detents on lock piston 264. With collar 20' in the locked state, spray tip assembly 254 is mounted to and locked on gun body 12. Spray tip assembly 254 remains locked on gun body 12 until collar 20' is again shifted to the unlocked state. Spray tip assembly 254 can be removed by simply actuating collar 20' from the locked state to the unlocked state and pulling spray tip assembly 254 axially away from gun body 12. Piston spring 268 returns lock piston 264 to the position shown in FIG. 10B and lock piston 264 drives forward detents 260 into engagement with the collar groove, locking collar 20' in the unlocked state.

Spray tip assembly 254 is a quick-connect assembly that facilitates quick and simple installation and removal of spray tip assembly 254 from gun body 12. Spray tip assembly 254 facilitates quick and simple installation, removal, and replacement of air cap 16 and spray tip 18. In some examples, the quick-connect arrangement can be retrofit onto an existing spray gun. For example, a gun body configured to receive a threaded collar can instead have a quick-connect mount threaded onto the end of the gun body. The quick-connect mount can include internal threading to mount to the gun body and an external mounting groove 280 to receive the rear detents 262. Spray guns that require threading to mount a spray tip can thereby be retrofit to accept quick-connect spray tip assemblies 254. Tip body 256 can be configured to have varying diameters to connect to threaded gun bodies and facilitate retrofitting.

Spray tip assembly 254 provides significant advantages. The quick connect spray tip assembly 254 allows a user to quickly and efficiently swap spray tips during operation, increasing spray efficiency and reducing downtime. The operator can simply articulate collar 20' between the locked and unlocked states to install and uninstall spray tip assembly 254. The operator is not required to make awkward rotational motion relative to gun body 12 to thread the collar on and off and the one motion coupling and decoupling provides an improved ergonomic experience and faster time to couple and decouple. In addition, each of the components of spray tip assembly 254 is provided as a cartridge that can be installed and removed as a single piece. Spray tip assembly 254 can thus be considered to be a spray tip cartridge.

Figure 11B:
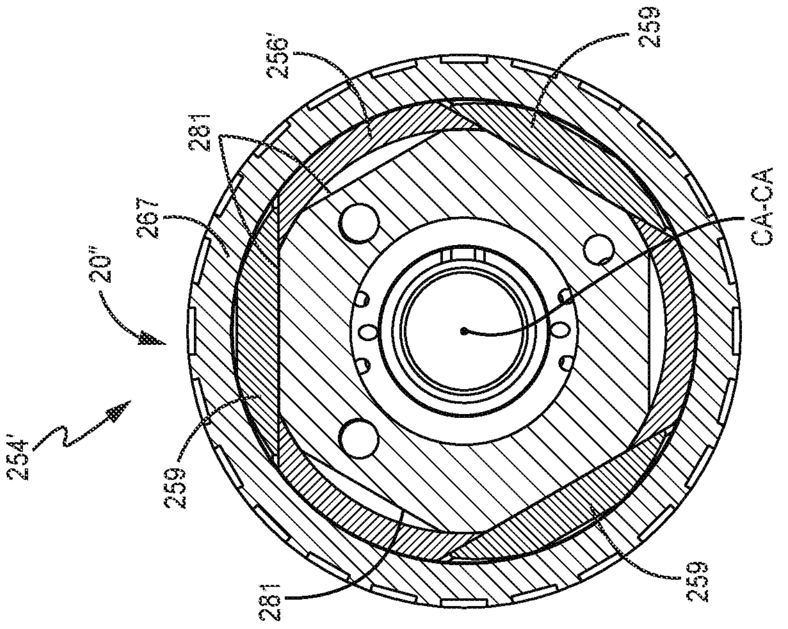
FIG. 11B is a cross-sectional view of the spray tip assembly taken along line B-B in FIG. 11A.
Figure 11A:
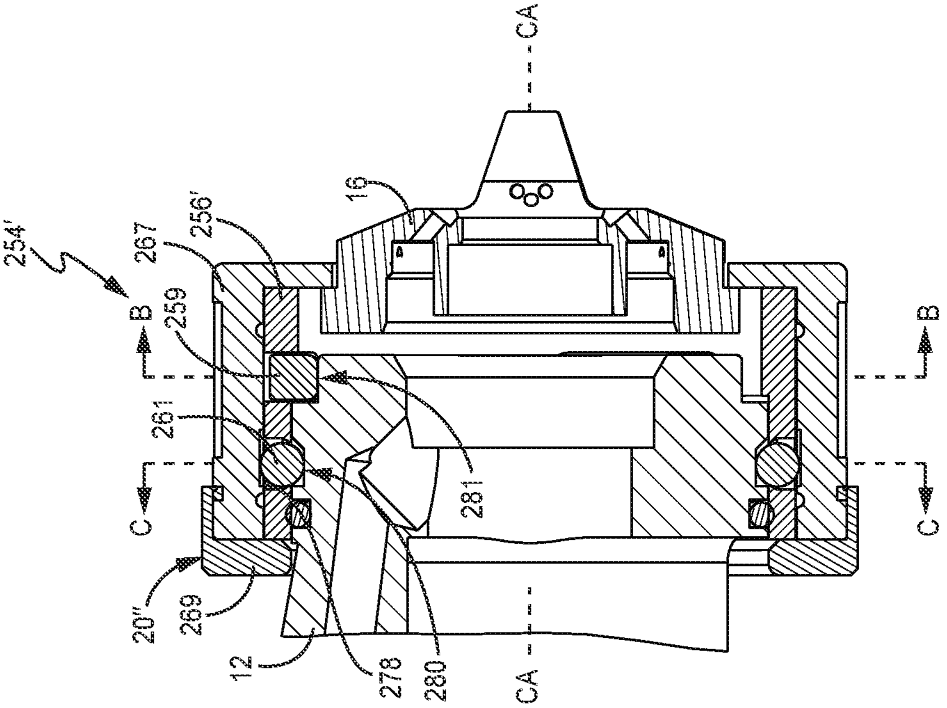
FIG. 11A is a cross-sectional view of a spray tip assembly taken along line A-A in FIG. 11C showing the spray tip assembly mounted to a gun body.
Figure 11C:
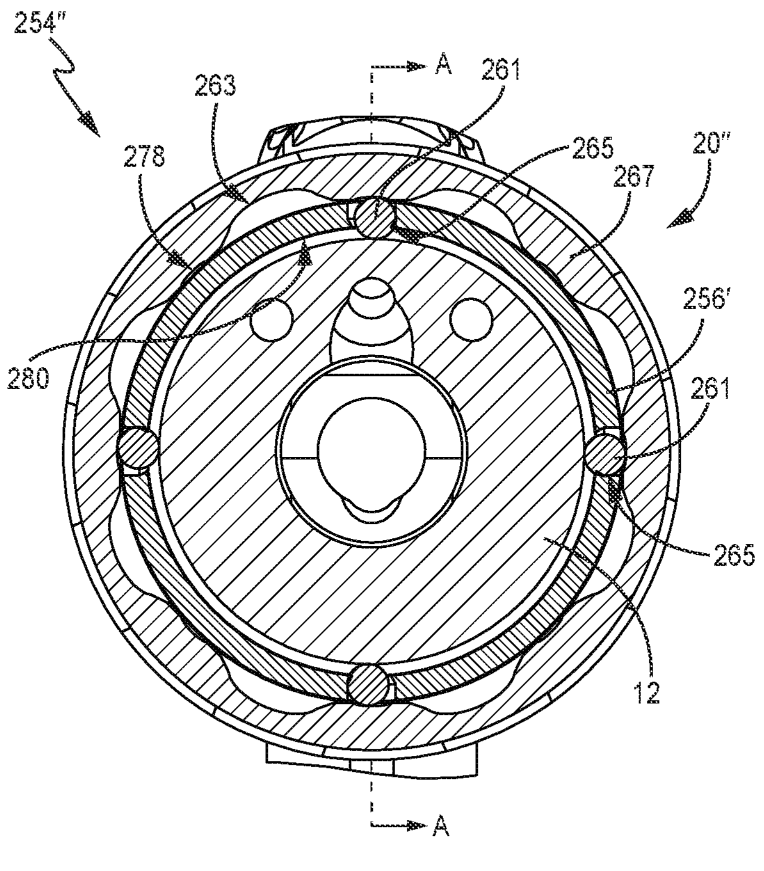
FIG. 11C is a cross-sectional view of the spray tip assembly taken along line C-C in FIG. 11A.

FIG. 11A is cross-sectional view of spray tip assembly 254' taken along line A-A in FIG. 11C showing spray tip assembly 254' mounted to a gun body 12. FIG. 11B is a cross-sectional view of spray tip assembly 254' taken along line B-B in FIG. 11A. FIG. 11C is a cross-sectional view of spray tip assembly 254' taken along line C-C in FIG. 11A. FIGS. 11A-11C will be discussed together. Spray tip assembly 254' includes air cap 16, collar 20", tip body 256', tip locks 259, and detents 261. Collar 20" includes recesses 263 and detent flats 278. Gun body 12 includes mounting groove 280 and lock interfaces 281.

Tip body 256' supports other components of spray tip assembly 254'. Air cap 16 is disposed within tip body 256'. Air cap 16 is connected to tip body 256'. A spray tip, similar to spray tip 18, is disposed within air cap 16, but the spray tip is not shown in FIGS. 11A-11C for ease of illustration. Collar 20" is disposed around and supported by tip body 256'. In the example shown, collar 20" includes a main collar body 267 and a support ring 269 connected to the main collar body 267. The support ring 269 extends radially inward to cover a rear axial end of tip body 256'. Support ring 269 secures tip body 256' within collar 20". Collar 20" is rotatable about tip body 256'. Collar 20" is rotatable relative to air cap 16. Collar 20" is rotatable about central axis CA-CA. Collar 20" is rotatable between an unlocked state and a locked state (shown in FIGS. 11A and 11C), as discussed in more detail below.

Tip locks 259 are secured to tip body 256' and project radially inward relative to an inner radial face of tip body 256'. Tip locks 259 can be formed separately from tip body 256' or can be unitary with tip body 256'. Tip locks 259 are configured to interface with lock interfaces 281 formed on gun body 12. Tip locks 259 can also be referred to as rotation locks because tip locks 259 prevent tip body 256' from rotating relative to gun body 12. Lock interfaces 281 can be planar portions of gun body 16. In some examples, lock interfaces 281 can be referred to as anti-rotation flats. Tip locks 259 interfacing with lock interfaces 281 fixes tip body 256', and thus air cap 16 and the spray tip, relative to gun body 12 and central axis CA-CA. The interface between tip body 256' and gun body 12 thereby prevents air cap 16 and spray tip from rotating relative to central axis CA-CA. As shown, gun body 12 includes multiple ones of lock interfaces 281 such that are disposed about the periphery of the end of gun body 12 that spray tip assembly 254' mounts to. The array of lock interfaces 281 facilitates mounting of spray tip assembly 254' at different orientations such that the spray tip 18 can be mounted in different orientations to alter the orientation of the spray fan emitted by spray gun 10. While the keyed interface between tip body 256' and gun body 12 is described as being formed by planar portions on each of tip body 256' and gun body 12, it is understood that the keyed interface can be formed in any manner suitable for preventing relative rotation between tip body 256' and gun body 12. For example, tip body 256' can include one or more projections or recesses that interface with corresponding recesses or projections on gun body 12.

Detents 261 are supported by tip body 256'. Detents 261 are disposed in openings 265 formed in tip body 256'. Detents 261 can also be referred to as catches. Detents 261 can float within their respective openings 265 when collar 20" is in the unlocked state and are forced radially inward and maintained in position with collar 20" in the locked state. With spray tip assembly 254' mounted to gun body 12, detents 261 are aligned with mounting groove 280. With collar 20" in the unlocked state, detents 261 are radially aligned with recesses 263 such that detents 261 can move radially into recesses 263. With collar 20" in the locked state, detents 261 are radially aligned with detent flats 278 that force detents 261 radially inward. While detents 261 are shown as balls, it is understood that detents 261 can be formed as dowel rods, ball bearings, collets, etc. Detents 261 can be metallic, ceramic, or another hard material. It is understood that spray tip assembly 254' can include as many or as few detents 261 as desired.

Spray tip assembly 254' is mounted to spray gun 10 by shifting spray tip assembly 254' axially onto gun body 12. Detents 261 are initially aligned with recesses 263 such that detents 261 can be pushed radially outward into recesses 263 by gun body 12 as spray tip assembly 254' is placed on gun body 12. With spray tip assembly 254' disposed on gun body 12, tip locks 259 interface with lock interfaces 281. Collar 20" is rotated about central axis CA-CA and to the locked state such that detent flats 278 force detents 261 radially inward and into mounting groove 280. The interface between tip locks 259 and lock interfaces 281 prevents tip body 256' and air cap 16 from rotating about central axis CA-CA with collar 20". With collar 20" in the locked state (as shown in FIG. 11C), detents 261 are disposed in mounting groove 280 and are prevented from moving radially outward by collar 20". Detents 261 secure spray tip assembly 254' to gun body 12 such that spray tip assembly 254' is prevented from being pulled axially off of gun body 12. To remove spray tip assembly 254', collar 20" is rotated to the unlocked state such that recesses 263 are radially aligned with detents 261. Spray tip assembly 254' can then be pulled axially away from and off of gun body 12. As shown, the front wall of mounting slot 280 is sloped. The sloped wall assists in pushing detents radially outward as spray tip assembly 254' is removed from gun body 12, facilitating easy and quick dismounting of spray tip assembly 254'.

Spray tip assembly 254' is a quick-connect assembly that facilitates quick and simple installation and removal of spray tip assembly 254' from gun body 12. Spray tip assembly 254' facilitates quick and simple installation, removal, and replacement of air cap 16 and spray tip 18. In some examples, the quick-connect arrangement can be retrofit onto an existing spray gun. For example, a gun body configured to receive a threaded collar can instead have a quick-connect mount threaded onto the end of the gun body. The quick-connect mount can include internal threading to mount to the gun body and external mounting groove 280 and lock interfaces 281. Spray guns that require threading to mount a spray tip can thereby be retrofit to accept quick-connect spray tip assemblies 254'.

Spray tip assembly 254' provides significant advantages. The quick connect spray tip assembly 254' allows a user to quickly and efficiently swap spray tips during operation, increasing spray efficiency and reducing downtime. The operator can simply articulate collar 20 between the locked and unlocked states to install and uninstall spray tip assembly 254'. The operator is not required to make awkward rotational motion relative to gun body 12 to thread the collar on and off and the one motion coupling and decoupling provides an improved ergonomic experience and faster time to couple and decouple. Collar 20" is rotated less than a full turn between the locked and unlocked states, as opposed to threaded connections that can require multiple full rotations. In addition, each of the components of spray tip assembly 254' is provided as a cartridge that can be installed and removed as a single piece. Spray tip assembly 254' can thus be considered to be a spray tip cartridge.

Figure 12B:
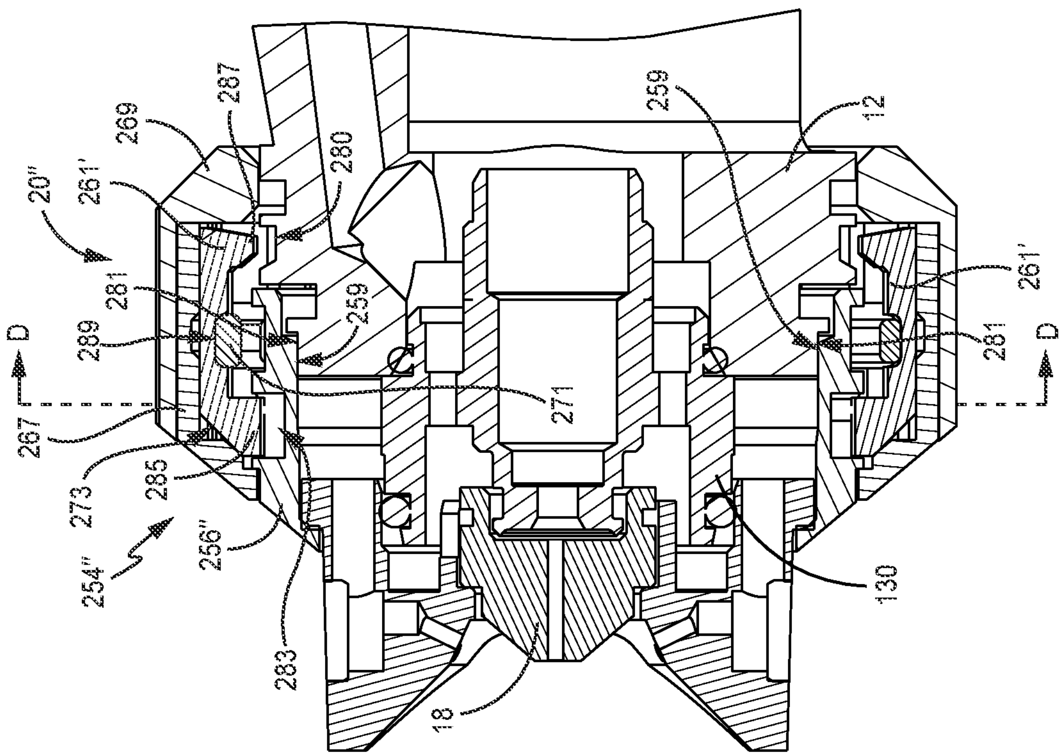
FIG. 12B is a cross-sectional view of the spray tip assembly of FIG. 12A showing the collar in an unlocked state.
Figure 12A:
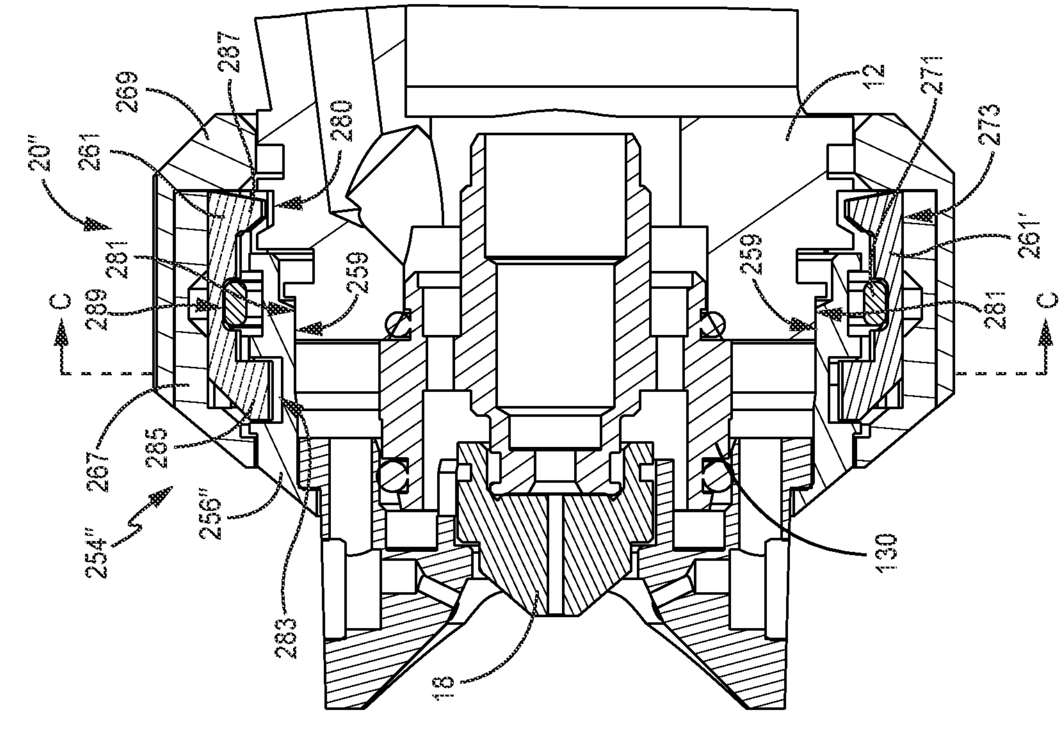
FIG. 12A is a cross-sectional view of a spray tip assembly mounted to a gun body and with a collar in a locked state.
Figure 12D:
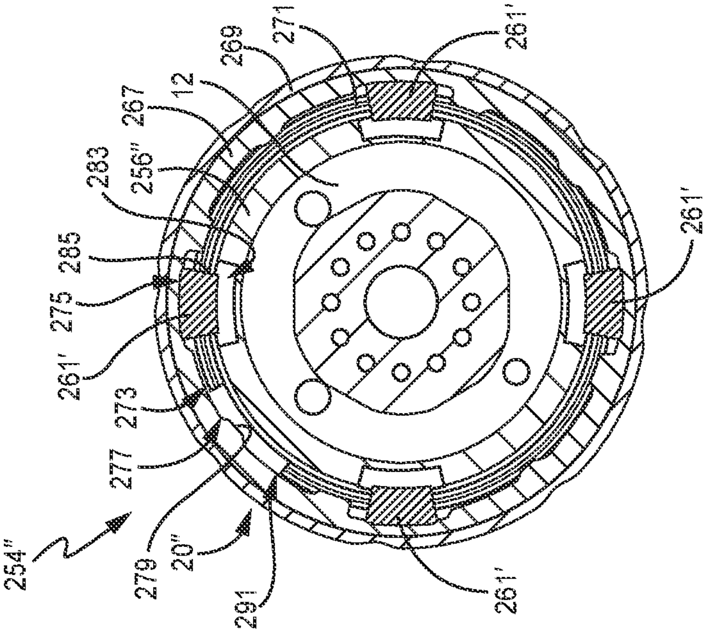
FIG. 12D is a cross-sectional view of the spray tip assembly taken along line D-D in FIG. 12B.
Figure 12C:
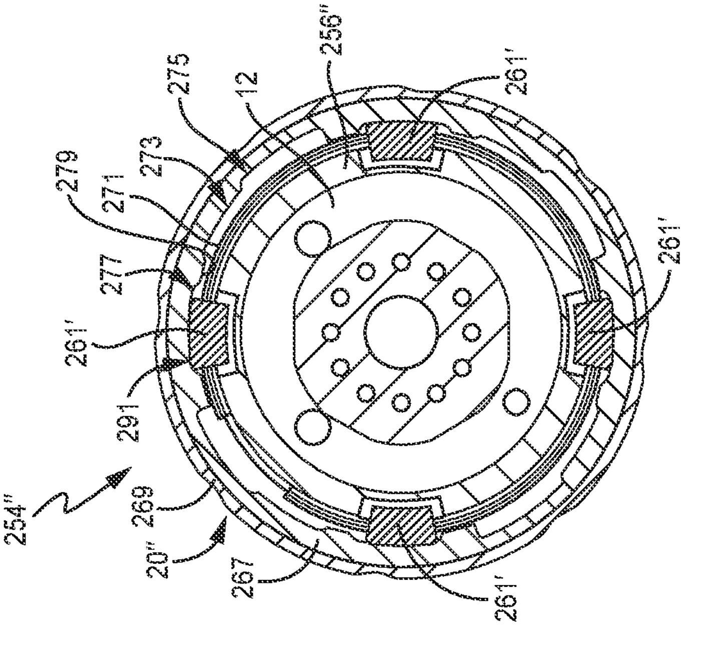
FIG. 12C is a cross-sectional view of the spray tip assembly taken along line C-C in FIG. 12A.

FIG. 12A is a cross-sectional view of spray tip assembly 254" mounted to gun body 12 and with collar 20" in a locked state. FIG. 12B is a cross-sectional view of spray tip assembly 254" disposed on gun body 12 and with collar 20" in an unlocked state. FIG. 12C is a cross-sectional view taken along line C-C in FIG. 12A. FIG. 12D is a cross-sectional view taken along line D-D in FIG. 12B. FIGS. 12A-12D will be discussed together. Spray tip assembly 254" includes air cap 16, spray tip 18, collar 20", tip body 256", detents 261', and spring 271. Collar 20" includes detent slots 273. Each detent slot 273 includes first portion 275, second portion 277, and homing projection 279. Tip body 256" includes retaining slots 283 and tip locks 259. Each detent 261' includes retaining flange 285, locking flange 287, and spring groove 289. Gun body 12 includes mounting groove 280 and lock interfaces 281.

Tip body 256" supports other components of spray tip assembly 254". Air cap 16 is disposed within tip body 256". Air cap 16 is connected to tip body 256". Spray tip 18 is disposed within air cap 16 and is configured to emit a spray of fluid. Collar 20" is disposed around and supported by tip body 256". In the example shown, collar 20" includes a main collar body 267 and a support ring 269 connected to the main collar body 267. Support ring 269 extends radially inward to at least partially enclose a rear end of spray tip assembly 254". Collar 20" is rotatable about tip body 256". Collar 20" is rotatable relative to air cap 16. Collar 20" is rotatable about central axis CA-CA, which can be coaxial with spray axis A. Collar 20" is rotatable between an unlocked state and a locked state, as discussed in more detail below.

Tip locks 259 are formed on tip body 256" and are configured to interface with lock interfaces 281 of gun body 12. Tip locks 259 can also be referred to as rotation locks because tip locks 259 prevent tip body 256" from rotating relative to gun body 12. In the example shown, tip body 256" has a generally cylindrical interior and tip locks 259 are formed as flats on that cylindrical interior. Lock interfaces 281 are formed as planar surfaces on gun body 12. Lock interfaces 281 can also be referred to as anti-rotation flats. Tip locks 259 interfacing with lock interfaces 281 prevents tip body 256" from rotating about central axis CA-CA. While the keyed interface between tip body 256" and gun body 12 is described as being formed by planar portions on each of tip body 256" and gun body 12, it is understood that the keyed interface can be formed in any manner suitable for preventing relative rotation between tip body 256" and gun body 12. For example, tip body 256" can include one or more projections or recesses that interface with corresponding recesses or projections on gun body 12.

Detents 261' are disposed radially between collar 20" and tip body 256". Detents 261' can also be referred to as catches or collets. In the example shown, detents 261' extend at least partially around the circumference of tip body 256". Each detent 261' has a retaining flange 285 interfacing with tip body 256". The retaining flanges 285 interface with tip body 256" within retaining slots 283. Retaining slots 283 are recesses formed in tip body 256". Retaining flanges 285 are configured such that retaining flanges 285 are disposed within retaining slots 283 with collar 20" in each of the locked and unlocked states. Retaining flanges 285 thereby retains detent 261' on tip body 256" with collar 20" in each of the locked and unlocked states. Detents 261' can also assist in retaining collar 20" on tip body 256" by the interface between retaining flanges 285 and retaining slots 283, as detents 261' interface with collar 20" to prevent collar 20" from shifting axially.

Locking flanges 287 are disposed at an opposite axial end of detent 261' from retaining flange 285. Locking flanges 287 are aligned with mounting slot 280 when spray tip assembly 254" is disposed on gun body 12. With collar 20" in the locked state, locking flanges 287 extend into and are retained within mounting slot 280. Locking flanges 287 being disposed within mounting slot 280 secures spray tip assembly 254" to gun body 12 and prevents spray tip assembly 254" from shifting axially off of gun body 12.

Spring 271 is disposed radially between detents 261' and tip body 256". Spring 271 interfaces with detents 261' and is configured to bias detents 261' radially away from gun body 12 and radially towards collar 20". Spring 271 is disposed within spring groove 289 in each detent 261'. Spring 271 is compresses between detents 261' and tip body 256" when collar 20" is in the locked state. Spring 271 biases detents 261' away from tip body 256", thereby removing locking flanges 287 from mounting slot 280, when collar 20" is in the unlocked state. In the example shown, spring 271 extends only partially around the circumference of tip body 256". Spring 271 is arcuate and extends less than 360-degrees about tip body 256".

Detents 261' interface with detent slots 273 formed in collar 20". In the example shown, collar 20" includes the same number of detent slots 273 as there are detents 261'. Detent slots 273 are circumferentially elongate in the example shown. Each detent slot 273 is separated from an adjacent detent slot 273, in the example shown, such that each detent 261' is associated with a dedicated detent slot 273. A blocker is disposed at each circumferential end of each detent slot 273 to prevent detents 261' from passing between the detent slots 273. Each detent slot 273 includes a first portion 275, which can also be referred to as a recess, that receives the detent 261' when the collar 20" is in the unlocked state, and includes a second portion 277 that receives the detent 261' when the collar 20" is in the locked state. The second portion 277 can be referred to as formed by a homing face of collar 20". More specifically, homing slot 291 of second portion 277 receives detent 261' with collar 20" in the locked state. The inner radial surface of second portion 277 is radially closer to axis CA-CA than the inner radial surface of first portion 275 such that second portion 277 biases detent 261' radially inward to position locking flange 287 within mounting slot 280. Homing projection 279 is formed on collar 20" and extends radially inward from detent slot 273. Homing projection 279 is formed on second portion 277 and extends radially inward relative to the inner radial surface of second portion 277. Homing projection 279 partially defines homing slot 291 of second portion 277.

Spray tip assembly 254" is mounted to spray gun 10 by shifting spray tip assembly 254" axially onto gun body 12. Collar 20" is initially in the unlocked state such that spring 271 biases detents 261' radially outward and into first portion 275 of detent slots 273. With detents 261' biased into first portions 275, spray tip assembly 254" is shifted axially onto gun body 12 such that tip locks 259 interface with lock interfaces 281.

With spray tip assembly 254" positioned on gun body 12, collar 20" is rotated relative to gun body 12 and about axis CA-CA to the locked state. For example, the user can grasp collar 20" with a single hand and rotate collar 20" relative to gun body 12. The interface between tip locks 259 and lock interfaces 281 prevents tip body 256", and thus air cap 16 and spray tip 18, from rotating about axis CA-CA while collar 20" is rotated between the locked and unlocked states. Detents 261' pass from first portion 275 of detent slots 273 to second portion 277 of detent slots 273 and are pushed radially inward by collar 20". Detents 261' encounter homing projections 279 that cause detents 261' to be pushed further radially inward as collar 20" is further rotated. Detents 261' pass over homing projections 279 and into homing slots 291. Spring 271 pushes detents 261' radially outward and into homing slots 291 to seat detents 261' within homing slots 291. Locking flanges 287 are thus disposed in mounting groove 280 to secure spray tip assembly 254" to gun body 12.

Detents 261' passing over homing projections 279 and into homing slots 291 can provide feedback to the user that collar 20" is in the locked state. For example, spring 271 pushing detents 261' into homing slots 291 can cause vibratory feedback felt by the hand of the user grasping and manipulating collar 20". Spring 271 pushing detents 261' into homing slots 291 can cause an audible feedback, such as a click, that confirms to the user that collar 20" is in the locked state.

With collar 20" in the locked state, spray tip assembly 254" is fixed to gun body 12 and positioned for spraying. To remove spray tip assembly 254", collar 20" is rotated from the locked state to the unlocked state. Detents 261' enter first portions 275 of detent slots 273 and spring 271 biases detents 261' away from gun body 12 and into first portions 275. Locking flanges 287 are thereby removed from mounting groove 280 and spray tip assembly 254" can be pulled axially away from and off of gun body 12.

Spray tip assembly 254" is a quick-connect assembly that facilitates quick and simple installation and removal of spray tip assembly 254" from gun body 12. Spray tip assembly 254" facilitates quick and simple installation, removal, and replacement of air cap 16 and spray tip 18. In some examples, the quick-connect arrangement can be retrofit onto an existing spray gun, similar to spray tip assembly 254' discussed above.

Spray tip assembly 254" provides significant advantages. The quick connect spray tip assembly 254" allows a user to quickly and efficiently swap spray tips during operation, increasing spray efficiency and reducing downtime. The operator can simply articulate collar 20 between the locked and unlocked states to install and uninstall spray tip assembly 254". The operator is not required to make awkward rotational motion relative to gun body 12 to thread the collar on and off and the one motion coupling and decoupling provides an improved ergonomic experience and faster time to couple and decouple. Collar 20" is rotated less than a full turn between the locked and unlocked states, as opposed to threaded connections that can require multiple full rotations. In some examples, collar 20" can be rotated a quarter turn between the locked and unlocked states. In some examples, collar 20" can be rotated a third of a turn between the locked and unlocked states. Detents 261' extend at least partially around the circumference of gun body 12 such that detents 261' do not exert point loads on gun body 12. Detents 261' spreading the load across a portion of gun body 12 prevents pitting and other contact damage to gun body 12, which can be formed from metals such as aluminum. In addition, each of the components of spray tip assembly 254" is provided as a cartridge that can be installed and removed as a single piece. Spray tip assembly 254" can thus be considered to be a spray tip cartridge.

Figure 13:
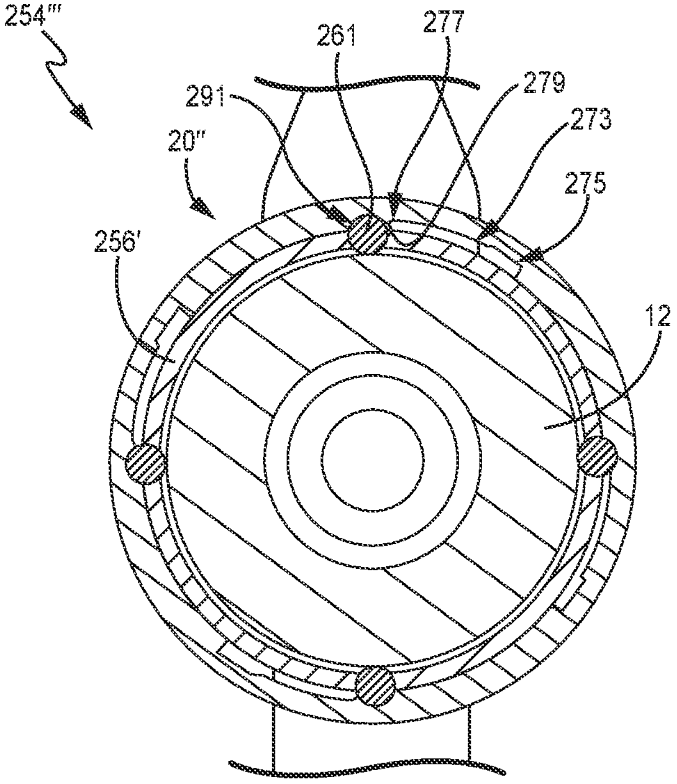
FIG. 13 is a cross-sectional view of a spray tip assembly similar to the view shown in FIG. 12C.

FIG. 13 is a cross-sectional view of a spray tip assembly 254'". Spray tip assembly 254'" is substantially similar to spray tip assembly 254, spray tip assembly 254', and spray tip assembly 254". Spray tip assembly 254 is a quick-connect spray tip assembly 254" that facilitates quick and simply installation and removal of a spray tip 18 and air cap 16 from a spray gun 10. Spray tip assembly 254" is substantially similar to spray tip assembly 254" and 254' in that the collar 20" of spray tip assembly 254" rotates between the locked and unlocked states. Spray tip assembly 254" includes detent slots 273 interfacing with detents 261. Detents 261 are supported by tip body 256'. Collar 20" is rotatable relative to tip body 256' and interfaces with detents 261. First portions 275 are aligned radially with detents 261 with spray tip assembly 254" in the unlocked state and provide reliefs that allow detents 261 to move radially away from and over gun body 12. Homing slots 291 are radially aligned with and interface with detents 261 with spray tip assembly 254" in the locked state to secure spray tip assembly 254" to gun body 12.

Detents 261 passing over homing projections 279 and into homing slots 291 can provide feedback to the user that collar 20" is in the locked state. For example, detents 261 can pop into homing slots 291 and cause vibratory feedback felt by the hand of the user grasping and manipulating collar 20". Detents 261 popping into homing slots 291 can cause an audible feedback, such as a click, that confirms to the user that collar 20" is in the locked state.

Figure 14D:
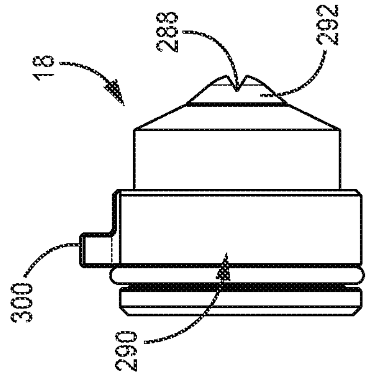
FIG. 14D is a side elevation view of a spray tip.
Figure 14C:
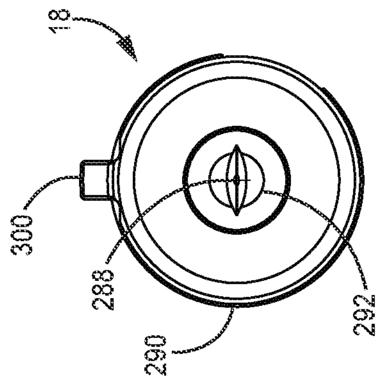
FIG. 14C is a front elevation view of a spray tip.
Figure 14B:
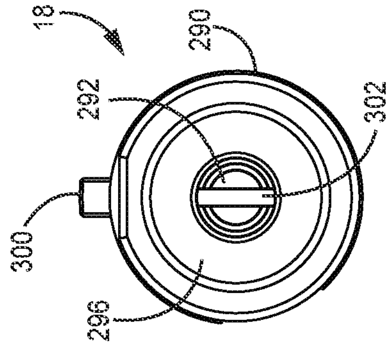
FIG. 14B is a rear elevation view of a spray tip.
Figure 14E:
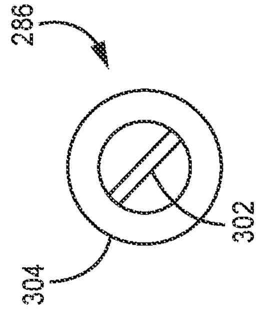
FIG. 14E is a rear elevation view of a turbulator assembly.
Figure 14A:
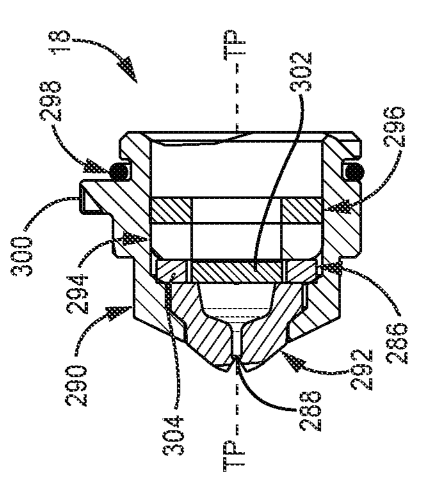
FIG. 14A is a cross-sectional view of a spray tip.

FIG. 14A is a cross-sectional view of spray tip 18. FIG. 14B is a rear elevation view of spray tip 18. FIG. 14C is a front elevation view of spray tip 18. FIG. 14D is a side elevational view of spray tip 18. FIG. 14E is a rear elevation view of a turbulator assembly 286. FIGS. 14A-14E will be discussed together. Spray tip 18 includes turbulator assembly 286, orifice 288, tip housing 290, tip 292, retaining ring 294, gasket 296, tip seal 298, and locating tab 300. Turbulator assembly 286 includes turbulator 302 and support ring 304.

Spray tip 18 receives flows of spray fluid and emits the spray fluid as a spray. Turbulent flow upstream of spray orifice 288 is desirable and enhances atomization as the fluid exits spray tip 18. Tip 292 is disposed within tip housing 290. Tip 292 is formed from a hardened material. In some examples, spray tip 18 is formed from carbide. It is understood that tip 292 can be formed of other suitable hard materials, such as metals and ceramics, among other options. Turbulator assembly 286 is disposed adjacent tip 292. Turbulator assembly 286 is disposed immediately upstream of tip 292. Spray fluid flows through turbulator assembly 286, enters into tip 292, and is emitted through orifice 288. Support ring 304 is disposed in tip housing 290 adjacent tip 292. Turbulator 302 is supported by support ring 304. In some examples, each end of turbulator 302 is supported by support ring 304. Support ring 304 can be formed by a gasket that seals against tip 292, among other options. Turbulator 302 extends through tip axis TP-TP, which can be coaxial with central axis CA-CA and spray axis A. Turbulator 302 thereby extends through the central flow axis through spray tip 18.

Retaining ring 294 is disposed adjacent turbulator assembly 286 and retains turbulator assembly 286 within tip housing 290. Gasket 296 is disposed within tip housing 290 and is configured to form a sealed interface with a nozzle, such as nozzle 164, extending from spray gun 10. For example, gasket 296 can seal against a portion of fluid valve cartridge 44, such as against a portion of fluid cartridge body 122. In one example, gasket 296 can seal against nozzle 164 extending from tip mount 130 of fluid cartridge body 122. Tip seal 298 is disposed at an inlet end of spray tip 18 and about tip housing 290. Tip seal 298 is configured to interface with air cap 16 and assist in retaining spray tip 18 within air cap 16. Locating tab 300 locks an orientation of spray tip 18 relative air cap 16.

Turbulator assembly 286 is disposed in the flowpath through spray tip 18. Some examples of spray tip 18 do not include a pre-orifice piece upstream of tip 292. A pre-orifice piece includes a pre-orifice having a reduced diameter, followed by a chamber having an increased diameter, and then a reduced diameter through tip 292 to orifice 288. The pre-orifice is formed by an opening aligned on axis TP-TP. Turbulator 302 extends through axis TP-TP such that flow aligned on axis TP-TP encounters the obstruction formed by turbulator 302. Turbulator 302 obstructs relatively laminar flow and generates turbulence in that flow. The turbulence improves atomization of the spray fluid as the spray fluid is driven through orifice 288 at lower pressures. This allows relatively thin spray fluids, such as varnishes, lacquers, fine finish or high-gloss finishes, thin waterborne paints, solvent-borne materials, etc., to be sprayed with spray tips 18 having a relatively large diameter opening upstream of orifice 288, such as spray tips 18 that do not include a pre-orifice piece. For example, some spray tips 18 can include a relatively large orifice 288 having a diameter up to about 1.016 millimeters (mm) (about 0.040 inches (in.)). Some spray tips 18 include a relatively large orifice 288 having a diameter of at least about 0.508 mm (at least about 0.020 in.). It is understood that turbulator 302 provides improved spraying and benefits for tip orifices across an array of sizes. In some examples, spray tips 18 includes orifices 288 larger than about 0.051 mm (about 0.002 in.). In some examples, spray tips 18 include orifices between about 0.051 mm (about 0.002 in.) and about 0.381 mm (about 0.015 in.).

During operation, the spray fluid flows through spray tip 18 from the upstream end to orifice 288. The spray fluid encounters turbulator 302 immediately upstream of the portion of the flowpath defined by tip 292. Turbulator 302 provides a flow obstruction that reduces the flow area and generates a turbulent flow downstream of turbulator 302. The turbulent flow is received by tip 292 immediately downstream of turbulator assembly 286, flows through tip 292, and is emitted through orifice 288. Turbulator 302 is disposed at the upstream end of tip 292 such that the turbulent flow is generated as close as possible to orifice 288. Turbulent flow has better spray characteristics and exhibits better atomization than laminar flow.

Turbulator 302 extends through axis TP-TP through spray tip 18 and is disposed in the flowpath through spray tip 18. Relatively large orifices can be utilized to prevent clogging of the spray fluid but lead to undesirably high flow rates. A user can reduce the flow rate but that leads to a corresponding pressure drop. The lower pressures can adversely affect the spray quality. Turbulator 302 provides a flow restriction and adds turbulence to the fluid stream to improve atomization of the spray fluid at the lower pressures needed to reduce the flow rate. Turbulator 302 further facilitates atomization of spray fluid for particularly thin spray fluids, such as varnishes, lacquers, fine finish or high-gloss finishes, thin waterborne paints, solvent-borne materials, etc.

Turbulator 302 alters the flow and induces turbulence to provide better spray characteristics. Spray gun 10 emits a high-quality spray of relatively low viscosity fluids. Spray gun 10 can generate the desired atomization with a tip 292 having relatively a relatively large orifice, which is beneficial to prevent clogs, at a relatively low flow rate and relatively low pressure. In some examples, spray gun 10 can apply spray fluid at flow rates between about 50 cubic centimeters/minute (about 3.05 cubic inches/minute) to about 500 cubic centimeters/minute (about 30.5 cubic inches/minute). Turbulator 302 facilitates spraying at pressures up to 25% lower, in some cases 10-20% lower, than spray tips without turbulator 302. This allows the user to apply materials without changing out the spray tip 18 on spray gun 10.

Figure 15:
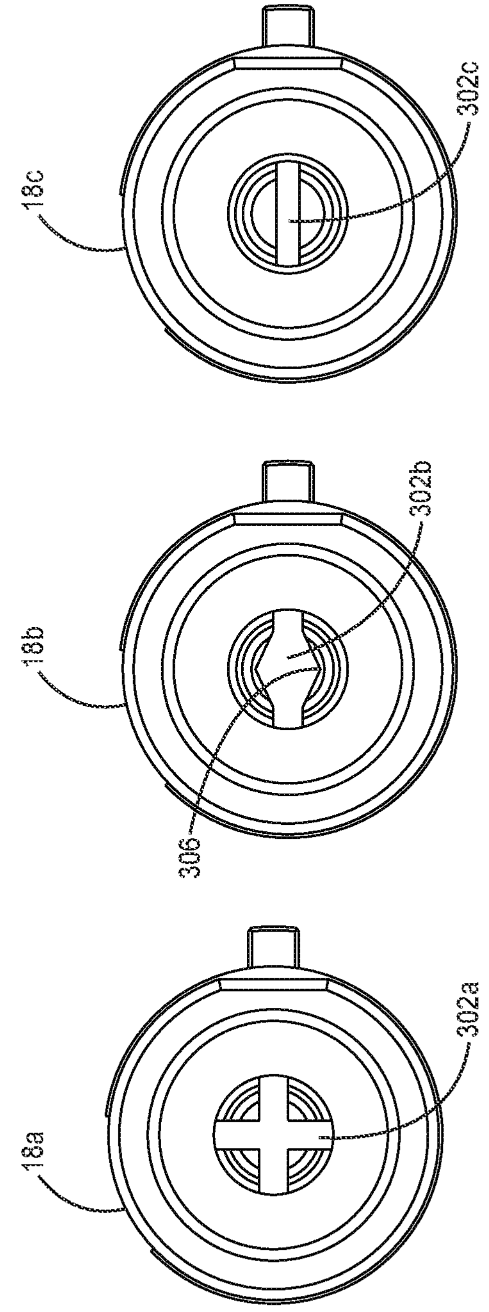
FIG. 15 is a rear isometric view showing various spray tips.

FIG. 15 is a rear elevation view showing spray tips 18*a*-18*c*. Spray tip 18*a* includes turbulator 302*a*. Spray tip 18*b* includes turbulator 302*b*. Spray tip 18*c* includes turbulator 302*c*. Each turbulator 302*a*-302*c* (collectively herein "turbulators 302") is disposed in an axial flowpath along axis TP (FIG. 14A) through its respective spray tip 18*a*-18*c* (collectively herein "spray tips 18"). Turbulators 302 are disposed in the flowpath, and can be specifically on axis TP, to generate turbulence in the spray fluid flowing through spray tips 18. Turbulators 302 pass fully through the flowpath. Turbulators 302 intersect axis TP. The ends of turbulators 302 can be connected to opposite sides of orifice 288 at locations 180-degrees apart. Turbulator 302*a* is formed as a cross disposed in the flowpath. The arms of turbulator 302*a* can be disposed about 90-degrees apart, although other angles are possible. Turbulator 302*b* includes an enlarged portion 306. The enlarged portion can include a center point disposed on axis TP. Turbulator 302*b* includes ends disposed about 180-degrees apart about orifice 288. Turbulator 302*c* is generally uniform between first and second ends. The ends of turbulator 302*c* are disposed about 180-degrees apart about orifice 288. While turbulator 302*a*, turbulator 302*b*, and turbulator 302*c* are shown, it is understood that other variations of turbulators 302 can be included within spray tips 18 to generate the turbulent flow.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray gun configured to receive flows of a fluid and of air and to emit a fluid spray and the air, the spray gun comprising:

a gun body having a first bore, a second bore, and a gap disposed between the first bore and the second bore, the first bore and the second bore disposed coaxially on an axis;

a spray fluid control cartridge having a first housing disposed within the first bore, wherein a spray fluid control valve is fully contained within the first housing and is configured to control spraying of spray fluid from the spray gun, wherein a fluid valve member of the spray fluid control valve extends out of the first housing and towards the second bore;

an air control cartridge having a second housing disposed within the second bore, wherein a first valve member is at least partially contained within the second housing, the first valve member configured to control airflow for spraying by the spray gun, wherein a receiving chamber is formed in the first valve member; and a trigger extending into the gap and configured to actuate the spray fluid control valve between a closed state and an open state;

wherein a valve stem of the fluid valve member extends into the receiving chamber of the first valve member such that a projection extending radially from the valve stem of the fluid valve member is disposed within the receiving chamber;

wherein the projection is spaced from an opening of the receiving chamber by a first axial gap, the valve stem of the fluid valve member extending into the receiving chamber through the opening; and wherein the trigger is configured to engage the first valve member to shift the first valve member to a first air valve open state prior to engaging the projection to exert a driving force on the projection of the valve stem of the fluid valve member to shift the spray fluid control valve to the open state.

2. The spray gun of claim 1, wherein the air control cartridge includes a second valve member.

3. The spray gun of claim 2, wherein the first valve member is configured to be actuated by the trigger.

4. The spray gun of claim 2, wherein the second valve member is set independent of the trigger and unaffected by pulling of the trigger.

5. The spray gun of claim 1, wherein a coupler is disposed about the valve stem of the fluid valve member, the coupler configured to interface with the trigger, the first valve stem, and the valve stem of the first valve member to actuate the first valve stem and the valve stem of the first valve member to respective open states.

6. A spray gun configured to receive flows of a spray fluid and of air and to emit a fluid spray and the air, the spray gun comprising:

a gun body, the gun body including a first valve bore and a mount slot intersecting the first valve bore;

a first flow valve cartridge disposed in the first valve bore, wherein the first flow valve cartridge fully contains a first flow valve configured to control flow downstream through the first flow valve cartridge;

a fluid tube assembly configured to provide spray fluid to the gun body, the fluid tube assembly including a mount block having a mount bore extending therethrough;

wherein the first flow valve cartridge is insertable into and removable from the first valve bore as a single component; and wherein the mount block extends into the mount slot, and wherein the first flow valve cartridge extends fully through the mount bore to hold the mount block within the mount slot and such that an inlet port through the first flow valve cartridge is disposed within the mount block to receive the spray fluid from within the mount bore.

7. The spray gun of claim 6, further comprising:

a forward bore formed in the gun body; and a rear bore formed in the gun body and axially aligned with the forward bore;

wherein the forward bore, the mount bore, and the rear bore form the first valve bore.

8. The spray gun of claim 6, wherein the first flow valve cartridge is fixed to the gun body by a first interface formed between a first cartridge body of the first flow valve cartridge and the gun body.

9. The spray gun of claim 6, wherein the first flow valve cartridge includes a first cartridge body, wherein a first valve member is at least partially disposed in the first cartridge body, and wherein an actuator spring interfaces with the first valve member to bias the first valve member towards a closed state.

10. The spray gun of claim 6, wherein the first flow valve cartridge includes a first cartridge body, a first valve member at least partially disposed in the first cartridge body, and a second valve member at least partially disposed in the first cartridge body.

11. The spray gun of claim 10, wherein the first flow valve cartridge includes a first valve associated with the first valve member, a second valve associated with the first valve member, and a third valve associated with the second valve member, and wherein the second valve is disposed upstream of the third valve.

12. The spray gun of claim 6, further comprising:

a second valve bore formed in the gun body; and a second flow valve cartridge disposed in the second valve bore, wherein the second flow valve cartridge fully contains a second flow valve configured to control flow downstream through the second flow valve cartridge.

13. The spray gun of claim 12, wherein the first valve bore is formed in a forward block of the gun body, the second valve bore is formed in a rear block of the gun body, and a trigger is disposed in a gap disposed between the forward block and the rear block.

14. The spray gun of claim 12, wherein:

the first flow valve cartridge is disposed to control a flow of spray fluid between a spray fluid inlet and a spray tip; and the second flow valve cartridge is disposed to control a first flow of air between an air inlet bore and an air cap and a second flow of air between the air inlet bore and the air cap.

15. The spray gun of claim 6, wherein the gun body further comprises:

an air inlet bore extending to the first valve bore;

a feed air bore formed within the gun body;

a first air bore extending between the first valve bore and the feed air bore; and a second air bore extending between the first valve bore and the feed air bore; and an air tube disposed in the feed air bore, the air tube dividing the feed air bore into a first portion in fluid communication with the first air bore and a second portion in fluid communication with the second air bore.

16. The spray gun of claim 6, wherein:

the first flow valve cartridge includes:

a first cartridge body;

a first valve member at least partially disposed in the first cartridge body; and a second valve member at least partially disposed in the first cartridge body; and the first cartridge body extends out of a rear end of the gun body; and a knob is disposed around a portion of the second valve member.

17. A spray gun comprising:

a gun body having an air valve bore, an air inlet bore in fluid communication with the air valve bore, an assist air bore extending from the air valve bore, and a fan air bore extending from the air valve bore;

an air valve assembly disposed in the air valve bore and configured to control a first air flow between the air inlet bore and the assist air bore and a second air flow between the air inlet bore and the fan air bore, the air valve assembly comprising:

a valve body disposed in the air valve bore and having an axial bore therethrough and at least one air outlet port formed through the valve body, wherein the at least one air outlet port is in fluid communication with the fan air bore;

a common valve member disposed at least partially within the air valve bore, wherein a first end of the common valve member extends out of the air valve bore and a second end of the common valve member is disposed in the valve body; and a fan valve member disposed within the air valve bore;

wherein a first valve is formed between the common valve member and a first seat, the first valve configured to control flow downstream to the assist air bore;

wherein a second valve is formed between the common valve member and a second seat, the second valve configured to control flow downstream to the fan air bore.

18. A spray gun configured to receive flows of a fluid and of air and to emit a fluid spray and the air, the spray gun comprising:

a gun body having a first bore, a second bore, and a gap disposed between the first bore and the second bore, wherein the first bore and the second bore are disposed coaxially on an axis;

a spray fluid control cartridge having a first housing partially disposed within the first bore, wherein a spray fluid control valve is fully contained within the first housing and is configured to control spraying of spray fluid from the spray gun, and wherein the first housing extends fully axially through the first bore such that the first housing projects out of the first bore in a first direction along the axis and in a second direction along the axis;

an air control cartridge having a second housing disposed within the second bore, wherein a first valve member is at least partially contained within the second housing, the first valve member configured to control airflow for spraying by the spray gun; and a trigger extending into the gap and configured to actuate the spray fluid control valve between a closed state and an open state.

19. A spray gun configured to receive flows of a fluid and of air and to emit a fluid spray and the air, the spray gun comprising:

a gun body having a first bore, a second bore, and a gap disposed between the first bore and the second bore, wherein the first bore and the second bore are disposed coaxially on an axis;

a spray fluid control cartridge having a first housing at least partially disposed within the first bore, wherein a spray fluid control valve is formed at an interface between a fluid valve member and a fluid valve seat, the spray fluid control valve fully contained within the first housing and configured to control spraying of spray fluid from the spray gun, wherein the fluid valve member projects out of the first housing at a location disposed within the gap;

an actuator spring disposed within the first housing, the actuator spring configured to bias the fluid valve member towards the fluid valve seat, the actuator spring disposed outside of and isolated from a fluid chamber within the first housing;

an air control cartridge having a second housing disposed within the second bore, wherein a first valve member is at least partially contained within the second housing, the first valve member configured to control airflow for spraying by the spray gun; and a trigger extending into the gap and configured to actuate the spray fluid control valve between a closed state and an open state.

* * * * *